US009813722B2

(12) United States Patent
Hannuksela

(10) Patent No.: US 9,813,722 B2
(45) Date of Patent: Nov. 7, 2017

(54) VIDEO ENCODING AND DECODING

(71) Applicant: Nokia Technologies Oy, Espoo (FI)

(72) Inventor: Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 180 days.

(21) Appl. No.: 14/556,504

(22) Filed: Dec. 1, 2014

(65) Prior Publication Data
US 2015/0156501 A1 Jun. 4, 2015

Related U.S. Application Data

(60) Provisional application No. 61/910,616, filed on Dec. 2, 2013.

(51) Int. Cl.
*H04N 19/30* (2014.01)
*H04N 19/172* (2014.01)
*H04N 19/50* (2014.01)
*H04N 19/70* (2014.01)

(52) U.S. Cl.
CPC ............ *H04N 19/30* (2014.11); *H04N 19/70* (2014.11); *H04N 19/50* (2014.11)

(58) Field of Classification Search
None
See application file for complete search history.

(56) References Cited

U.S. PATENT DOCUMENTS

| 6,400,768 B1* | 6/2002 | Nagumo | H04N 19/105 375/240.11 |
| 2009/0080535 A1* | 3/2009 | Yin | H04N 19/63 375/240.26 |
| 2010/0027615 A1* | 2/2010 | Pandit | H04N 19/597 375/240.01 |

(Continued)

FOREIGN PATENT DOCUMENTS

WO 2013/048311 A1 4/2013

OTHER PUBLICATIONS

International Search Report and Written Opinion received for corresponding Patent Cooperation Treaty Application No. PCT/FI2014/050925, dated Feb. 20, 2015, 13 pages.

(Continued)

*Primary Examiner* — Mohammad J Rahman
(74) *Attorney, Agent, or Firm* — Alston & Bird LLP

(57) ABSTRACT

A method comprising: encoding pictures into a bitstream, the bitstream comprising at least two scalability layers, pictures being associated with access units and pictures being associated individually with one of the at least two scalability layers; indicating in the bitstream inter-layer prediction dependencies, indicative of direct reference layers, if any, of a first scalability layer and indirect reference layers, if any, of the first scalability layer; selecting an earlier picture in decoding order as a basis for deriving picture order count (POC) related variables for a current picture based on a pre-defined algorithm, the current picture being associated with a current scalability layer, wherein the earlier picture is (Continued)

the closest preceding picture, in decoding order, to the current picture among a set of pictures that are associated with the current scalability layer or any direct or indirect reference layer of the current scalability layer.

18 Claims, 10 Drawing Sheets

(56) References Cited

U.S. PATENT DOCUMENTS

| | | | |
|---|---|---|---|
| 2012/0224644 A1 | 9/2012 | Wang et al. | |
| 2013/0094773 A1* | 4/2013 | Misra | H04N 19/46 382/233 |
| 2013/0094774 A1* | 4/2013 | Misra | H04N 19/70 382/233 |
| 2013/0215975 A1* | 8/2013 | Samuelsson | H04N 19/70 375/240.25 |
| 2014/0049604 A1* | 2/2014 | Chen | H04N 19/597 348/43 |
| 2014/0247883 A1* | 9/2014 | Lee | H04N 19/513 375/240.16 |
| 2014/0301466 A1* | 10/2014 | Li | H04N 19/597 375/240.16 |
| 2014/0301476 A1* | 10/2014 | Deshpande | H04N 19/70 375/240.25 |
| 2014/0301477 A1* | 10/2014 | Deshpande | H04N 19/82 375/240.25 |
| 2015/0063463 A1* | 3/2015 | Choi | H04N 19/70 375/240.25 |
| 2015/0071356 A1* | 3/2015 | Kim | H04N 19/513 375/240.16 |
| 2015/0085939 A1* | 3/2015 | Deshpande | H04N 19/517 375/240.26 |
| 2015/0103881 A1* | 4/2015 | Hendry | H04N 19/184 375/240.02 |
| 2015/0237377 A1* | 8/2015 | Hendry | H04N 19/70 375/240.25 |
| 2015/0296222 A1* | 10/2015 | Llin | H04N 19/597 375/240.16 |
| 2015/0304671 A1* | 10/2015 | Deshpande | H04N 19/423 375/240.12 |
| 2016/0014432 A1* | 1/2016 | Park | H04N 19/30 375/240.16 |
| 2016/0165260 A1* | 6/2016 | Lee | H04N 19/30 375/240.12 |
| 2016/0191930 A1* | 6/2016 | Sim | H04N 19/105 375/240.16 |
| 2016/0198169 A1* | 7/2016 | Lee | H04N 19/30 375/240.12 |
| 2016/0241850 A1* | 8/2016 | Deshpande | H04N 19/70 |

OTHER PUBLICATIONS

Chen et al., "High Efficiency Video Coding (HEVC) Scalable Extension Draft 4", Joint Collaborative Team on Video Coding (JCT-VC) of ITU-T SG 16 WP 3 and ISO/IEC JTC 1/SC 29/WG 11, JCTVC-O1008_v1, 15th Meeting, Oct. 23-Nov. 1, 2013, 76 pages.
Sjoberg et al., "HLS: Error Robust POC Alignment", Joint Collaborative Team on Video Coding (JCT-VC) of ITU-T SG 16 WP 3 and ISO/IEC JTC 1/SC 29/WG 11, JCTVC-00176v3, 15th Meeting, Oct. 23-Nov. 1, 2013, pp. 1-8.
PCT Application No. PCT/IB2014/065309, "Video Encoding and Decoding", filed on Oct. 14, 2014, 108 pages.
Ramasubramonian et al., "MV-HEVC/SHVC HLS: On Picture Order Count", Joint Collaborative Team on Video Coding (JCT-VC) of ITU-T SG 16 WP 3 and ISO/IEC JTC 1/SC 29/WG 11, 15th Meeting, JCTVC-O0213v4, Oct. 23-Nov. 1, 2013, pp. 1-11.
Hannuksela, "MV-HEVC/SHVC HLS: On POC Value Derivation", Joint Collaborative Team on Video Coding (JCT-VC) of ITU-T SG 16 WP 3 and ISO/IEC JTC 1/SC 29/WG 11, 15th Meeting, JCTVC-O0275, Oct. 23-Nov. 1, 2013, pp. 1-2.
Hannuksela, "MV-HEVC/SHVC HLS: On POC Value Derivation", Joint Collaborative Team on Video Coding (JCT-VC) of ITU-T SG 16 WP 3 and ISO/IEC JTC 1/SC 29/WG 11, 15th Meeting, JCTVC-O0275v2, Oct. 23-Nov. 1, 2013, pp. 1-3.
Hannuksela, "MV-HEVC/SHVC HLS: On POC Value Derivation", Joint Collaborative Team on Video Coding (JCT-VC) of ITU-T SG 16 WP 3 and ISO/IEC JTC 1/SC 29/WG 11, 15th Meeting, JCTVC-O0275v3, Oct. 23-Nov. 1, 2013, pp. 1-6.
Chen et al., "Preliminary Version of High Efficiency Video Coding (HEVC) Scalable Extension Draft 7", Joint Collaborative Team on Video Coding (JCT-VC) of ITU-T SG 16 WP 3 and ISO/IEC JTC 1/SC 29/WG 11, 18th Meeting, JCTVC-R1008_v6, Jun. 30-Jul. 9, 2014, 196 Pages.
"Advanced Video Coding for Generic Audiovisual Services", Series H: Audiovisual and Multimedia Systems, Infrastructure of audiovisual services—Coding of moving video, Recommendation ITU-T H.264, Mar. 2010, 676 pages.
"High Efficiency Video Coding", Series H: Audiovisual and Multimedia Systems, Infrastructure of audiovisual services—Coding of moving video, Recommendation ITU-T H.265, Apr. 2013, 317 pages.
"Information Technology—Coding OfAudio-Visual Objects—Part 12: ISO Base Media File Format", ISO/IEC 14496-12, Third edition, Oct. 15, 2008, 120 pages.
"Information Technology—Coding OfAudio-Visual Objects—Part 14: MP4 File Format", ISO/IEC14496-14, First edition, Nov. 15, 2003, 18 pages.
"Information Technology—Coding OfAudio-Visual Objects—Part 15: Advanced Video Coding (AVC) File Format", ISO/IEC 14496-15, First edition, Apr. 15, 2004, 29 pages.
"Parameter Values for Ultra-High Definition Television Systems for Production and International Programme Exchange", Recommendation ITU-R BT.2020, Aug. 2012, 7 pages.
"Parameter Values for the HDTV Standards for Production and International Programme Exchange", Recommendation ITU-R BT.709-5, Apr. 2002, 32 pages.
"3rd Generation Partnership Project; Technical Specification Group Services and System Aspects; Transparent end-to-end packet switched streaming service (PSS); 3GPP file format (3GP) (Release 12)", 3GPP TS 26.244, V12.3.0, Mar. 2014, pp. 1-63.
Chen et al., "High Efficiency Video Coding (HEVC) Scalable Extension Draft 3", Joint Collaborative Team on Video Coding (JCT-VC) of ITU-T SG 16 WP 3 and ISO/IEC JTC 1/SC 29/WG 11, 14th Meeting, JCTVC-N1008_v3, Jul. 25-Aug. 2, 2013, 68 Pages.
Ott et al., "Extended RTP Profile for Real-time Transport Control Protocol", RFC 4585, Network Working Group, Jul. 2006, pp. 1-51.
Josefsson, "The Base16, Base32, and Base64 Data Encodings", RFC 4648, Network Working Group, Oct. 2006, pp. 1-18.
Gerhard Tech, Joint Collaborative Team on 3D Video Coding Extension Development of ITY SG 16 WP 3 and ISO/IEC JTC/SC29/WG11, 5th meeting in Vienna (from Jul. 27-Aug. 2, 2013).
Extended European Search Report from corresponding European Patent Application No. 14867879.0 dated Jul. 6, 2017, 8 pages.
Boyce J: "BoG report on SHVC/MV-HEVC HLS topics"; 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://WFTP3.ITU.INT/AV-ARCH/JCTVC-SITE/, No. JCTVC-00349, Oct. 30, 2013 (Oct. 30, 2013), 25 pages, XP030115429.
Hannuksela (Nokia) M M et al: "MV-HEVC/SHVC HLS: Cross-layer POC anchor picture derivation (follow-up of JCTVC-P0056/JCT3V-G0042)", 7. JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16); URL: http://phenix.int-evry.fr/jct2/, No. JCT3V-G0237, Jan. 13, 2014 (Jan. 13, 2014), 2 pages, XP030132027.

(56) References Cited

OTHER PUBLICATIONS

Hannuksela (Nokia) M M: "MV-HEVC/SHVC HLS: Layer-tree POC", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0056-v2, Jan. 10, 2014 (Jan. 10, 2014), 16 pages, XP030115524.

\* cited by examiner

VIDEO ENCODING AND DECODING

TECHNICAL FIELD

The present application relates generally to encoding and decoding of digital video material. In particular, the present application relates to scalable coding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

SUMMARY

Some embodiments provide a method for encoding and decoding video information. In some embodiments there is provided methods, apparatuses and computer program products for video coding.

Various aspects of examples of the invention are provided in the detailed description.

According to a first aspect, there is provided a method comprising:
  encoding pictures into a bitstream, the bitstream comprising at least two scalability layers and pictures being associated with access units;
  selecting an earlier picture in decoding order as a basis for deriving picture order count (POC) related variables for a current picture based on a pre-defined algorithm,
  wherein the earlier picture is such that it is required to be present in a bitstream.

According to an embodiment, the earlier picture is required for decoding of the current picture or the earlier is required to be present in the bitstream by bitstream conformance constraints.

According to an embodiment, the earlier picture is selected from any direct or indirect reference layer of the layer of the current picture.

According to an embodiment, the earlier picture is selected to be the previous picture, in decoding order, required to be present in the bitstream, such as a base-layer TRAP picture.

According to an embodiment, the method further comprises:
  encoding at least one POC related syntax element into the bitstream on the basis of the POC related variables of said earlier picture defined as a POC reference picture.

According to an embodiment, the method further comprises:
  using the POC reference picture in DeltaPocVal derivation of POC reset approach for decrementing the POC values of the picture in a decoded picture buffer.

According to an embodiment, the method further comprises:
  determining layer-wise POC approach as a layer tree including an independent layer and at least one dependent layer, wherein a mapping of layers to the layer tree is obtained from the dependency information between layers encoded into the bitstream.

According to an embodiment, the method further comprises:
  determining characteristics, including layer identifier(s), temporal sub-layer identifier(s), and/or picture types, of pictures on which the current picture may depend on in prediction; and
  selecting the previous picture, in decoding order, fulfilling the characteristics as the POC reference picture.

According to an embodiment, NOLS pictures are indicated in the bitstream or inferred from sequence-level information, wherein the POC reference pictures are selected among pictures that are not NOLS pictures.

According to an embodiment, the POC reference picture is selected among pictures that are no CL-RAS pictures.

According to a second aspect, there is provided an apparatus comprising at least one processor and at least one memory, said at least one memory stored with code thereon, which when executed by said at least one processor, causes an apparatus to perform at least the following:
  encode pictures into a bitstream, the bitstream comprising at least two scalability layers and pictures being associated with access units;
  select an earlier picture in decoding order as a basis for deriving picture order count (POC) related variables for a current picture based on a pre-defined algorithm,
  wherein the earlier picture is such that it is required to be present in a bitstream.

According to a third aspect, there is provided a computer program product embodied on a non-transitory computer readable medium, comprising computer program code configured to, when executed on at least one processor, cause an apparatus or a system to:
  encode pictures into a bitstream, the bitstream comprising at least two scalability layers and pictures being associated with access units;
  select an earlier picture in decoding order as a basis for deriving picture order count (POC) related variables for a current picture based on a pre-defined algorithm,
  wherein the earlier picture is such that it is required to be present in a bitstream.

According to a fourth embodiment there is provided an apparatus comprising a video encoder configured for encoding a bitstream comprising an image sequence, the video encoder comprising
  means for encoding pictures into a bitstream, the bitstream comprising at least two scalability layers and pictures being associated with access units;
  means for selecting an earlier picture in decoding order as a basis for deriving picture order count (POC) related variables for a current picture based on a pre-defined algorithm,
  wherein the earlier picture is such that it is required to be present in a bitstream.

According to a fifth embodiment there is provided a video encoder configured for
  encoding pictures into a bitstream, the bitstream comprising at least two scalability layers and pictures being associated with access units;

selecting an earlier picture in decoding order as a basis for deriving picture order count (POC) related variables for a current picture based on a pre-defined algorithm,
wherein the earlier picture is such that it is required to be present in a bitstream.

According to a sixth aspect there is provided a method comprising:
decoding pictures from a bitstream, the bitstream comprising at least two scalability layers and pictures being associated with access units;
selecting an earlier picture in decoding order as a basis for deriving picture order count (POC) related variables for a current picture based on a pre-defined algorithm,
wherein the earlier picture is such that it is required to be present in a bitstream.

According to an embodiment, the earlier picture is required for decoding of the current picture or the earlier is required to be present in the bitstream by bitstream conformance constraints.

According to an embodiment, the earlier picture is any direct or indirect reference layer of the layer of the current picture.

According to an embodiment, the earlier picture is the previous picture, in decoding order, required to be present in the bitstream, such as a base-layer IRAP picture.

According to an embodiment, the method further comprises:
decoding at least one POC related syntax element from the bitstream on the basis of the POC related variables of said earlier picture defined as a POC reference picture.

According to an embodiment, the method further comprises:
using the POC reference picture in DeltaPocVal derivation of POC reset approach for decrementing the POC values of the picture in a decoded picture buffer.

According to an embodiment, the method further comprises:
determining layer-wise POC approach as a layer tree including an independent layer and at least one dependent layer, wherein a mapping of layers to the layer tree is obtained from the dependency information between layers encoded into the bitstream.

According to an embodiment, the method further comprises:
determining characteristics, including layer identifier(s), temporal sub-layer identifier(s), and/or picture types, of pictures on which the current picture may depend on in prediction; and
selecting the previous picture, in decoding order, fulfilling the characteristics as the POC reference picture.

According to an embodiment, NOLS pictures are indicated in the bitstream or inferred from sequence-level information, wherein the POC reference pictures are selected among pictures that are not NOLS pictures.

According to an embodiment, the POC reference picture is selected among pictures that are no CL-RAS pictures.

According to a seventh aspect, there is provided an apparatus comprising at least one processor and at least one memory, said at least one memory stored with code thereon, which when executed by said at least one processor, causes an apparatus to perform at least the following:
decode pictures from a bitstream, the bitstream comprising at least two scalability layers and pictures being associated with access units;
select an earlier picture in decoding order as a basis for deriving picture order count (POC) related variables for a current picture based on a pre-defined algorithm,
wherein the earlier picture is such that it is required to be present in a bitstream.

According to an eighth aspect, there is provided a computer program product embodied on a non-transitory computer readable medium, comprising computer program code configured to, when executed on at least one processor, cause an apparatus or a system to:
decode pictures from a bitstream, the bitstream comprising at least two scalability layers and pictures being associated with access units;
select an earlier picture in decoding order as a basis for deriving picture order count (POC) related variables for a current picture based on a pre-defined algorithm,
wherein the earlier picture is such that it is required to be present in a bitstream.

According to a ninth aspect there is provided an apparatus comprising a video decoder configured for decoding a bitstream comprising an image sequence, the video decoder comprising
means for decoding pictures from a bitstream, the bitstream comprising at least two scalability layers and pictures being associated with access units;
means for selecting an earlier picture in decoding order as a basis for deriving picture order count (POC) related variables for a current picture based on a pre-defined algorithm,
wherein the earlier picture is such that it is required to be present in a bitstream.

According to a tenth aspect there is provided a video decoder configured for
decoding pictures from a bitstream, the bitstream comprising at least two scalability layers and pictures being associated with access units;
selecting an earlier picture in decoding order as a basis for deriving picture order count (POC) related variables for a current picture based on a pre-defined algorithm,
wherein the earlier picture is such that it is required to be present in a bitstream.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

In the following, several embodiments of the invention will be described in the context of one video coding arrangement. It is to be noted, however, that the invention is not limited to this particular arrangement. In fact, the different embodiments have applications widely in any environment where improvement of scalable and/or multiview video coding is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

Figure 1:
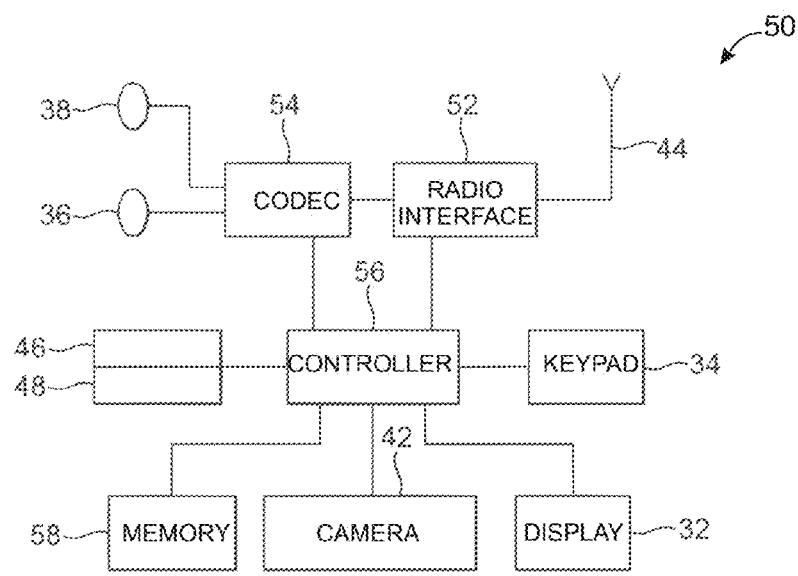
FIG. 1 shows a block diagram of a video coding system according to an embodiment.
Figure 2:
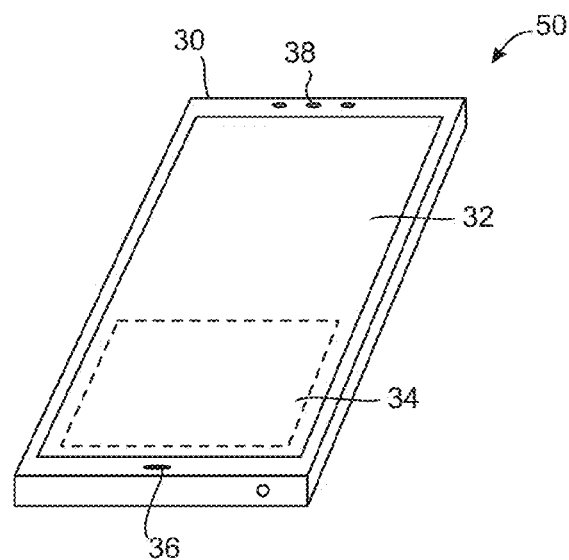
FIG. 2 shows an apparatus for video coding according to an embodiment.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. In some embodiments the apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
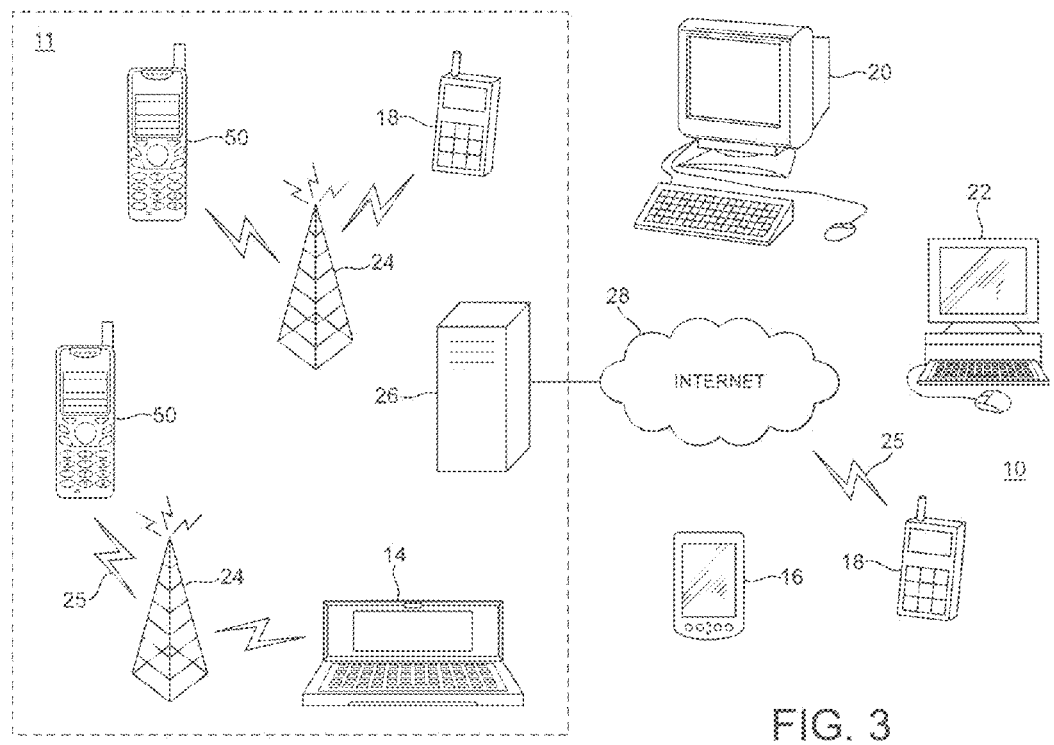
FIG. 3 shows an arrangement for video coding comprising a plurality of apparatuses.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types. The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

The H.265/HEVC standard was developed by the Joint Collaborative Team on Video Coding (JCT-VC) of VCEG and MPEG. The H.265/HEVC standard will be published by both parent standardization organizations, and is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer pictures similarly to the decoded reference pictures of the enhancement layer. Consequently, the encoder may choose a base-layer reference picture as inter prediction reference and may indicate its use e.g. with a reference picture index in the coded bitstream. The decoder decodes from the bitstream, for example from a reference picture index, that a base-layer picture is used as an inter prediction reference for the enhancement layer. When a decoded base-layer picture is used as a prediction reference for an enhancement layer, it is referred to as an inter-layer reference picture.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of views, e.g. a mono or a stereo video plus some supplementary data, is provided to a decoder side and all required views are then rendered (i.e. synthesized) locally be the decoder to be displayed on a display.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

When describing H.264/AVC and HEVC as well as in example embodiments, common notation for arithmetic operators, logical operators, relation operators, bit-wise operators, assignment operators, and range notation e.g. as specified in H.264/AVC or HEVC may be used. Furthermore, common mathematical functions e.g. as specified in H.264/AVC or HEVC may be used and a common order or precedence and execution order (from left to right or from right to left) of operators e.g. a specified in H.264/AVC or HEVC may be used.

When describing H.264/AVC and HEVC as well as in example embodiments, the following description may be used to specify the parsing process of each syntax element.
  b(8): byte having any pattern of bit string (8 bits).
  se(v): signed integer Exp-Golomb-coded syntax element with the left bit first.
  u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.
  ue(v): unsigned integer Exp-Golomb-coded syntax element with the left bit first.

An Exp-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

A code number corresponding to an Exp-Golomb bit string may be converted to se(v) for example using the following table:

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| ... | ... |

When describing H.264/AVC and HEVC as well as in example embodiments, syntax structures, semantics of syntax elements, and decoding process may be specified as follows. Syntax elements in the bitstream are represented in bold type. Each syntax elements is described by its name (all lower case letters with underscore characteristics), optionally its one or two syntax categories, and one or two descriptors for its method of coded representation. The decoding process behaves according to the value of the syntax element and to the values of previously decoded syntax elements. When a value of a syntax element is used in the syntax tables or the text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing H.264/AVC and HEVC as well as in example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoded conformance can be verified with the Hypothetical Reference Decoder losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture may either be a frame or a field. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In HEVC, video pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as CTU (coding tree unit) and the video picture is divided into non-overlapping CTUs. An CTU can be further split into a combination of smaller CUs, e.g. by recursively splitting the CTU and resultant CUs. Each resulting CU typically has at least one PU and at least on TU associated with it. Each PU and TU can further be split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signaled in the bitstream allowing the decoder to reproduce the intended structure of these units In HEVC, a picture can be partitioned in tiles, which are rectangular and contain an integer number of CTUs. In HEVC, the partitioning to tiles forms a regular grid, where heights and widths of tiles differ from each other by one CTU at the maximum.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In a Working Draft (WD) 5 of HEVC, some key definitions and concepts for picture partitioning are defined as follows. A partitioning is defined as the division of a set into subsets such that each element of the set is in exactly one of the subsets.

A basic coding unit in a HEVC WD5 is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two tress, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprises treeblocks contained in several tiles.

In H.264/AVC and HEVC, in-picture prediction may be disabled across slice boundaries. Thus, slices can be regarded as a way to split a coded picture into independently decodable pieces, and slices are therefore of the regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

The elementary unit for the output of an H.264/AVC or HEVC encoder and the input of an H.264/AVC or HEVC decoder respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders may run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not.

NAL units consist of a header and payload. In H.264/AVC, the NAL unit header indicates the type of the NAL unit and whether a coded slice contained in the NAL unit is a part of a reference picture or a non-reference picture. H.264/AVC includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may be additionally contain various indications related to scalability and multiview hierarchy.

In HEVC, a two-byte NAL unit header is used for all specified NAL unit types. The NAL unit header contains one reserved bit, a six-bit NAL unit type indication, a six-bit reserved field (called nuh_layer_id) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. Without loss of generality, in some example embodiments a variable LayerId is derived from the value of nuh_layer_id for example as follows: LayerId=nuh_layer_id. In the following, LayerId, nuh_layer_id and layer_id are used interchangeably unless otherwise indicated.

It is expected that nuh_layer_id and/or similar syntax elements in NAL unit header would carry information on the scalability hierarchy. For example, the LayerId value may be mapped to values of variables or syntax elements describing different scalability dimensions, such as quality_id or similar, dependency_id or similar, any other type of layer identifier, view order index or similar, view identifier, an indication whether the NAL unit concerns depth or texture i.e. depth_flag or similar, or an identifier similar to priority_id of SVC indicating a valid sub-bitstream extraction if all NAL units greater than a specific identifier value are removed from the bitstream. nuh_layer_id and/or similar syntax elements may be partitioned into one or more syntax elements indicating scalability properties. For example, a certain number of bits among nuh_layer_id and/or similar syntax elements may be used for dependency_id or similar, while another certain number of bits among nuh_layer_id and/or similar syntax elements may be used for quality_id or similar. Alternatively, a mapping of LayerId values or similar to values of variables or syntax elements describing different scalability dimensions may be provided for example in a Video Parameter Set, a Sequence Parameter Set or another syntax structure.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP (a.ka. BLA_W_RADL) BLA_N_LP | Coded slice segment of a BLA picture slice_segment_layer_rbsp( ) |
| 19, 20 | IDR_W_DLP (a.k.a IDR_W_RADL) IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_RAP_VCL22 . . . RSV_RAP_VCL23 | Reserved // reserved RAP VCL NAL unit types |
| 24 . . . 31 | RSV_VCL24 . . . RSV_VCL31 | Reserved // reserved non-RAP VCL NAL unit types |

In a draft HEVC standard, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also or alternatively be referred to as intra random access point (IRAP) picture, is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture may either be a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

Decodable leading pictures may be such that can be correctly decoded when the decoding is started from the CRA picture. In other words, decodable leading pictures use only the initial CRA picture or subsequent pictures in decoding order as reference in inter prediction. Non-decodable leading pictures are such that cannot be correctly decoded when the decoding is started from the initial CRA picture. In other words, non-decodable leading pictures use pictures prior, in decoding order, to the initial CRA picture as references in inter prediction.

Concatenation of coded video data, which may also be referred to as splicing, may occur for example coded video sequences are concatenated into a bitstream that is broadcast or streamed or stored in a mass memory. For example, coded video sequences representing commercials or advertisements may be concatenated with movies or other "primary" content. A spliced bitstream may be defined as the bitstream that is added after a first bitstream and the concatenation of the first bitstream and the spliced bitstream form a new bitstream. If a spliced bitstream contains only one coded video sequence, it may be referred to as the spliced coded video sequence. Similarly, the first coded video sequence of the spliced bitstream may be referred to as the spliced coded video sequence. An entity performing the concatenation of the bitstreams may be referred to as a splicer.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. BLA_W_DLP may also be referred to as BLA_W_RADL. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_DLP does not have associated RASL pictures present in the bitstream, but may have associated RADL pictures in the bitstream. IDR_W_DLP may also be referred to as IDR_W_RADL.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer and the picture may be referred to as a sub-layer non-reference picture. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId. Pictures that are not sub-layer non-reference pictures may be referred to as sub-layer reference pictures. A sub-layer reference picture may be defined as a picture that contains samples that may be used for inter prediction in the decoding process of subsequent pictures of the same sub-layer in decoding order.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC, there are two picture types, the TSA and STSA picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit.

Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set (SPS). In addition to the parameters that may be essential to the decoding process, the sequence parameter set may optionally contain video usability information (VUI), which includes parameters that may be important for buffering, picture output timing, rendering and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. A picture parameter set (PPS) contains such parameters that are likely to be unchanged in several coded pictures.

Parameter set syntax structures may have extensions mechanisms, which may for example be used to include parameters that are specific to extensions of a coding standard. An example syntax of an extension mechanism is provided in the following for SPS:

| seq_parameter_set_rbsp( ) { | Descriptor |
|---|---|
| ... | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Decoders of particular version(s) of a coding standard or a coding scheme may ignore sps_extension_data_flag, while in another version of the coding standard or the coding scheme, an extension syntax structure may be specified and may appear within the sps_extension_data_flag bits. Similar extensions mechanisms may be specifies also for other types of parameter sets.

In a draft version of HEVC, there is also a third type of parameter sets, here referred to as Adaptation Parameter Set (APS), which includes parameters that are likely to be unchanged in several coded slices. In a draft version of HEVC, the APS syntax structure includes parameters or syntax elements related to context-based adaptive binary arithmetic coding (CABAC), adaptive sample offset, adaptive loop filtering, and deblocking filtering. In a draft version of HEVC, an APS is a NAL unit and coded without reference or prediction from any other NAL unit. An identifier, referred to as aps_id syntax element, is included in APS NAL unit, and included and used in the slice header to refer to a particular APS. However, APS was not included in the final H.265/HEVC standard.

H.265/HEVC also includes another type of a parameter set, called a video parameter set (VPS). A video parameter set RBSP may include parameters that can be referred to by one or more sequence parameter set RBSPs.

The relationship and hierarchy between VPS, SPS, and PPS may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain TemporalId values) of a layer representation. VPS may also provide the maximum number of layers present in the bitstream. For example, the syntax element vps_max_layers_minus1 may be included in the syntax and vps_max_layer_minus1+1 may indicate the maximum number of layers present in the bitstream. The actual number of layers in the bitstream may be smaller than or equal to vps_max_layers_minus1+1. The variable MaxLayersMinus1 may be specified to be equal to vps_max_layers_minus1 and may indicate the maximum number of layers minus 1 in the CVS for which the VPS is the active VPS.

An example syntax of a VPS extension intended to be a part of the VPS is provided in the following. The presented VPS extension provides the dependency relationships among other things. It should be understood that the VPS extension syntax is provided as an example and other similar and/or extended syntax structures may be equivalently applied with different embodiments.

| vps_extension( ) { | Descriptor |
|---|---|
| while( !byte_aligned( ) ) | |
| vps_extension_byte_alignment_reserved_one_bit | u(1) |
| for( i = 0, NumScalabilityTypes = 0; i < 16; i++ ) { | |
| scalability_mask[ i ] | u(1) |
| NumScalabilityTypes += scalability_mask[ i ] | |
| } | |
| for( j = 0; j < NumScalabilityTypes; j++ ) | |
| dimension_id_len_minus1[ j ] | u(3) |
| vps_nuh_layer_id_present_flag | u(1) |
| for( i = 0; i <= vps_max_layers_minus1; i++ ) { | |
| if( vps_nuh_layer_id_present_flag && i > 0 ) | |
| layer_id_in_nuh[ i ] | u(6) |
| for( j = 0; j < NumScalabilityTypes; j++ ) | |
| dimension_id[ i ][ j ] | u(v) |
| } | |
| for( i = 1; i <= vps_max_layers_minus1; i++ ) | |
| for( j = 0; j < i; j++ ) | |
| direct_dependency_flag[ i ][ j ] | u(1) |
| direct_dep_type_len_minus2 | ue(v) |
| for( i = 1; i <=vps_max_layers_minus1; i++ ) | |
| for( j = 0; j < i; j++ ) | |
| if( direct_dependency_flag[ i ][ j ] ) | |
| direct_dependency_type[ i ][ j ] | u(v) |
| } | |

The semantics of the presented VPS extension may be specified as described in the following paragraphs.

vps_extension_byte_alignment_reserved_one_bit is equal to 1 and is used to achieve alignment of the next syntax element to a byte boundary.

scalability_mask[i] equal to 1 indicates that dimension_id syntax elements corresponding to the i-th scalability dimension are present. scalability_mask[i] equal to 0 indicates that dimension_id syntax elements corresponding to the i-th scalability dimension are not present. The scalability dimensions corresponding to each value of of i in scalability_mask[i] may be specified for example to include the following or any subset thereof along with other scalability dimensions.

| scalability_mask index | Scalability dimension | ScalabilityId mapping |
|---|---|---|
| 0 | multiview | ViewId |
| 1 | spatial or quality scalability | DependencyId | dimension_id_len_minus1[j] plus1 specifies the length, in bits, of the dimension_id[i][j] syntax element. vps_nuh_layer_id_present_flag specifies whether the layer_id_in_nuh[i] syntax is present. layer_id_in_nuh[i] specifies the value of the nuh_layer_id syntax element in VCL NAL units of the i-th layer. When not present, the value of layer_id_in_nuh[i] is inferred to be equal to i. layer_id_in_nuh[i] is greater than layer_id_in_nuh[i−1]. The variable LayerIdxInVps[layer_id_in_nuh[i]] is set equal to i. dimension_id[i][j] specifies the identifier of the j-th scalability dimension type of the i-th layer. When not present, the value of dimension_id[i][j] is inferred to be equal to 0. The number of bits used for the representation of dimension_id[i][j] is dimension_id_len_minus1[j]+1 bits.

direct_dependency_flag[i][j] equal to 0 specifies that the layer with index j is not a direct reference layer for the layer with index i. direct_dependency_flag[i][j] equal to 1 specifies that the layer with index j may be a direct reference layer for the layer with index i. When direct_dependency_flag[i][j] is not present for i and j in the range of 0 to vps_max_num_layers_minus1, it is inferred to be equal to 0.

The variables NumDirectRefLayers[i] and RefLayerId[i][j] may be derived as follows:

```
for( i = 1; i <= vps_max_layers_minus1; i++ )
    for( j = 0, NumDirectRefLayers[ i ] = 0; j < i; j++ )
        if( direct_dependency_flag[ i ][ j ] == 1 )
            RefLayerId[ i ][ NumDirectRefLayers[ i ]++ ] =
                layer_id_in_nuh[ j ]
``` direct_dep_type_len_minus2 plus2 specifies the number of bits of the direct_dependency_type[i][j] syntax element. direct_dependency_type[i][j] equal to 0 indicates that sample prediction may be used and motion prediction is not used for layer identified by i from layer identified by j. direct_dependency_type[i][j] equal to 1 indicates that motion prediction may be used and sample prediction is not used for layer identified by i from layer identified by j. direct_dependency_type[i][j] equal to 2 indicates that both sample and motion prediction may be used for layer identified by i from layer identified by j.

The variables NumSamplePredRefLayers[i], NumMotionPredRefLayers[i], SamplePredEnabledFlag[i][j], MotionPredEnabledFlag[i][j], NumDirectRefLayers[i], RefLayerId[i][j], MotionPredRefLayerId[i][j], and SamplePredRefLayerId[i][j] may be derived as follows:

```
for( i = 0; i < 64; i++ ) {
    NumSamplePredRefLayers[ i ] = 0
    NumMotionPredRefLayers[ i ] = 0
    NumDirectRefLayers[ i ] = 0
    for( j = 0; j < 64; j++ ) {
        SamplePredEnabledFlag[ i ][ j ] = 0
        MotionPredEnabledFlag[ i ][ j ] = 0
        RefLayerId[ i ][ j ] = 0
        SamplePredRefLayerId[ i ][ j ] = 0
        MotionPredRefLayerId[ i ][ j ] = 0
    }
}
for( i = 1; i <= vps_max_layers_minus1; i++ ) {
    iNuhLId = layer_id_in_nuh[ i ]
    for( j = 0; j < i; j++ )
        if( direct_dependency_flag[ i ][ j ] ) {
            RefLayerId[ iNuhLId ][ NumDirectRefLayers[
                iNuhLId ]++ ] =
layer_id_in_nuh[ j ]
SamplePredEnabledFlag[ iNuhLId ][ j ] =
( ( direct_dependency_type[ i ][ j ] + 1 ) & 1 )
    NumSamplePredRefLayers[ iNuhLId ] +=
    SamplePredEnabledFlag[ iNuhLId ][ j ]
    MotionPredEnabledFlag[ iNuhLId ][ j ] =
        ( ( ( direct_dependency_type[ i ][ j ] + 1 )
& 2 ) >> 1 )
    NumMotionPredRefLayers[ iNuhLId ] +=
    MotionPredEnabledFlag[ iNuhLId ][ j ]
    }
}
for( i = 1, mIdx = 0, sIdx = 0; i <= vps_max_layers_minus1; i++ ) {
iNuhLId = layer_id_in_nuh[ i ]
for( j = 0, j < i; j++ ) {
    if( MotionPredEnabledFlag[ iNuhLId ][ j ] )
        MotionPredRefLayerId[ iNuhLId ][ mIdx++ ] =
        layer_id_in_nuh[ j ]
    if( SamplePredEnabledFlag[ INuhLId ][ j ] )
        SamplePredRefLayerId[ iNuhLId ][ sIdx++ ] =
        layer_id_in_nuh[ j ]
}
}
```

H.264/AVC and HEVC syntax allows many instances of parameter sets, and each instance is identified with a unique identifier. In H.264/AVC, each slice header includes the identifier of the picture parameter set that is active for the decoding of the picture that contains the slice, and each picture parameter set contains the identifier of the active sequence parameter set. Consequently, the transmission of picture and sequence parameter set does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A SEI NAL unit may contain one or more SEI message, which are not required for the decoding of output pictures but assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Several nesting SEI messages have been specified in the AVC and HEVC standards or proposed otherwise. The idea of nesting SEI messages is to contain one or more SEI messages within a nesting SEI message and provide a mechanism for associating the contained SEI messages with a subsets of the bitstream and/or a subset of decoded data. It may be required that a nesting SEI message contains one or more SEI messages that are not nesting SEI messages themselves. An SEI message contained in a nesting SEI message may be referred to as a nested SEI message. An SEI message not contained in a nesting SEI message may be referred to as a non-nested SEI message. The scalable nesting SEI message of HEVC enables to identify either a bitstream subset (resulting from a sub-bitstream extraction process) or a set of layers to which the nested SEI messages apply. A bitstream subset may also be referred to as a sub-bitstream.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC and HEVC, an access unit comprises a primary coded picture and those NAL units that are associated with it. In HEVC, an access unit is defined as a set of NAL units that are associated with each other according to a specified classification rule, are consecutive in decoding order, and contain exactly one coded picture. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to the loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, an access unit may be defined as a set of NAL units that are associated with each other according to a specified classification rule, are consecutive in decoding order, and contain exactly one coded picture. In addition to containing the VCL NAL units of the coded picture, an access unit may also contain non-VCL-NAL units. In HEVC, the decoding of an access unit results in a decoded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In HEVC, a coded video sequence is defined to be a sequence of access units that consists, in decoding order, of a CRA (Clean Random Access) access unit that is the first access unit in the bitstream, and IDR access unit or a BLA (Broken Link Access) access unit, followed by zero or more non-IDR and non-BLA access units including all subsequent access units up to but no including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CDR NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. In HEVC a closed GOP may also start from BLA W DLP or a BLA N LP picture. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. The NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, predictive coding is applied for example as so-called sample prediction and/or so-called syntax prediction.

In the sample prediction, pixel or sample values in a certain picture area or "block" are predicted. These pixel or sample values can be predicted, for example, using one or more of the following ways:

Motion compensation mechanisms (which may also be referred to as temporal prediction or motion-compensated temporal prediction or motion-compensated prediction or MCP), which involve finding and indicating an area in one of the previously encoded video frames that corresponds closely to the block being coded.

Inter-view prediction, which involves finding and indicating an area in one of the previously encoded view components that corresponds closely to the block being coded.

View synthesis prediction, which involves synthesizing a prediction block or image area where a prediction block is derived on the basis of reconstructed/decoded ranging information.

Inter-layer prediction using reconstructed/decoded samples, such as the so-called IntraBL (base layer) mode of SVC.

Inter-layer residual prediction, in which for example the coded residual of a reference layer or a derived residual from a difference of a reconstructed/decoded reference layer picture and a corresponding reconstructed/decoded enhancement layer picture may be used for predicting a residual block of the current enhancement layer block. A residual block may be added for example to a motion-compensated prediction block to obtain a final prediction block for the current enhancement layer block.

Intra prediction, where pixel or sample values can be predicted by spatial mechanisms which involve finding and indicating a spatial region relationship.

In the syntax prediction, which may also be referred to as parameter prediction, syntax elements and/or syntax element values and/or variables derived from syntax elements are predicted from syntax elements (de)coded earlier and/or variables derived earlier. Non-limiting examples of syntax prediction are provided below:

In motion vector prediction, motion vectors e.g. for inter and/or inter-view prediction may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

The block partitioning, e.g. from CTU to CUs and down to PUs, may be predicted.

In filter parameter prediction, the filtering parameters e.g. for sample adaptive offset may be predicted.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be e.g. a Discrete Cosine Transform (DCT) or a variant thereof. After transforming the difference, the transformed difference is quantized and entropy coded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and included in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or picture). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

In H.265/HEVC version 1, picture order count (de)coding and derivation, when no enhancement layers are considered, is carried out as follows:

POC is specified relative to the previous IRAP picture with NoRaslOutputFlag equal to 1. The value of NoRaslOutputFlag is equal to 1 for each IDR picture, each BLA picture, and each CRA picture that is the first picture in the bitstream in decoding order, is the first picture that follows an end of sequence NAL unit in decoding order, or has HandleCraAsBlaFlag equal to 1.

4 to 16 bits of the least significant bits (LSBs) of the POC values are encoded into a bitstream and/or decoded from a bitstream for each picture (other than IDR pictures for which the LSB). To be more specific the LSBs are represented by u(v)-coded slice_pic_order_cnt_lsb syntax element, which is present in the slice segment headers (for other picture types than IDR pictures).

The number of bits of the slice_pic_order_cnt_lsb syntax element is specified by the ue(v)-coded log 2_max_pic_order_cnt_lsb_minus4 syntax element in the sequence parameter set syntax structure. In log 2_max_pic_order_cnt_lsb_minus4 also specifies the value of the variable MaxPicOrderCntLsb that is used in the decoding process for picture order count as follows:

$$MaxPicOrderCntLsb = 2^{(log\ 2\_max\_pic\_order\_cnt\_lsb\_minus4+4)}$$

The value of log 2_max_pic_order_cnt_lsb_minus4 is in the range of 0 to 12, inclusive.

The signaled POC LSB is used to determine whether the POC value of the current picture is smaller or larger than the POC value of the previous picture in decoding order that has TemporalId equal to 0 and that is not a RASL picture, a RADL picture, or a sub-layer non-reference picture. This previous picture is referred to as prevTid0Pic in the H.265/HEVC decoding process.

The decoding process of deriving PicOrderCntVal, the picture order count of the current picture, is carried out as follows:

When the current picture is not an TRAP picture with NoRaslOutputFlag equal to 1, the variables prevPicOrderCntLsb and prevPicOrderCntMsb are derived as follows:

Let prevTid0Pic be the previous picture in decoding order that has TemporalId equal to 0 and that is not a RASL picture, a RADL picture, or a sub-layer non-reference picture.

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If the current picture is an IRAP picture with NoRaslOutputFlag equal to 1, PicOrderCntMsb is set equal to 0. Otherwise, PicOrderCntMsb is derived as follows:

```
- if( ( slice_pic_order_cnt_lsb < prevPicOrderCntLsb ) &&
        ( ( prevPicOrderCntLsb - slice_pic_order_cnt_lsb ) >=
        ( MaxPicOrderCntLsb / 2 ) ) )
    PicOrderCntMsb = prevPicOrderCntMsb + MaxPicOrderCntLsb
  else if( (slice_pic_order_cnt_lsb > prevPicOrderCntLsb ) &&
        ( ( slice_pic_order_cnt_lsb - prevPicOrderCntLsb ) >
        ( MaxPicOrderCntLsb / 2 ) ) )
    PicOrderCntMsb = prevPicOrderCntMsb - MaxPicOrderCntLsb
  else
    PicOrderCntMsb = prevPicOrderCntMsb
```

PicOrderCntVal is derived as follows:

PicOrderCntVal=PicOrderCntMsb+slice_pic_order_cnt_lsb

The process above has an impact that all IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

The function PicOrderCnt(picX) is specified as follows:

PicOrderCnt(picX)=PicOrderCntVal of the picture picX

The function DiffPicOrderCnt(picA, picB) is specified as follows:

DiffPicOrderCnt(picA,picB)=PicOrderCnt(picA)−PicOrderCnt(picB)

In H.265/HEVC, it is required that the value of PicOrderCntVal is in the range of $-2^{31}$ to $2^{31}-1$, inclusive. In one CVS, the PicOrderCntVal values for any two coded pictures are required not be the same. Furthermore, in H.265/HEVC it is required that the bitstream does not contain data that result in values of DiffPicOrderCnt(picA, picB) used in the decoding process that are not in the range of $-2^{15}$ to $2^{15}-1$, inclusive.

Inter prediction process may be characterized using one or more of the following factors.

The Accuracy of Motion Vector Representation.

For example, motion vectors may be of quarter-pixel accuracy, and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream in some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted e.g. from adjacent blocks and/or co-located blocks in temporal reference picture. Differential coding of motion vectors may be disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts (POC), while in explicit weighted prediction, prediction weights are explicitly indicated.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the TU (including e.g. DCT coefficient information). It may be signaled at CU level whether prediction error coding is applied or not for each CU. In the case there is no prediction error residual associated with the CU, it can be considered there are no TUs for the CU.

In some coding formats and codecs, a distinction is made between so-called short-term and long-term reference pictures. This distinction may affect some decoding processes such as motion vector scaling in the temporal direct mode or implicit weighted prediction. If both of the reference pictures used for the temporal direct mode are short-term reference pictures, the motion vector used in the prediction may be scaled according to the picture order count difference between the current picture and each of the reference pictures. However, if at least one reference picture for the temporal direct mode is a long-term reference picture, default scaling of the motion vector may be used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

A syntax structure for (decoded) reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes have been replaced with a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to the reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a picture parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture, and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with CABAC or variable length coding. In general, the smaller the index is, the shorter the corresponding syntax element may become. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft version of the HEVC standard, a combined list (List C) may be constructed after the final reference picture lists (List 0 and List 1) have been constructed. The combined list may be used for uni-prediction (also known as uni-directional prediction) within B slices. However, in the final H.265/HEVC standard, no combined list is constructed.

A reference picture list, such as the reference picture list 0 and the reference picture list 1, may be constructed in two steps: First, an initial reference picture list is generated. The initial reference picture list may be generated for example on the basis of frame_num, POC, temporal_id, or information on the prediction hierarchy such as a GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

Since multiview video provides encoders and decoders the possibility to utilize inter-view redundancy, decoded inter-view frames may be included in the reference picture list(s) as well.

Examples of motion vector prediction schemes and related coding modes are provided in the next paragraphs.

In addition to the motion-compensated macroblock modes for which a differential motion vector is coded, a P macroblock may also be coded in the so-called P_Skip type in H.264/AVC. For this coding type, no differential motion vector, reference index, or quantized prediction error signal is coded into the bitstream. The reference picture of a macroblock coded with the P_Skip type has index 0 in reference picture list 0. The motion vector used for reconstructing the P_Skip macroblock is obtained using median motion vector prediction for the macroblock without any differential motion vector being added. P_Skip may be beneficial for compression efficiency particularly in areas where the motion field is smooth.

In B slices of H.264/AVC, four different types of inter prediction are supported: uni-predictive from reference picture list 0, uni-directional from reference picture list 1, bi-predictive, direct prediction, and B_skip. The type of inter prediction can be selected separately for each macroblock partition. B slices utilize a similar macroblock partitioning as P slices. For a bi-predictive macroblock partition, the prediction signal is formed by a weighted average of motion-compensated list 0 and list 1 prediction signals. Reference indices, motion vector differences, as well as quantized prediction error signal may be coded for uni-predictive and bi-predictive B macroblock partitions.

Two direct modes are included in H.264/AVC, temporal direct and spatial direct, and one of them can be selected into use for a slice in a slice header, although their use may be constrained further for example in profiles or alike. In the temporal direct mode, the reference index for reference picture list 1 is set to 0 and the reference index for reference picture list 0 is set to point to the reference picture that is used in the co-located block (compared to the current block cb) of the reference picture having index 0 in the reference picture list 1 if that reference picture is available, or set to 0 if that reference picture is not available. The motion vector predictor for cb is essentially derived by considering the motion information within a co-located block of the reference picture having index 0 in reference picture list 1. Motion vector predictors for a temporal direct block are derived by scaling a motion vector from the co-located block. The scaling is proportional to picture order count differences between the current picture and the reference pictures associated with the inferred reference indexes in list 0 and list 1, and by selecting the sign for the motion vector predictor depending on which reference picture list it is using.

In spatial direct mode of H.264/AVC, motion information of spatially adjacent blocks is exploited. Motion vector prediction in spatial direct mode can be divided into three steps: reference index determination, determination of uni- or bi-prediction, and motion vector prediction. In the first step, the reference picture with the minimum non-negative reference index (i.e., non-intra block) is selected from each of reference picture list 0 and reference picture list 1 of the neighboring blocks A, B, and C (where A is the adjacent block on the left of the current block, B is the adjacent block above the current block and C is the adjacent block on the top-right side of the current block). If no non-negative reference index exists in reference picture list 0 of the neighboring blocks A, B, and C, and likewise no non-negative reference index exists in reference picture list 1 of the neighboring blocks A, B, and C, reference index 0 is selected for both reference picture lists.

The use of uni- or bi-prediction for H.264/AVC spatial direct mode is determined as follows: If a minimum non-negative reference index for both reference picture lists was found in the reference index determination step, bi-prediction is used. If a minimum non-negative reference index for either but not both of reference picture list 0 or reference picture list 1 was found in the reference index determination step, uni-prediction from either reference picture list 0 or reference picture list 1, respectively, is used.

In the motion vector prediction for H.264/AVC spatial direct mode, certain conditions, such as whether a negative reference index was concluded in the first step, are checked and, if fulfilled, a zero motion vector is determined. Otherwise, the motion vector predictor is derived similarly to the motion vector predictor of P blocks using the motion vectors of spatially adjacent blocks A, B, and C.

No motion vector differences or reference indices are present in the bitstream for a direct mode block in H.264/AVC, while quantized prediction error signal may be coded and present therefore present in the bitstream. A B_skip macroblock mode in H.264/AVC is similar to the direct mode but no prediction error signal is coded and included in the bitstream.

H.265/HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In H.265/HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighboring prediction blocks sharing identical motion information, which is only signaled once for each region. Another difference between AMVP and the merge mode in H.265/HEVC is that the maximum number of candidates of AMVP is 2 while that of the merge mode is 5.

The advanced motion vector prediction may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions: three spatial motion vector predictor candidate positions located above the current prediction block (B0, B1, B2) and two on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

The merging/merge mode/process/mechanism may operate for example as follows, while other similar realizations of the merge mode are also possible for example with different candidate position sets and candidate locations with candidate position sets.

In the merging/merge mode/process/mechanism, where all the motion information of a block/PU is predicted and used without any modification/correction. The aforementioned motion information for a PU may comprise one or more of the following: 1) The information whether 'the PU is uni-predicted using only reference picture list0' or 'the PU is uni-predicted using only reference picture list 1' or 'the PU is bi-predicted using both reference picture list0 and list 1'; 2) Motion vector value corresponding to the reference picture list0, which may comprise a horizontal and vertical motion vector component; 3) Reference picture index in the reference picture list0 and/or an identifier of a reference picture pointed to by the Motion vector corresponding to reference picture list 0, where the identifier of a reference picture may be for example a picture order count value, a layer identifier value (for inter-layer prediction), or a pair of a picture order count value and a layer identifier value; 4) Information of the reference picture marking of the reference picture, e.g. information whether the reference picture was marked as "used for short-term reference" or "used for long-term reference"; 5)-7) The same as 2)-4), respectively, but for reference picture list 1.

Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

One of the candidates in the merge list and/or the candidate list for AMVP or any similar motion vector candidate list may be a TMVP candidate or alike, which may be derived from the collocated block within an indicated or inferred reference picture, such as the reference picture indicated for example in the slice header. In HEVC, the reference picture list to be used for obtaining a collocated partition is chosen according to the collocated_from_l0_flag syntax element in the slice header. When the flag is equal to 1, it specifies that the picture that contains the collocated partition is derived from list 0, otherwise the picture is derived from list 1. When collocated_from_l0_flag is not present, it is inferred to be equal to 1. The collocated_ref_idx in the slice header specifies the reference index of the picture that contains the collocated partition. When the current slice is a P slice, collocated_ref_idx refers to a picture in list 0.

When the current slice is a B slice, collocated_ref_idx refers to a picture in list 0 if collocated_from_l0 is 1, otherwise it refers to a picture in list 1. collocated_ref_idx always refers to a valid list entry, and the resulting picture is the same for all slices of a coded picture. When collocated_ref_idx is not present, it is inferred to be equal to 0.

In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

In HEVC, the availability of a candidate predicted motion vector (PMV) may be determined as follows (both for spatial and temporal candidates) (SRTP=short-term reference picture, LRTP=long-term reference picture):

| reference picture for target reference index | reference picture for candidate PMV | candidate PMV availability |
|---|---|---|
| STRP | STRP | "available" (and scaled) |
| STRP | LTRP | "unavailable" |
| LTRP | STRP | "unavailable" |
| LTRP | LTRP | "available" (but not scaled) |

In HEVC, when the target reference index value has been determined, the motion vector value of the temporal motion vector prediction may be derived as follows: The motion vector PMV at the block that is collocated with the bottom-right neighbor of the current prediction unit is obtained. The picture where the collocated block resides may be e.g. determined according to the signalled reference index in the slice header as described above. If the PMV at location C0 is not available, the motion vector PMV at location C1 of the collocated picture is obtained. The determined available motion vector PMV at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the collocated block is a long-term reference picture (while the other is a short-term reference picture), the TMVP candidate may be considered unavailable. If both of the target reference picture and the reference picture of the motion vector of the collocated block are long-term reference pictures, no POC-based motion vector scaling may be applied.

Motion parameter types or motion information may include but are not limited to one or more of the following types:
- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or an indication of a reference picture type, such as a short-term reference picture and/or a long-term reference picture and/or an inter-layer reference picture (which may be indicated e.g. per reference picture)
- a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
- a horizontal motion vector component (which may be indicated e.g. per prediction block or per reference index or alike);
- a vertical motion vector component (which may be indicated e.g. per prediction block or per reference index or alike);
- one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
- coordinates of a block to which the motion parameters and/or motion information applies, e.g. coordinates of the top-left sample of the block in luma sample units;
- extents (e.g. a width and a height) of a block to which the motion parameters and/or motion information applies.

In general, motion vector prediction mechanisms, such as those motion vector prediction mechanisms presented above as examples, may include prediction or inheritance of certain pre-defined or indicated motion parameters.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and the bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) or motion field compression is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

In HEVC, several improvements have been made to enable the codec to better utilize parallelism, i.e. parallel processing of encoding and/or decoding tasks, thus more efficiently utilizing modern multi-core processor architectures. While slices in principle can be used to parallelize the decoder, employing slices for parallelism typically results in relatively poor coding efficiency. The concept of wavefront processing has been introduced to HEVC to improve the utilization of parallelism.

To enable wavefront processing, the encoder and/or the decoder uses the CABAC state of the second CTU of the previous CTU row as the initial CABAC state of the current CTU row. Hence, the processing of the current CTU row can be started when the processing of the second CTU of the previous CTU has been finished. Thanks to this property, CTU rows can be processed in a parallel fashion. In general, it may be pre-defined e.g. in a coding standard which CTU is used for transferring the entropy (de)coding state of the previous row of CTUs or it may be determined and indicated in the bitstream by the encoder and/or decoded from the bitstream by the decoder.

The wavefront processing in HEVC may be used in two parallelization approaches, Wavefront Parallel Processing (WPP) and Overlapped Wavefront (OWF). WPP allows creating picture partitions that can be processed in parallel without incurring high coding losses.

WPP processes rows of coding tree units (CTU) in parallel while preserving all coding dependencies. In WPP, entropy coding, predictive coding as well as in-loop filtering can be applied in a single processing step, which makes the implementations of WPP rather straightforward. OWF, in turn, enables to overlap the execution of consecutive pictures. When the processing of a coding tree unit row in the current picture has been finished and no more rows are available, the processing of the next picture can be started instead of waiting for the current picture to finish.

When a coded picture has been constrained for wavefront processing or when tiles have been used, CTU rows or tiles (respectively) may be byte-aligned in the bitstream and may be preceded by a start code. Additionally, entry points may be provided in the bitstream (e.g. in the slice header) and/or externally (e.g. in a container file). An entry point is a byte pointer or a byte count or a similar straightforward reference mechanism to the start of a CTU row (for wavefront-enabled coded pictures) or a tile. In HEVC, entry points may be specified using entry_point_offset_minus1[i] of the slice header. In the HEVC file format (ISO/IEC 14496-15), the sub-sample information box may provide the information of entry points. In some scenarios, the use of dependent slice segments may be useful instead of or in addition to entry points. A dependent slice segment may be formed for example for a CTU row when a coded picture is constrained for wavefront processing and consequently the start of the dependent slice segment NAL unit may be used to determine CTU row boundaries.

Many video coding standards specify buffering models and buffering parameters for bitstreams. Such buffering models may be called Hypothetical Reference Decoder (HRD) or Video Buffer Verifier (VBV). A standard compliant bitstream complies with the buffering model with a set of buffering parameters specified in the corresponding standard. Such buffering parameters for a bitstream may be explicitly or implicitly signaled. 'Implicitly signaled' means for example that the default buffering parameter values according to the profile and level apply. The HRD/VBV parameters are used, among other things, to impose constraints on the bit rate variations of compliant bitstreams.

Video coding standards use variable-bitrate coding, which is caused for example by the flexibility of the encoder to select adaptively between intra and inter coding techniques for compressing video frames. To handle fluctuation in the bitrate variation of the compressed video, buffering may be used at the encoder and decoder side. Hypothetical Reference Decoder (HRD) may be regarded as a hypothetical decoder model that specifies constraints on the variability within conforming bitstreams, conforming NAL unit streams or conforming byte streams that an encoding process may produce.

A bitstream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback.

An HRD may be a part of an encoder or operationally connected to the output of the encoder. The buffering occupancy and possibly other information of the HRD may be used to control the encoding process. For example, if a coded data buffer in the HRD is about to overflow, the encoding bitrate may be reduced for example by increasing a quantizer step size.

The operation of the HRD may be controlled by HRD parameters, such as buffer size(s) and initial delay(s). The HRD parameter values may be created as part of the HRD process included or operationally connected to encoding. Alternatively, HRD parameters may be generated separately from encoding, for example in an HRD verifier that processes the input bitstream with the specified HRD process and generates such HRD parameter values according to which the bitstream in conforming. Another use for an HRD verifier is to verify that a given bitstream and given HRD parameters actually result into a conforming HRD operation and output.

HRD conformance checking may concern for example the following two types of bitstreams: The first such type of bitstream, called Type I bitstream, is a NAL unit stream containing only the VCL NAL units and filler data NAL units for all access units in the bitstream. The second type of bitstream, called a Type II bitstream, may contain, in addition to the VCL NAL units and filler data NAL units for all access units in the bitstream, additional non-VCL NAL units other than filler data NAL units and/or syntax elements such as leading_zero_8 bits, zero_byte, start_code_prefix_one_3 bytes, and trailing_zero_8 bits that form a byte stream from the NAL unit stream.

Two types of HRD parameters (NAL HRD parameters and VCL HRD parameters) may be used. The HRD parameters may be indicated through video usability information included in the sequence parameter set syntax structure. The HRD parameters may, for example, include buffer size and input bitrate.

Buffering and picture timing parameters (e.g. included in sequence parameter sets and picture parameter sets referred to in the VCL NAL units and in buffering period and picture timing SEI messages) may be conveyed to the HRD, in a timely manner, either in the bitstream (by non-VCL NAL units), or by out-of-band means externally from the bitstream e.g. using a signalling mechanism, such as media parameters included in the media line of a session description formatted e.g. according to the Session Description Protocol (SDP). For the purpose of counting bits in the HRD, only the appropriate bits that are actually present in the bitstream may be counted. When the content of a non-VCL NAL unit is conveyed for the application by some means other than presence within the bitstream, the representation of the content of the non-VCL NAL unit may or may not use the same syntax as would be used if the non-VCL NAL unit were in the bitstream.

The HRD may contain a coded picture buffer (CPB), an instantaneous decoding process, a decoded picture buffer (DPB), and output cropping.

The CPB may operate on decoding unit basis. A decoding unit may be an access unit or it may be a subset of an access unit, such as an integer number of NAL units. Encoders may determine that decoding units are for example tiles or CTU rows (when encoding constraints enabling wavefront processing have been applied). When a decoding unit is a subset of picture, a lower latency in the encoding and decoding may be achieved. The selection of the decoding unit may be indicated by an encoder in the bitstream. For example, decoding unit SEI messages may indicate decoding units as follows: The set of NAL units associated with a decoding unit information SEI message consists, in decoding order, of the SEI NAL unit containing the decoding unit information SEI message and all subsequent NAL units in the access unit up to but not including any subsequent SEI NAL unit containing a decoding unit information SEI message. Each decoding unit may be required to include at least one VCL NAL unit. All non-VCL NAL units associated with a VCL NAL unit may be included in the decoding unit containing the VCL NAL unit.

The HRD may operate as follows. Data associated with decoding units that flow into the CPB according to a specified arrival schedule may be delivered by the Hypothetical Stream Scheduler (HSS). The arrival schedule may be determined by the encoder and indicated for example through picture timing SEI messages, and/or the arrival schedule may be derived for example based on a bitrate which may be indicated for example as part of HRD parameters in video usability information (which may be included in the sequence parameter set). The HRD parameters in video usability information may contain many sets of parameters, each for different bitrate or delivery schedule. The data associated with each decoding unit may be removed and decoded instantaneously by the instantaneous decoding process at CPB removal times. A CPB removal time may be determined for example using an initial CPB buffering delay, which may be determined by the encoder and indicated for example through a buffering period SEI message, and differential removal delays indicated for each picture for example though picture timing SEI messages. The initial arrival time (i.e. the arrival time of the first bit) of the very first decoding unit may be determined to be 0. The initial arrival time of any subsequent decoding unit may be determined to be equal to the final arrival time of the previous decoding unit. Each decoded picture is placed in the DPB. A decoded picture may be removed from the DPB at the later of the DPB output time or the time that it becomes no longer needed for inter-prediction reference. Thus, the operation of the CPB of the HRD may comprise timing of decoding unit initial arrival (when the first bit of the decoding unit enters the CPB), timing of decoding unit removal and decoding of decoding unit, whereas the operation of the DPB of the HRD may comprise removal of pictures from the DPB, picture output, and current decoded picture marking and storage.

The operation of an AU-based coded picture buffering in the HRD can be described in a simplified manner as follows. It is assumed that bits arrive into the CPB at a constant arrival bitrate (when the so-called low-delay mode is not in use). Hence, coded pictures or access units are associated with initial arrival time, which indicates when the first bit of the coded picture or access unit enters the CPB. Furthermore, in the low-delay mode the coded pictures or access units are assumed to be removed instantaneously when the last bit of the coded picture or access unit is inserted into CPB and the respective decoded picture is inserted then to the DPB, thus simulating instantaneous decoding. This time is referred to as the removal time of the coded picture or access unit. The removal time of the first coded picture of the coded video sequence is typically controlled, for example by the Buffering Period Supplemental Enhancement Information (SEI) message. This so-called initial coded picture removal delay ensures that any variations of the coded bitrate, with respect to the constant bitrate used to fill in the CPB, do not cause starvation or overflow of the CPB. It is to be understood that the operation of the CPB is somewhat more sophisticated than what described here, having for example the low-delay operation mode and the capability to operate at many different constant bitrates. Moreover, the operation of the CPB may be specified differently in different standards.

When the bitstream starts at an IRAP picture, for example as a result of accessing a file or stream randomly and starting the decoding from an IRAP picture or tuning into a broadcast, there can be leading pictures (RADL and/or RASL pictures) that follow the IRAP picture in decoding order and precede it in output order. It is possible to discard or omit the decoding of these leading pictures following the RAP picture without affecting the decoding operation, as these leading pictures have no effect on the decoding process of any other pictures.

The buffering period SEI message of HEVC supports indicating two sets of initial buffering delay and initial buffering delay offset parameters, which can be signaled for example at an IRAP picture. One set of values specifies the required initial buffering when the leading pictures associated with the IRAP picture (with which the buffering period SEI message is associated) are present in the bitstream. The other set of values specifies the required initial buffering when leading pictures are not present in the bitstream or are discarded prior to scheduling them with HSS and/or inputting them into the CPB. The HRD operation may be required to be verified with the HRD for both sets of buffering parameters provided in the buffering period SEI message.

The DPB is used, among other things, to control the required memory resources for decoding of conforming bitstreams. There are two reasons to buffer decoded pictures, for references in prediction and for reordering decoded pictures into output order. As H.264/AVC and HEVC provide a great deal of flexibility for both reference picture marking and output reordering, separate buffers for reference picture buffering and output picture buffering could have been a waste of memory resources. Hence, the DPB includes a unified decoded picture buffering process for reference pictures and output reordering. A decoded picture may be removed from the DPB when it is no longer used as reference and needed for output.

In output cropping, lines and/or columns of samples may be removed from decoded pictures according to a cropping rectangle to form output pictures. In HEVC, a cropped decoded picture is defined as the result of cropping a decoded picture based on the conformance cropping window specified in the SPS that is referred to by the corresponding coded picture. Conforming decoders are require to produce numerically identical cropped decoded pictures as the decoding process specified in HEVC. The output cropping of HEVC produces cropped decoded pictures.

The HRD may be used to check conformance of bitstreams and decoders.

Bitstream conformance requirements of the HRD may comprise for example the following and/or alike. The CPB is required not to overflow (relative to the size which may be indicated for example within HRD parameters of video usability information) or underflow (i.e. the removal time of a decoding unit cannot be smaller than the arrival time of the last bit of that decoding unit). The number of pictures in the DPB may be required to be smaller than or equal to a certain maximum number, which may be indicated for example in the sequence parameter set. All pictures used as prediction references may be required to be present in the DPB. It may be required that the interval for outputting consecutive pictures from the DPB is not smaller than a certain minimum.

Decoder conformance requirements of the HRD may comprise for example the following and/or alike A decoder claiming conformance to a specific profile and level may be required to decode successfully all conforming bitstreams specified for decoder conformance provided that all sequence parameter sets and picture parameter sets referred to in the VCL NAL units, and appropriate buffering period and picture timing SEI messages are conveyed to the decoder, in a timely manner, either in the bitstream (by non-VCL NAL units), or by external means. There may be two types of conformance that can be claimed by a decoder: output timing conformance and output order conformance.

To check conformance of a decoder, test bitstreams conforming to the claimed profile and level may be delivered by a hypothetical stream scheduler (HSS) both to the HRD and to the decoder under test (DUT). All pictures output by the HRD may also be required to be output by the DUT and, for each picture output by the HRD, the values of all samples that are output by the DUT for the corresponding picture may also be required to be equal to the values of the samples output by the HRD.

For output timing decoder conformance, the HSS may operate e.g. with delivery schedules selected from those indicated in the HRD parameters of video usability information, or with "interpolated" delivery schedules. The same delivery schedule may be used for both the HRD and DUT. For output timing decoder conformance, the timing (relative to the delivery time of the first bit) of picture output may be required to be the same for both HRD and the DUT up to a fixed delay.

For output order decoder conformance, the HSS may deliver the bitstream to the DUT "by demand" from the DUT, meaning that the HSS delivers bits (in decoding order) only when the DUT requires more bits to proceed with its processing. The HSS may deliver the bitstream to the HRD by one of the schedules specified in the bitstream such that the bit rate and CPB size are restricted. The order of pictures output may be required to be the same for both HRD and the DUT.

In scalable video coding, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

In the following, the term layer is used in context of any type of scalability, including view scalability and depth enhancements. An enhancement layer refers to any type of an enhancement, such as SNR, spatial, multiview, depth, bit-depth, chroma format, and/or color gamut enhancement. A base layer also refers to any type of a base operation point, such as a base view, a base layer for SNR/spatial scalability, or a texture base view for depth-enhanced video coding.

Scalable video (de)coding may be realized with a concept known as single-loop decoding, where decoded reference pictures are reconstructed only for the highest layer being decoded while pictures at lower layers may not be fully decoded or may be discarded after using them for inter-layer prediction. In single-loop decoding, the decoder performs motion compensation and full picture reconstruction only for the scalable layer desired for playback (called the "desired layer" or the "target layer"), thereby reducing decoding complexity when compared to multi-loop decoding. All of the layers other than the desired layer do not need to be fully decoded because all or part of the coded picture data is not needed for reconstruction of the desired layer. However, lower layers (than the target layer) may be used for inter-layer syntax or parameter prediction, such as inter-layer motion prediction. Additionally or alternatively, lower layers may be used for inter-layer intra prediction and hence intra-coded blocks of lower layers may have to be decoded. Additionally or alternatively, inter-layer residual prediction may be applied, where the residual information of the lower layers may be used for decoding of the target layer and the residual information may need to be decoded or reconstructed. In some coding arrangements, a single decoding loop is needed for decoding of most pictures, while a second decoding loop may be selectively applied to reconstruct so-called base representations (i.e. decoded base layer pictures), which may be needed as prediction references but not for output or display.

Some aspects of the SVC extension of the H.264/AVC standard are described next as an example of a scalable video coding standard.

SVC includes support for coarse-grain quality and spatial scalability (CGS), medium-grain quality scalability (MGS) and temporal scalability. In some scalable video coding schemes, data in an enhancement layer can be truncated after a certain location, or even at arbitrary positions, where each truncation position may include additional data representing increasingly enhanced visual quality. Such scalability is referred to as fine-grained (granularity) scalability (FGS). FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC allows the use of single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer. A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer.

At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id". In a draft version of SVC, quality_id was also used for indicating FGS quality layers. For each dependency unit (with the same "dependency_id"), there is a layer with "quality_id" equal to 0 and there can be other layers with "quality_id" greater than 0. These layers with "quality_id" greater than 0 are MGS layers and in a draft version of SVC they were either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVC standard is that MGS NAL units can be freely dropped (but cannot be truncated) without affecting the decodability of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref active_lx_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

In an H.264/AVC bit stream, coded pictures in one coded video sequence uses the same sequence parameter set, and at any time instance during the decoding process, only one sequence parameter set is active. In SVC, coded pictures from different scalable layers may use different sequence parameter sets. If different sequence parameter sets are used, then, at any time instant during the decoding process, there may be more than one active sequence picture parameter set. In the SVC specification, the one for the top layer is denoted as the active sequence picture parameter set, while the rest are referred to as layer active sequence picture parameter sets. Any given active sequence parameter set remains unchanged throughout a coded video sequence in the layer in which the active sequence parameter set is referred to.

As indicated earlier, MVC is an extension of H.264/AVC. Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

In scalable multiview coding, the same bitstream may contain coded view components of multiple views and at least some coded view components may be coded using quality and/or spatial scalability.

Many video encoders utilize the Lagrangian cost function to find rate-distortion optimal coding modes, for example the desired macroblock mode and associated motion vectors. This type of cost function uses a weighting factor or 2 (lambda) to tie together the exact or estimated image distortion due to lossy coding methods and the exact or estimated amount of information required to represent the pixel/sample values in an image area. The Lagrangian cost function may be represented by the equation:

$$C = D + \lambda R$$

where C is the Lagrangian cost to be minimized, D is the image distortion (for example, the mean-squared error between the pixel/sample values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

There are ongoing standardization activities to specify a multiview extension of HEVC (which may be referred to as MV-HEVC), a depth-enhanced multiview extension of HEVC (which may be referred to as 3D-HEVC), and a scalable extension of HEVC (which may be referred to as SHVC). A multi-loop decoding operation has been envisioned to be used in all these specifications.

In scalable video coding schemes utilizing multi-loop (de)coding, decoded reference pictures for each (de)coded layer may be maintained in a decoded picture buffer (DPB). The memory consumption for DPB may therefore be significantly higher than that for scalable video coding schemes with single-loop (de)coding operation. However, multi-loop (de)coding may have other advantages, such as relatively few additional parts compared to single-layer coding.

In scalable video coding with multi-loop decoding, enhanced layers may be predicted from pictures that had been already decoded in the base (reference) layer. Such pictures may be stored in the DPB of base layer and may be marked as used for reference. In certain circumstances, a picture marked as used for reference may be stored in fast memory, in order to provide fast random access to its samples, and may remain stored after the picture is supposed to be displayed in order to be used as reference for prediction. This imposes requirements on memory organization. In order to relax such memory requirements, a conventional design in multi-loop multilayer video coding schemes (such as MVC) assumes restricted utilization of inter-layer predictions. Inter-layer/inter-view prediction for enhanced view is allowed from a decoded picture of the base view located at the same access unit, in other word representing the scene at the same time entity. In such designs, the number of reference pictures available for predicting enhanced views is increased by 1 for each reference view.

It has been proposed that in scalable video coding with multi-loop (de)coding operation pictures marked as used for reference need not originate from the same access units in all layers. For example, a smaller number of reference pictures may be maintained in an enhancement layer compared to the base layer. In some embodiments a temporal inter-layer prediction, which may also be referred to as a diagonal inter-layer prediction or diagonal prediction, can be used to improve compression efficiency in such coding scenarios. In general, diagonal prediction may refer to any prediction where the prediction crosses more than one scalability domain or scalability type. For example, diagonal prediction may refer to prediction that takes place from a different component type (e.g. from depth to texture) and from a different time instant (e.g. from a picture of a previous access unit in (de)coding order to a picture in the current access unit).

A decoding process may be specified with reference to a layer identifier list TargetDecLayerIdList, which specifies the list of layer identifier values, such as nuh_layer_id values. The layer identifier values may be in TargetDecLayerIdList in increasing order of the NAL units to be decoded. TargetDecLayerIdList may include the layer identifiers for layers that are intended to be output by the decoder as well as all the layers on which the output layers depend in the decoding process.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). SHVC uses a reference index based design, where an inter-layer reference picture can be included in a one or more reference picture lists of the current picture being coded or decoded (as described above). In an earlier draft of SHVC, another design was also investigated, which may be referred to as IntraBL or TextureRL, where a specific coding mode, e.g. in CU level, is used for using decoded/reconstructed sample values of a reference layer picture for prediction in an enhancement layer picture. The SHVC development has concentrated on development of spatial and coarse grain quality scalability.

Both MV-HEVC and SHVC use reference-index-based scalability and are therefore similar to each other. The high-level syntax, semantics and decoding operation of MV-HEVC and SHVC has been aligned to a great extent. A difference between SHVC and MV-HEVC is that SHVC enables spatial scalability and hence includes upsampling of sample arrays and motion field mapping or upsampling.

It is possible to use many of the same syntax structures, semantics, and decoding processes for MV-HEVC and reference-index-based SHVC. Furthermore, it is possible to use the same syntax structures, semantics, and decoding processes for depth coding too. Hereafter, term scalable multiview extension of HEVC (SMV-HEVC) is used to refer to a coding process, a decoding process, syntax, and semantics where largely the same (de)coding tools are used regardless of the scalability type and where the reference index based approach without changes in the syntax, semantics, or decoding process below the slice header is used. SMV-HEVC might not be limited to multiview, spatial, and coarse grain quality scalability but may also support other types of scalability, such as depth-enhanced video.

For the enhancement layer coding, the same concepts and coding tools of HEVC may be used in SHVC, MV-HEVC, and/or SMV-HEVC. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or SMV-HEVC codec.

An access unit in SHVC, MV-HEVC and SMV-HEVC may be defined as a set of NAL units that are associated with each other according to a specified classification rule, are consecutive in decoding order, and contain the VCL NAL units of all coded pictures associated with the same output time and their associated non-VCL NAL units.

In MV-HEVC, SMV-HEVC, and reference index based SHVC solution, the block level syntax and decoding process are not changed for supporting inter-layer texture prediction. Only the high-level syntax has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. IRAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in MV-HEVC, SMV-HEVC, and a reference index based SHVC solution may be initialized using a specific process in which the inter-layer reference picture(s), if any, may be included in the initial reference picture list(s). are constructed as follows. For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information, such as the RefLayerId[i] variable derived from the VPS extension as described above. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

In the coding and/or decoding process, the inter-layer reference pictures may be treated as a long-term reference pictures.

In SMV-HEVC and a reference index based SHVC solution, inter-layer motion parameter prediction may be performed by setting the inter-layer reference picture as the collocated picture for TMVP derivation. A motion field mapping process between two layers may be performed for example to avoid block level decoding process modification in TMVP derivation. A motion field mapping could also be performed for multiview coding, but a present draft of MV-HEVC (JCT-3V document JCT3V-E1004) does not include such a process. The use of the motion field mapping feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

In a motion field mapping process for spatial scalability, the motion field of the upsampled inter-layer reference picture is attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture. The block size used for the derivation of the motion parameters and/or prediction mode in the upsampled inter-layer reference picture may be for example 16×16. The 16×16 block size is the same as in HEVC TMVP derivation process where compressed motion field of reference picture is used.

In H.265/HEVC, the sps_temporal_mvp_enabled_flag indicates whether the TMVP mechanism may be in use (when the flag is equal to 1) or is not in use (when the flag is equal to 0) in the HEVC base layer/view (with nuh_layer_id equal to 0). When sps_temporal_mvp_enabled_flag is equal to 1, the slice_temporal_mvp_enabled_flag is present in the slice header and indicates if the TMVP mechanism is in use for the current picture.

There may be "black box" implementations of scalable extensions of HEVC, where the base layer decoding/coding is implemented with an existing HEVC v1 implementation without changes. Such an implementation of base layer decoding/coding would store motion fields only if sps_temporal_mvp_enabled_flag is equal to 1.

Base layer motion fields may be used for either or both of the following two purposes: temporal motion vector prediction between pictures of the base layer and inter-layer motion prediction. If the base layer motion fields are used only for inter-layer motion prediction, the memory used for base layer motion fields could be de-allocated or used for other purposes after decoding of the access unit has been finished (or, more accurately, decoding of all layers within the access unit that may use the abase layer as motion prediction reference has been finished). However, when sps_temporal_mvp_enabled_flag is used to control the storage of base layer motion fields, it cannot be used to indicate that base layer motion fields are used only for inter-layer motion prediction and not for temporal motion vector prediction within the base layer.

In a textureRL based SHVC solution, the inter-layer texture prediction may be performed at CU level for which a new prediction mode, named as textureRL mode, is introduced. The collocated upsampled base layer block is used as the prediction for the enhancement layer CU coded in textureRL mode. For an input CU of the enhancement layer encoder, the CU mode may be determined among intra, inter and textureRL modes, for example. The use of the textureRL feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred. Furthermore, the textureRL may be selected by the encoder at CU level and may be indicated in the bitstream per each CU for example using a CU level flag (texture_rl_flag) which may be entropy-coded e.g. using context adaptive arithmetic coding (e.g. CABAC).

The residue of textureRL predicted CU may be coded as follows. The transform process of textureRL predicted CU may be the same as that for the intra predicted CU, where a discrete sine transform (DST) is applied to TU of luma component having 4×4 size and a discrete cosine transform (DCT) is applied to the other type of TUs. Transform coefficient coding of a textureRL-predicted CU may be the same to that of inter predicted CU, where no_residue_flag may be used to indicate whether the coefficients of the whole CU are skipped.

In a textureRL based SHVC solution, in addition to spatially and temporally neighboring PUs, the motion parameters of the collocated reference-layer block may also be used to form the merge candidate list. The base layer merge candidate may be derived at a location collocated to the central position of the current PU and may be inserted in a particular location of the merge list, such as as the first candidate in merge list. In the case of spatial scalability, the reference-layer motion vector may be scaled according to the spatial resolution ratio between the two layers. The pruning (duplicated candidates check) may be performed for each spatially neighboring candidate with collocated base layer candidate. For the collocated base layer merge candidate and spatial merge candidate derivation, a certain maximum number of merge candidates may be used; for example four merge candidates may be selected among candidates that are located in six different positions. The temporal merge candidate may be derived in the same manner as done for HEVC merge list. When the number of candidates does not reach to maximum number of merge candidates (which may be determined by the encoder and may be indicated in the bitstream and may be assigned to the variable MaxNumMergeCand), the additional candidates, including combined bi-predictive candidates and zero merge candidates, may be generated and added at the end of the merge list, similarly or identically to HEVC merge list construction.

In some coding and/or decoding arrangements, a reference index based scalability and a block-level scalability approach, such a textureRL based approach, may be combined. For example, multiview-video-plus-depth coding and/or decoding may be performed as follows. A textureRL approach may be used between the components of the same view. For example, a depth view component may be inter-layer predicted using a textureRL approach from a texture view component of the same view. A reference index based approach may be used for inter-view prediction, and in some embodiments inter-view prediction may be applied only between view components of the same component type.

Work is also ongoing to specify depth-enhanced video coding extensions to the HEVC standard, which may be referred to as 3D-HEVC, in which texture views and depth views may be coded into a single bitstream where some of the texture views may be compatible with HEVC. In other words, an HEVC decoder may be able to decode some of the texture views of such a bitstream and can omit the remaining texture views and depth views.

Other types of scalability and scalable video coding include bit-depth scalability, where base layer pictures are coded at lower bit-depth (e.g. 8 bits) per luma and/or chroma sample than enhancement layer pictures (e.g. 10 or 12 bits), chroma format scalability, where enhancement layer pictures provide higher fidelity and/or higher spatial resolution in chroma (e.g. coded in 4:4:4 chroma format) than base layer pictures (e.g. 4:2:0 format), and color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut. Additionally or alternatively, depth enhancement layers or views, providing distance and/or disparity information, and/or layers with alpha pictures, providing transparency information, and/or other types of auxiliary picture layers may be provided as scalable layers. Any number of such other types of scalability may be realized for example with a reference index based approach or a block-based approach e.g. as described above.

Another categorization of scalable coding is based on whether the same or different coding standard or technology is used as the basis for the base layer and enhancement layers. Terms hybrid codec scalability or standards scalability may be used to indicate a scenario where one coding standard or system is used for some layers, while another coding standard or system is used for some other layers. For example, the base layer may be AVC-coded, while one or more enhancement layers may be coded with an HEVC extension, such as SHVC or MV-HEVC. It is possible that more than one layer is of a first coding standard or system, such as AVC or its extensions like MVC, and/or more than one layer is a second coding standard. It is possible that layers represent more than two coding standards. For example, the base layer may be coded with AVC, an enhancement layer may be coded with MVC and represent a non-base view, and either or both of the previous layers may be enhanced by a spatial or quality scalable layer coded with SHVC.

In many video communication or transmission systems, transport mechanisms and multimedia container file formats there are mechanisms to transmit or store the base layer separately from the enhancement layer(s). It may be considered that layers are stored in or transmitted through separate logical channels. Examples are provided in the following:
1. ISO Base Media File Format (ISOBMFF, ISO/IEC International Standard 14496-12): Base layer can be stored as a track and each enhancement layer can be stored in another track. Similarly, in a hybrid codec scalability case, a non-HEVC-coded base layer can be stored as a track (e.g. of sample entry type 'avc1'), while the enhancement layer(s) can be stored as another track which is linked to the base-layer track using so-called track references.
2. Real-time Transport Protocol (RTP): either RTP session multiplexing or synchronization source (SSRC) multiplexing can be used to logically separate different layers.
3. MPEG-2 transport stream (TS): Each layer can have a different packet identifier (PID) value.

Many video communication or transmission systems, transport mechanisms and multimedia container file formats provides means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

A way of categorizing different types of prediction is to consider across which domains or scalability types the prediction crosses. This categorization may lead into one or more of the following types of prediction, which may also sometimes be referred to as prediction directions:

Temporal prediction e.g. of sample values or motion vectors from an earlier picture usually of the same scalability layer, view and component type (texture or depth).

Inter-view prediction (which may be also referred to as cross-view prediction) referring to prediction taking place between view components usually of the same time instant or access unit and the same component type.

Inter-layer prediction referring to prediction taking place between layers usually of the same time instant, of the same component type, and of the same view.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

Prediction approaches using image information from a previously coded image can also be called as inter prediction methods. Inter prediction may sometimes be considered to only include motion-compensated temporal prediction, while it may sometimes be considered to include all types of prediction where a reconstructed/decoded block of samples is used as prediction source, therefore including conventional inter-view prediction for example. Inter prediction may be considered to comprise only sample prediction but it may alternatively be considered to comprise both sample and syntax prediction. As a result of syntax and sample prediction, a predicted block of pixels of samples may be obtained.

If the prediction, such as predicted variable values and/or prediction blocks, is not refined by the encoder using any form of prediction error or residual coding, prediction may be referred to as inheritance. For example, in the merge mode of HEVC, the prediction motion information is not refined e.g. by (de)coding motion vector differences, and hence the merge mode may be considered as an example of motion information inheritance.

Video coding schemes may utilize a prediction scheme between pictures. As discussed, prediction may be performed in the encoder for example through a process of block partitioning and block matching between a currently coded block (Cb) in the current picture and a reference block (Rb) in the picture which is selected as a reference. Therefore parameters of such prediction can be defined as motion information (MI) comprising for example on or more of the following: spatial coordinates of the Cb (e.g. coordinates of the top-left pixel of the Cb); a reference index refIdx or similar which specifies the picture in the reference picture list which is selected as reference picture; a motion vector (MV) specifying displacement between the spatial coordinated of the Cb and Rb in the reference picture; and the size and shape of the motion partition (the size and shape of the matching block).

A motion field associated with a picture may be considered to comprise a set of motion information produced for every coded block of the picture. A motion field may be accessible by coordinates of a block, for example. A motion field may be used for example in Temporal motion vector prediction or any other motion prediction mechanism where a source or a reference for prediction other than the current decoded/coded picture is used.

Video coding schemes may utilize a temporal motion vector prediction scheme, such as the temporal direct mode in H.264/AVC or the temporal motion vector predictor (TMVP) candidate in the merge and AVMP modes of H.265/HEVC. In a temporal motion vector prediction scheme, at least a subset of the motion information of another picture is used to derive motion information or motion information predictor(s) for the current picture. Temporal motion vector prediction therefore requires storage of motion information of reference pictures.

In H.265/HEVC, the sequence parameter set includes the sps_temporal_mvp_enabled_flag syntax element, which indicates if the slice header includes the slice_temporal_mvp_enabled flag. If sps_temporal_mvp_enabled_flag is equal to 0, no temporal motion vector predictors are used in the coded video sequence. slice_temporal_mvp_enabled_flag specifies whether temporal motion vector predictors can be used for inter prediction. When slice_temporal_mvp_enabled_flag is equal to 1, there are syntax elements in the slice header that identify the collocated picture used to derive the temporal motion vector predictors.

Temporal motion vector prediction can also be used in scalable video coding when a motion field of an inter-layer reference picture is used to predict or derive motion information of the current picture.

Motion field mapping may be used for example when an inter-layer reference picture is of different spatial resolution than the current picture. In a motion field mapping process for spatial scalability, the motion field of the upsampled inter-layer reference picture is attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture.

The storage of motion information may be performed for example on the basis of the minimum size of a motion partition, e.g. 4×4 (of luma samples) in the case of H.264/AVC. In another example, the spatial granularity of motion information may be pre-defined for example in a coding standard and the coded motion information may be resampled or converted to that spatial granularity. For example, motion information can be stored for 16×16 blocks (of luma samples) in H.265/HEVC.

In scalable and/or multiview video coding, such as SHVC or MV-HEVC, a discardable picture may be defined as a coded picture is not used as a reference picture for inter prediction and is not used as an inter-layer reference picture in the decoding process of subsequent pictures in decoding order. A discardable picture may be indicated e.g. by a syntax element discardable_flag, which may be included e.g. in a slice segment header. discardable_flag equal to 1 specifies that the current coded picture is a discardable picture. discardable_flag equal to 0 specifies that the coded picture may be used as a reference picture for inter prediction and may be used as an inter-layer reference picture in the decoding process of subsequent pictures in decoding order. It may be specified that, when not present, the value of discardable_flag is inferred to be equal to 0.

In scalable and/or multiview coding, such as SHVC and MV-HEVC, a picture in a reference layer that need to be decoded even if the reference layer is not among output layers may be referred to as a key picture. A picture in an output layer may for example use a key picture as a reference for inter-layer prediction, or another picture in the reference layer is used as a reference for inter-layer prediction of a picture in an output layer and the key picture may be used as a reference for that another picture. Pictures in a reference layer that are not key pictures may be referred to as non-key pictures.

Non-key pictures may be classified or characterized for example as follows:
  A non-key picture that is not used versus a non-key picture that may be used for sample prediction of other base-layer (BL) non-key pictures. (If a non-key picture is not used for sample prediction of other BL pictures, it need not be maintained in the DPB if the base layer is not among output layers. If a non-key picture is used for sample prediction of other BL pictures, in a single-loop decoding operation it needs to be replaced by the respective decoded EL picture, which introduces drift.)
  A non-key picture that is not used versus a non-key picture that may be used for motion prediction of BL key pictures and/or other BL non-key pictures.
  A non-key picture that is not used versus a non-key picture that may be used for inter-layer sample prediction.

A non-key picture that is not used versus a non-key picture that may be used for inter-layer motion prediction.

An encoder may indicate in the bitstream whether a picture is a key picture or a non-key picture and/or it may indicate for a non-key picture one or more of the above-mentioned characteristics. Some detailed examples of indicating prediction characteristics follow.

In a first example, 2-bit fixed-length coded syntax element, i.e. u(2), here referred to pic_ref_idc, is included in the syntax for a picture, for example in the slice segment header syntax structure, for example by taking certain two bit positions of the slice_reserved[i] syntax element of HEVC slice segment header into use. The semantics of pic_ref_idc may be specified for example as follows:

pic_ref_idc equal to 3 indicates a discardable picture and specifies that the coded picture is not used as a reference picture for inter prediction and is not used as an inter-layer reference picture in the decoding process of subsequent pictures in decoding order pic_ref_idc equal to 2 indicates an intra-layer non-reference picture and specifies that the picture is not used as a reference picture for inter prediction of subsequent pictures in decoding order within the same layer and that the picture may be used as an inter-layer (sample or motion) prediction reference.

pic_ref_idc equal to 1 indicates a non-output-layer skip (NOLS) picture and specifies that the picture may be used as a reference for inter prediction of subsequent pictures in decoding order that have pic_ref_idc equal to 1 or 3 until the next picture in decoding order with pic_ref_idc equal to 0 and the same or lower TemporalId value than that of the current NOLS picture. pic_ref_idc equal to 1 also specifies that the picture is not used as a reference for inter-layer prediction and not used as a reference for inter prediction of any picture with pic_ref_idc equal to 0.

pic_ref_idc equal to 0 indicates a key picture and specifies that the picture may be used as a reference for inter prediction of subsequent pictures in decoding order within the same layer and may be used as a reference for inter-layer prediction.

A picture marked as intra-layer non-reference picture and either not used or no longer used as a reference picture for inter-layer prediction may be marked as "unused for reference".

The signaling of the first example or any similar signaling enabling the identification of NOLS pictures enables removal of NOLS pictures from layers that are not among output layers. It may be required that either all discardable pictures and NOLS pictures (of a certain layer) are removed between two key pictures (of the same certain layer) or that no NOLS pictures between two key pictures (of the same layer) are removed. The removal of NOLS pictures may done by different entities including but not limited to the following:

The removal may be done by a decoder or a bitstream pre-processor connected to a decoder, which have knowledge on the output layer set under which the decoding process operates. Consequently, the output layers can be concluded from the output layer set in use and NOLS pictures from layers that are not output but which are among the decoded layers can be removed. Such removal of NOLS pictures reduces decoding complexity and the memory required for decoded picture buffering.

The removal may be done by an entity modifying the bitstream, such as a media-aware network element (MANE). The NOLS pictures may be removed from such layers that are not output layers among any specified output layer sets. The entity may modify the indicated output layer sets, for example based on receivers' properties and/or mode requests, to exclude certain output layer sets originally present in the indications, e.g. in VPS. For example, those output layer sets that are concluded to be unused among receivers or are concluded to be suboptimal for receivers' properties and/or mode requests may be removed. Consequently, the number of layers from which NOLS pictures can be removed may be increased.

A second example is otherwise the same as the first example, but it is specified that NOLS pictures may be used for inter-layer motion prediction but are not used for inter-layer sample prediction. Consequently, only the picture motion field of the NOLS pictures need to be decoded when the layer containing the NOLS pictures is not a target output layer, while the sample arrays of these NOLS pictures need not be decoded or need not be maintained in the DPB.

In a third example, NOLS pictures of both the first and second example are separately indicated. For example, in the 2-bit pic_ref_idc syntax element, a value indicating an intra-layer non-reference picture may be replaced by one of the NOLS picture types (of either example 1 or example 2).

In a fourth example, the NOLS picture is otherwise specified as in the first, second or third example, but the semantics of NOLS pictures are independent of the TemporalId value.

A HRD for a scalable video bitstream may operate similarly to a HRD for a single-layer bitstream. However, some changes may be required or desirable, particularly when it comes to the DPB operation in multi-loop decoding of a scalable bitstream. It is possible to specify DPB operation for multi-loop decoding of a scalable bitstream in multiple ways. In a layer-wise approach, each layer may have conceptually its own DPB, which may otherwise operate independently but some DPB parameters may be provided jointly for all the layer-wise DPBs and picture output may operate synchronously so that the pictures having the same output time are output at the same time or, in output order conformance checking, pictures from the same access unit are output next to each other. In another approach, referred to as the resolution-specific approach, layers having the same key properties share the same sub-DPB. The key properties may include one or more of the following: picture width, picture height, chroma format, bitdepth, color format/gamut.

It may be possible to support both layer-wise and resolution-specific DPB approach with the same DPB model, which may be referred to as the sub-DPB model. The DPB is partitioned into several sub-DPBs, and each sub-DPB is otherwise managed independently but some DPB parameters may be provided jointly for all the sub-DPBs and picture output may operate synchronously so that the pictures having the same output time are output at the same time or, in output order conformance checking, pictures from the same access unit are output next to each other.

A coding standard may include a sub-bitstream extraction process, and such is specified for example in SVC, MVC, and HEVC. The sub-bitstream extraction process relates to converting a bitstream, typically by removing NAL units, to a sub-bitstream, which may also be referred to as a bitstream subset. The sub-bitstream still remains conforming to the standard. For example, in HEVC, the bitstream created by excluding all VCL NAL units having a TemporalId value greater than a selected value and including all other VCL NAL units remains conforming. In HEVC, the sub-bitstream extraction process takes a TemporalId and/or a list of nuh_layer_id values as input and derives a sub-bitstream (also known as a bitstream subset) by removing from the bitstream all NAL units with TemporalId greater than the input TemporalId value or nuh_layer_id value not among the values in the input list of nuh_layer_id values.

A coding standard or system may refer to a term operation point or alike, which may indicate the scalable layers and/or sub-layers under which the decoding operates and/or may be associated with a sub-bitstream that includes the scalable layers and/or sub-layers being decoded. Some non-limiting definitions of an operation point are provided in the following.

In HEVC, an operation point is defined as bitstream created from another bitstream by operation of the sub-bitstream extraction process with the another bitstream, a target highest TemporalId, and a target layer identifier list as inputs.

In SHVC and MV-HEVC, an operation point definition may include a consideration a target output layer set. In SHVC and MV-HEVC, an operation point may be defined as a bitstream that is created from another bitstream by operation of the sub-bitstream extraction process with the another bitstream, a target highest TemporalId, and a target layer identifier list as inputs, and that is associated with a set of target output layers.

In MVC, an operation point may be defined as follows: An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process with tIdTarget equal to the temporal_id value and viewIdTargetList consisting of the set of view_id values as inputs. More than one operation point may be associated with the same bitstream subset. When "an operation point is decoded", a bitstream subset corresponding to the operation point may be decoded and subsequently the target output views may be output.

When a bitstream, such as an HEVC bitstream, starts at a CRA or BLA picture, it is not possible to decode the RASL pictures associated with the CRA or BLA picture correctly, because some reference pictures of these RASL pictures might not have been decoded. These RASL pictures are therefore not output by the decoding process and/or HRD. It may also be possible to provide external means to impact the decoding process, such as an interface or an API to the decoder, through which the decoder can be controlled to treat a CRA picture similarly to a BLA picture or a CRA picture initiating a bitstream and hence omit the output of the associated RASL pictures. The decoding process may for example associate a variable NoRaslOutputFlag with each IRAP picture and derive a value for the variable for example as follows:

If the current picture is an IDR picture, a BLA picture, the first picture in the bitstream in decoding order, or the first picture that follows an end of sequence NAL unit in decoding order, the variable NoRaslOutputFlag is set equal to 1.

Otherwise, if some external means are available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.

Otherwise, the variable HandleCraAsBlaFlag is set equal to 0 and the variable NoRaslOutputFlag is set equal to 0.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The SVC and MVC file formats are specified as amendments to the AVC file format. The ISO file format is the base for derivation of all the above mentioned file formats (excluding the ISO file format itself). These file formats (including the ISO file format itself) are generally called the ISO family of file formats.

The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track box. A track may be one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, typically one media track is selected. Samples of a track may be implicitly associated with sample numbers that are incremented by 1 in the indicated decoding order of samples. The first sample in a track may be associated with sample number 1.

An example of a simplified file structure according to the ISO base media file format may be described as follows. The file may include the moov box and the mdat box and the moov box may include one or more tracks that correspond to video and audio, respectively.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, also included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used when recording content to ISO files in order to avoid losing data if a recording application crashes, runs out of memory space, or some other incident occurs. Without movie fragments, data loss may occur because the file format may typically require that all metadata, e.g., the movie box, be written in one contiguous area of the file. Furthermore, when recording a file, there may not be sufficient amount of memory space (e.g., RAM) to buffer a movie box for the size of the storage available, and re-computing the contents of a movie box when the movie is closed may be too slow. Moreover, movie fragments may enable simultaneous recording and playback of a file using a regular ISO file parser. Finally, a smaller duration of initial buffering may be required for progressive downloading, e.g., simultaneous reception and playback of a file, when movie fragments are used and the initial movie box is smaller compared to a file with the same media content but structured without movie fragments.

The movie fragment feature may enable splitting the metadata that conventionally would reside in the movie box into multiple pieces. Each piece may correspond to a certain period of time for a track. In other words, the movie fragment feature may enable interleaving file metadata and media data. Consequently, the size of the movie box may be limited and the use cases mentioned above be realized.

In some examples, the media samples for the movie fragments may reside in an mdat box, as usual, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification.

ISO/IEC 14496-15 specifies Aggregators and Extractors are file format internal structures enabling efficient grouping of NAL units or extraction of NAL units from other tracks. While presently ISO/IEC 14496-15 specifies the use of Aggregators and Extractors for AVC extensions, such as SVC and MVC, similar NAL-unit-like structures could be applied for HEVC extensions too. Aggregators and Extractors use the NAL unit syntax, but their payload has not necessarily been subject to start code emulation prevention. These structures are seen as NAL units in the context of the sample structure of the file format. While accessing a sample, Aggregators must be removed (leaving their contained or referenced NAL Units) and Extractors must be replaced by the data they reference. Aggregators and Extractors must not be present in a stream outside the file format.

ISO/IEC 14496-15 supports aggregation of multiple NAL units into one aggregator NAL unit (the NAL unit type value of which was taken from the value range that is unspecified in the H.264/AVC standard). Aggregator NAL units can both aggregate by inclusion NAL units within them (within the size indicated by their length) and also aggregate by reference NAL units that follow them (within the area indicated by the additional_bytes field within them). When the stream is scanned by an AVC file reader, only the included NAL units are seen as "within" the aggregator. This permits, for example, an AVC file reader to skip a whole set of unneeded SVC or MVC NAL units. SVC NAL units refer to the SVC specific NAL units for which the NAL unit type values are reserved by the AVC specification. MVC NAL units refer to the MVC specific NAL units for which the NAL unit type values are reserved by the AVC specification. Similarly, if AVC NAL units are aggregated by reference, the AVC reader will not skip them and they remain in-stream for that reader.

Another benefit achieved through using aggregators is presented in this paragraph. H.264/AVC, HEVC and their extensions allow an access unit to be coded in multiple NAL units. The number of NAL units can vary. In order to address a dependency representation (of SVC), a layer representation (of SVC) or a coded view (of MVC) as one logical unit by an ISOMBFF parser, one or more aggregator NAL units can be used. Aggregators help in organizing file format samples (e.g. access units) in constant patterns of number of NAL units per a logical scalability unit. For example, if all base layer NAL units of an access unit are aggregated into one aggregator, it can be considered that the base layer consists of one NAL unit. Some of the scalability and/or multiview properties are indicated in SVC and MVC file formats through a concept called tiers, which are specified through the sample grouping mechanism of ISOBMFF. Each Scalable Group Entry or Multiview Group Entry, included as a sample group description entry, documents a subset of the SVC stream or the MVC stream, respectively. Each of the subsets is associated with a tier and may contain one or more operating points. The number of Scalable Group Entry or Multiview Group Entry is equal to the number of different NAL unit sequence pattern to tier assignments. For example, one sample group description may indicate that a file format sample consists of one NAL unit belonging to a first tier and another NAL unit belonging to a second tier.

Another sample group description entry would be needed for a file format sample consisting of two NAL units belonging to the first tier followed by a NAL unit belonging to the second tier. However, if an aggregator is used to aggregate the two NAL units belonging to the first tier, they are considered as one NAL unit in the sample group description entries. Consequently, aggregators help in reducing the amount of signaling needed to specify tiers.

Two forms of aggregation are supported currently by the aggregators. In the first, all samples that are aggregated are included within the aggregator NAL unit themselves. This form of aggregation is called aggregation by inclusion. In the second form, all aggregated samples which are always stored as continued bytes in the ISOMBFF storage format are signaled by reference. The aggregated NAL units are not contained within the Aggregator NAL unit but are referred to from within the Aggregator NAL unit. The syntax of the aggregator NAL unit includes an additional_bytes field, which indicates the number of bytes aggregated by reference. It is possible to have a single aggregator that aggregates both by inclusion and by reference by defining the length or size of the aggregator to include NAL units and by defining a non-zero additional_bytes value to aggregate NAL units by reference.

HEVC enable encoders and/or other entities, such as a splicers, to control picture output from the decoding process and/or HRD with the values of the pic_output_flag and/or no_output_of prior_pics_flag syntax elements as described in the following.

The pic_output_flag syntax element, which may be present in the slice segment header, affects the derivation of the variable PicOutputFlag. Each decoded picture is associated with a value of PicOutputFlag (which may differ from the value of PicOutputFlag of other pictures). PicOutputFlag is set to 1 for pictures that are not RASL pictures associated with an IRAP picture with NoRaslOutputFlag equal to 1. Otherwise, PicOutputFlag is set to be equal to pic_output_flag. Pictures with PicOutputFlag equal to 0 are not output. Picture with PicOutputFlag equal to 1 are output, unless they become affected by NoOutputOfPriorPicsFlag, as explained in the following.

The no_output_of prior_pics_flag syntax element, which is present for IRAP pictures in the slice segment header, affects the output of previously-decoded pictures in the decoded picture buffer after the decoding of an IDR or a BLA picture that is not the first picture in the bitstream as follows: The removal of pictures from the DPB before decoding of the current picture (but after parsing the slice header of the first slice of the current picture) happens instantaneously at the CPB removal time of the first decoding unit of access unit n (containing the current picture) and proceeds as follows:
  The reference picture set of the current picture is decoded.
  When the current picture is an IRAP picture with NoRaslOutputFlag equal to 1 that is not picture 0, the following ordered steps are applied:
    The variable NoOutputOfPriorPicsFlag is derived as follows:
      If the current picture is a CRA picture, NoOutputOfPriorPicsFlag is set equal to 1 (regardless of the value of no_output_of prior_pics_flag).
      Otherwise, if the width, height, or the DPB capacity of the current picture differ from those of the previous picture, NoOutputOfPriorPicsFlag may but need not be set equal to 1 or may be set equal to no_output_of_prior_pics_flag.
      Otherwise, NoOutputOfPriorPicsFlag is set equal to no_output_of prior_pics_flag.
    The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0.
  When both of the following conditions are true for any pictures k in the DPB, all such pictures k in the DPB are removed from the DPB:
    Picture k is marked as "unused for reference".
    Picture k has PicOutputFlag equal to 0 or its DPB output time is less than or equal to the CPB removal time of the first decoding unit (denoted as decoding unit m) of the current picture n.
  For each picture that is removed from the DPB, the DPB fullness is decremented by one.

Splicers or other entities concatenating coded video sequences or bitstreams may set no_output_of_prior_pics_flag equal to 1 for example when the output of a spliced coded video sequence might overlap with the output of some picture in the previous coded video sequence.

A coded video sequence (CVS) in scalable extensions of HEVC may be specified as follows: A coded video sequence is a sequence of access units that consists, in decoding order, of an TRAP access unit containing an IRAP picture having nuh_layer_id equal to 0 and NoRaslOutputFlag equal to 1, followed by zero or more access units that are not IRAP access units containing an IRAP picture having nuh_layer_id equal to 0 and NoRaslOutputFlag equal to 1, including all subsequent access units up to but not including any subsequent access unit that is an IRAP access unit containing an IRAP picture having nuh_layer_id equal to 0 and NoRaslOutputFlag equal to 1.

Referring back to the POC coding and derivation in H.265/HEVC, the following design decisions that may affect the POC derivation or coding have been made for H.265/HEVC scalable and/or multiview extensions:
  IRAP pictures need not be aligned. In other words, when one layer has an IRAP picture in an AU, it is not required that the other layers have an IRAP picture.
  An access unit needs not contain pictures in all layers (which are represented by the bitstream).
  The bitstream may contain independently coded layers (other than the base layer) that do not use inter-layer prediction from any other layer. For example, an auxiliary picture layer may be independent of the base layer.

As a consequence the following features or use cases are enabled.

Adaptive layer up-switching and down-switching refers to a process where a middle-box and/or a decoder may determine at any access unit that the highest layer is no longer forwarded and/or decoded, respectively (or, more generally, how many layers are forwarded and/or decoded, respectively)—this may be referred to as layer down-switching. Likewise, a middle-box and/or a decoder may determine to start forwarding and/or decoding, respectively, an additional layer (the next higher than the highest layer forwarded and/or decoded, respectively, before) and that additional layer has an IRAP picture—this may be referred to as layer up-switching.

Adaptive Resolution Change (ARC) refers to dynamically changing the resolution within the video sequence, for example in video-conferencing use-cases. Adaptive Resolution Change may be used e.g. for better network adaptation and error resilience. For better adaptation to changing network requirements for different content, it may be desired to be able to change both the temporal/spatial resolution in addition to quality. The Adaptive Resolution Change may also enable a fast start, wherein the start-up time of a session may be able to be increased by first sending a low resolution frame and then increasing the resolution. The Adaptive Resolution Change may further be used in composing a conference. For example, when a person starts speaking, his/her corresponding resolution may be increased. Doing this with an IDR frame may cause a "blip" in the quality as IDR frames need to be coded at a relatively low quality so that the delay is not significantly increased.

In the following some details of an adaptive resolution change use-cases are described in more detail using the scalable video coding framework. As scalable video coding inherently includes mechanisms for resolution change, the adaptive resolution change could efficiently be supported as indicated in FIG. 4.

Figure 4:
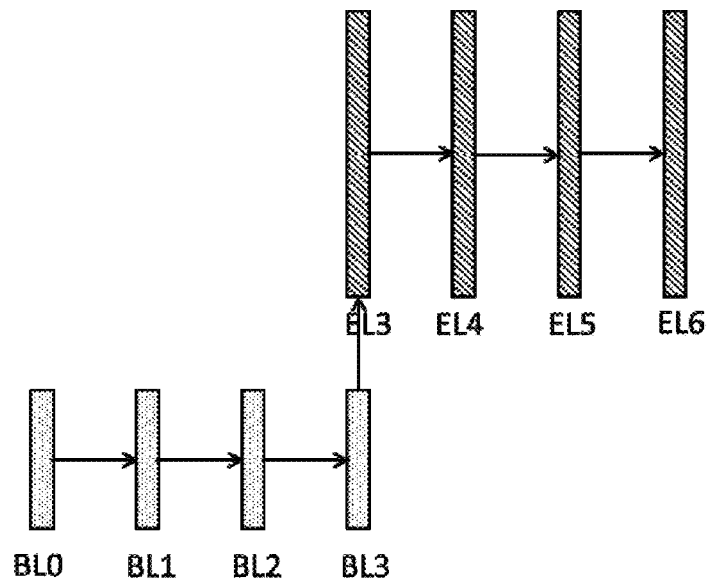
FIG. 4 shows an example of scalable video coding.

In the example of FIG. 4, switching happens at picture 3 (BL3) and the decoder receives the bitstream with following pictures: BL0-BL1-BL2-BL3-EL3-EL4-EL6-EL6 . . . Pictures BL0-BL3 are pictures of a base layer and pictures EL3-EL6 . . . are pictures of an enhancement layer. In this example pictures BL0-BL3 and EL4-EL6 use only intra-layer prediction and the picture EL3 uses either or both intra prediction and inter-layer prediction.

A sequence level signaling may be used to indicate the decoder if there is a resolution change in the bitstream. This may be performed e.g. by using a flag single_layer_for_non_irap_flag. The single_layer_for_non_irap_flag may be used to signal that a coded video sequence is constrained to perform the adaptive resolution change operation. The single_layer_for_non_irap_flag specifically indicates that, except for switching pictures, each AU in the sequence contains a single picture from a single layer (which may or may not be BL picture); and that access units where switching happens include pictures from two layers, the EL picture in such an access unit is an IRAP picture, and inter-layer prediction may be used for the EL IRAP picture.

Indicating single_layer_for_non_irap_flag in VPS allows the decoder to know that scalability is not used except for achieving resolution change, so that the decoder resources can be allocated accordingly upon a session start.

Scalable bitstreams with IRAP pictures or similar that are not aligned across layers may be used for example more frequent IRAP pictures can be used in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A layer-wise start-up mechanism may generate unavailable pictures for the reference pictures of the first picture in decoding order in a particular enhancement layer. Alternatively, a decoder may omit the decoding of pictures preceding the IRAP picture from which the decoding of a layer can be started. These pictures that may be omitted may be specifically labeled by the encoder or another entity within the bitstream. For example, one or more specific NAL unit types may be used for them. These pictures may be referred to as cross-layer random access skip (CL-RAS) pictures.

A layer-wise start-up mechanism may start the output of enhancement layer pictures from an IRAP picture in that enhancement layer, when all reference layers of that enhancement layer have been initialized similarly with an IRAP picture in the reference layers. In other words, any pictures (within the same layer) preceding such an IRAP picture in output order might not be output from the decoder and/or might not be displayed. In some cases, decodable leading pictures associated with such an IRAP picture may be output while other pictures preceding such an IRAP picture might not be output.

Concatenation of coded video data, which may also be referred to as splicing, may occur for example coded video sequences are concatenated into a bitstream that is broadcast or streamed or stored in a mass memory. For example, coded video sequences representing commercials or advertisements may be concatenated with movies or other "primary" content.

Scalable video bitstreams might contain IRAP pictures that are not aligned across layers. It may, however, be convenient to enable concatenation of a coded video sequence that contains an IRAP picture in the base layer in its first access unit but not necessarily in all layers. A second coded video sequence that is spliced after a first coded video sequence should trigger a layer-wise decoding start-up process. That is because the first access unit of said second coded video sequence might not contain an IRAP picture in all its layers and hence some reference pictures for the non-IRAP pictures in that access unit may not be available (in the concatenated bitstream) and cannot therefore be decoded. The entity concatenating the coded video sequences, hereafter referred to as the splicer, should therefore modify the first access unit of the second coded video sequence such that it triggers a layer-wise start-up process in decoder(s).

Indication(s) may exist in the bitstream syntax to indicate triggering of a layer-wise start-up process. These indication(s) may be generated by encoders or splicers and may be obeyed by decoders. These indication(s) may be used for particular picture type(s) or NAL unit type(s) only, such as only for IDR pictures, while in other embodiments these indication(s) may be used for any picture type(s). Without loss of generality, an indication called cross_layer_bla_flag that is considered to be included in a slice segment header is referred to below. It should be understood that a similar indication with any other name or included in any other syntax structures could be additionally or alternatively used.

Independently of indication(s) triggering a layer-wise start-up process, certain NAL unit type(s) and/or picture type(s) may trigger a layer-wise start-up process. For example, a base-layer BLA picture may trigger a layer-wise start-up process.

A layer-wise start-up mechanism may be initiated in one or more of the following cases:
  At the beginning of a bitstream.
  At the beginning of a coded video sequence, when specifically controlled, e.g. when a decoding process is started or re-started e.g. as response to tuning into a broadcast or seeking to a position in a file or stream. The decoding process may input an variable, e.g.

referred to as NoClrasOutputFlag, that may be controlled by external means, such as the video player or alike.

A base-layer BLA picture.

A base-layer IDR picture with cross_layer_bla_flag equal to 1. (Or a base-layer IRAP picture with cross_layer_bla_flag equal to 1.)

Cross-layer random access skipped (CL-RAS) pictures may have the property that when a layer-wise start-up mechanism is invoked (e.g. when NoClrasOutputFlag is equal to 1), the CL-RAS pictures are not output and may not be correctly decodable, as the CL-RAS picture may contain references to pictures that are not present in the bitstream. It may be specified that CL-RAS pictures are not used as reference pictures for the decoding process of non-CL-RAS pictures.

CL-RAS pictures may be explicitly indicated e.g. by one or more NAL unit types or slice header flags (e.g. by re-naming cross_layer_bla_flag to cross_layer_constraint_flag and re-defining the semantics of cross_layer_bla_flag for non-IRAP pictures). A picture may be considered as a CL-RAS picture when it is a non-IRAP picture (e.g. as determined by its NAL unit type), it resides in an enhancement layer and it has cross_layer_constraint_flag (or similar) equal to 1. Otherwise, a picture may be classified of being a non-CL-RAS picture. cross_layer_bla_flag may be inferred to be equal to 1 (or a respective variable may be set to 1), if the picture is an IRAP picture (e.g. as determined by its NAL unit type), it resides in the base layer, and cross_layer_constraint_flag is equal to 1. Otherwise, cross_layer_bla_flag may inferred to be equal to 0 (or a respective variable may be set to 0). Alternatively, CL-RAS pictures may be inferred. For example, a picture with nuh_layer_id equal to layerId may be inferred to be a CL-RAS picture when the LayerInitializedFlag[layerId] is equal to 0.

A decoding process may be specified in a manner that a certain variable controls whether or not a layer-wise start-up process is used. For example, a variable NoClrasOutputFlag may be used, which, when equal to 0, indicates a normal decoding operation, and when equal to 1, indicates a layer-wise start-up operation. NoClrasOutputFlag may be set for example using one or more of the following steps:

1) If the current picture is an IRAP picture that is the first picture in the bitstream, NoClrasOutputFlag is set equal to 1.
2) Otherwise, if some external means are available to set the variable NoClrasOutputFlag equal to a value for a base-layer IRAP picture, the variable NoClrasOutputFlag is set equal to the value provided by the external means.
3) Otherwise, if the current picture is a BLA picture that is the first picture in a coded video sequence (CVS), NoClrasOutputFlag is set equal to 1.
4) Otherwise, if the current picture is an IDR picture that is the first picture in a coded video sequence (CVS) and cross_layer_bla_flag is equal to 1, NoClrasOutputFlag is set equal to 1.
5) Otherwise, NoClrasOutputFlag is set equal to 0.

Step 4 above may alternatively be phrased more generally for example as follows: "Otherwise, if the current picture is an IRAP picture that is the first picture in a CVS and an indication of layer-wise start-up process is associated with the IRAP picture, NoClrasOutputFlag is set equal to 1." Step 3 above may be removed, and the BLA picture may be specified to initiate a layer-wise start-up process (i.e. set NoClrasOutputFlag equal to 1), when cross_layer_bla_flag for it is equal to 1. It should be understood that other ways to phrase the condition are possible and equally applicable.

A decoding process for layer-wise start-up may be for example controlled by two array variables LayerInitializedFlag[i] and FirstPicInLayerDecodedFlag[i] which may have entries for each layer (possibly excluding the base layer and possibly other independent layers too). When the layer-wise start-up process is invoked, for example as response to NoClrasOutputFlag being equal to 1, these array variables may be reset to their default values. For example, when there 64 layers are enabled (e.g. with a 6-bit nuh_layer_id), the variables may be reset as follows: the variable LayerInitializedFlag[i] is set equal to 0 for all values of i from 0 to 63, inclusive, and the variable FirstPicInLayerDecodedFlag[i] is set equal to 0 for all values of i from 1 to 63, inclusive.

The decoding process may include the following or similar to control the output of RASL pictures. When the current picture is an IRAP picture, the following applies:

If LayerInitializedFlag[nuh_layer_id] is equal to 0, the variable NoRaslOutputFlag is set equal to 1.

Otherwise, if some external means is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.

Otherwise, the variable HandleCraAsBlaFlag is set equal to 0 and the variable NoRaslOutputFlag is set equal to 0.

The decoding process may include the following to update the LayerInitializedFlag for a layer.

When the current picture is an IRAP picture and either one of the following is true, LayerInitializedFlag[nuh_layer_id] is set equal to 1.

nuh_layer_id is equal to 0.

LayerInitializedFlag[nuh_layer_id] is equal to 0 and LayerInitializedFlag[refLayerId] is equal to 1 for all values of refLayerId equal to RefLayerId[nuh_layer_id][j], where j is in the range of 0 to NumDirectRefLayers[nuh_layer_id]−1, inclusive.

The encoder process may be constrained so that it is required that when the current picture is an IRAP picture, either one of the following is true:

nuh_layer_id is equal to 0.

LayerInitializedFlag[refLayerId] is equal to 1 for all values of refLayerId equal to RefLayerId[nuh_layer_id][j], where j is in the range of 0 to NumDirectRefLayers[nuh_layer_id]−1, inclusive.

The above-mentioned constraint in the encoding process may be pre-defined for example in a coding standard, or the above-mentioned constraint may be indicated by the encoder in the bitstream. If the above-mentioned constraint is pre-defined or decoded by from the bitstream to be followed in a bitstream or a part thereof, the decoding process may set LayerInitializedFlag[nuh_layer_id] equal to 1 when the current picture is an IRAP picture.

When FirstPicInLayerDecodedFlag[nuh_layer_id] is equal to 0, the decoding process for generating unavailable reference pictures may be invoked prior to decoding the current picture. The decoding process for generating unavailable reference pictures may generate pictures for each picture in a reference picture set with default values. The process of generating unavailable reference pictures may be primarily specified only for the specification of syntax constraints for CL-RAS pictures, where a CL-RAS picture may be defined as a picture with nuh_layer_id equal to layerId and LayerInitializedFlag[layerId] is equal to 0. In HRD operations, CL-RAS pictures may need to be taken into consideration in derivation of CPB arrival and removal times. In some embodiments, decoders may ignore any CL-RAS pictures, as these pictures are not specified for output and have no effect on the decoding process of any other pictures that are specified for output.

The MV-HEVC/SHVC draft specification (in documents JCT3V-E1004 and JCTVC-N1008, respectively) derives a default output layer set for each layer set specified in the VPS. The VPS extension flag default_one_target_output_layer_flag, when equal to 0, specifies that each layer is an output layer, and when equal to 1, specifies that only the highest layer is an output layer. In addition, to the default output layer sets, the VPS extension enables to specify additional output layer sets with selected layers indicated to be output layers.

While a constant set of output layers suits well use cases and bitstreams where the highest layer stays unchanged in each access unit, they do not support use cases where the highest layer changes from one access unit to another. It has therefore been proposed that each output layer in an output layer set is associated with a minimum alternative output layer. The minimum alternative output layer for each output layer of each output layer set is indicated in a sequence-level syntax structure (e.g. VPS in H.265/HEVC and its extensions). It is used to specify the minimum layer identifier value of a picture that can be output instead of the specified output layer, if a picture at the output layer is not present in an access unit. The first direct or indirect inter-layer reference picture present in the access unit in descending layer identifier order down to the indicated minimum alternative output layer is output. For the default output layer sets, the minimum output layer may be specified to be the same as the output layer; i.e. when a default output layer set is in use, the decoder outputs only the specified output layers. For the additional output layer sets, one or more syntax elements may control the assignment of alternative output layers. For example, a VPS extension may include u(1)-coded alt_output_layer_flag. When alt_output_layer_flag is equal to 0, pictures that are not at the target output layers are not output. When alt_output_layer_flag equal to 1 and a picture at the a target output layer is not present in an access unit, a picture with highest nuh_layer_id among those pictures of the access unit for which PicOutputFlag is equal to 1 and which are not among the target output layers is output. In another example, the syntax element min_alt_output_layer_idx[i][j] is added to the VPS extension syntax for each output layer of the non-default output layer sets and specifies the alternative output layer index for the j-th layer within the i-th output layer set.

A POC reset approach, for which the latest proposal is in document JCTVC-O0213v4 (also published as JCT3V-F0073v4), is based on indicating within a slice header that POC values are to be reset so that the POC of the current picture is derived from the provided POC signaling for the current picture and the POCs of the earlier pictures, in decoding order, are decremented by a certain value.

Figure 5:
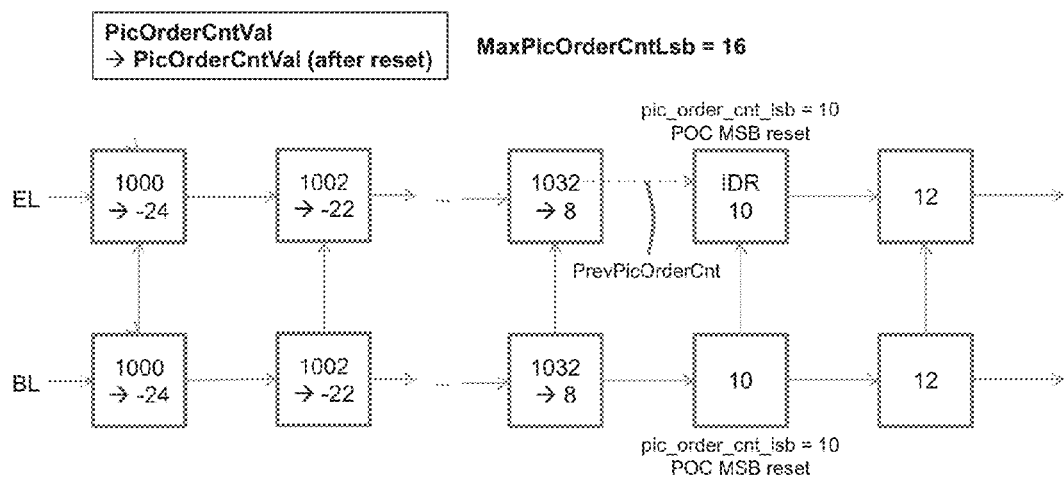
FIG. 5 shows an example of POC reset approach.

An example of the POC reset approach is given in FIG. 5. In this example, there is an IDR picture in the enhancement layer (EL). For all pictures in the access unit containing the EL IDR picture, a POC MSB reset is indicated. This indication has the impact that the POC of that access unit will have POC MSB equal to 0 and POC LSB equal to the signaled value (i.e. pic_order_cnt_lsb). In this example, the POC of that AU becomes 10. The POCs of the pictures that are in the DPB are subtracted by a value, which may be referred to as DeltaPocVal. The DeltaPocVal is derived on the basis of a previous picture count, PrevPicOrderCnt[nuh_layer_id], which is the PicOderCntVal of the previous picture that is not a RASL picture, a RADL picture, or a sub-layer non-reference picture, has TemporalId equal to 0, and has the same nuh_layer_id value as the current picture. In the example, PrevPicOrderCnt for the EL IDR picture is 1032. PrevPicOrderCnt is split into two parts, prevPicOrderCntLsb and prevPicOrderCntMsb, the sum of which is equal to PrevPicOrderCnt. In the example, MaxPicOrderCntLsb is 16, and consequently prevPicOrderCntMsb is 1024 (which is divisible by 16) and prevPicOrderLsb is equal to 8. For POC MSB reset the DeltaPocVal is set equal to prevPicOrderCntMsb, i.e. 1024 in this example. The updated POC values are shown in the FIG. 5 (with the notation: "→ updated POC value").

Altogether the proposed POC reset signaling also contains four modes of POC resetting:

POC MSB reset in the current access unit. This can be used when an enhancement layer contains an IRAP picture. (This mode is indicated in the syntax by poc_reset_idc equal to 1.)

Full POC reset (both MSB and LSB to 0) in the current access unit. This can be used when the base layer contains an IDR picture. (This mode is indicated in the syntax by poc_reset_idc equal to 2.)

"Delayed" POC MSB reset. This can be used for a picture of nuh_layer_id equal to nuhLayerId such that there was no picture in of nuh_layer_id equal to nuhLayerId in the earlier access unit (in decoding order) that caused a POC MSB reset. (This mode is indicated in the syntax by poc_reset_idc equal to 3 and full_poc_reset_flag equal to 0.)

"Delayed" full POC reset. This can be used for a picture of nuh_layer_id equal to nuhLayerId such that there was no picture in of nuh_layer_id equal to nuhLayerId in the earlier access unit (in decoding order) that caused a full POC reset. (This mode is indicated in the syntax by poc_reset_idc equal to 3 and full_poc_reset_flag equal to 1.)

The "delayed" POC reset signaling can also be used for error resilience purpose (to provide resilience against a loss of a previous picture in the same layer including the POC reset signaling).

A concept of POC resetting period is specified based on the POC resetting period ID. Each non-IRAP picture that belongs to an access unit that contains at least one IRAP picture must be the start of a POC resetting period in the layer containing the non-IRAP picture. In that access unit, each picture would be the start of a POC resetting period in the layer containing the picture. POC resetting and update of POC values of same-layer pictures in the DPB are applied only for the first picture within each POC resetting period.

POC values of earlier pictures of all layers in the DPB are updated at the beginning of each access unit that requires POC reset and starts a new POC resetting period (before the decoding of the first picture received for the access unit but after parsing and decoding of the slice header information of the first slice of that picture).

For derivation of the delta POC value used for updating the POC values of the same-layer pictures in the DPB as well as for derivation of the POC MSB of the POC value of the current picture, a POC LSB value (poc_lsb_val syntax element) is conditionally signalled in the slice segment header (for the "delayed" POC reset modes as well as for base-layer pictures with full POC reset, such as base-layer IDR pictures). When "delayed" POC reset modes are used, poc_lsb_val may be set equal to the value POC LSB (slice_pic_order_cnt_lsb) of the access unit in which the POC was reset. When a full POC reset is used in the base layer, the poc_lsb_val may be set equal to POC LSB of prevTid0Pic (as specified earlier).

The decoding process of deriving PicOrderCntVal, the picture order count of the current picture, is described in more details below.

The function GetCurrMsb is specified as follows.

$$GetCurrMsb(cl, pl, pm, ml) = \begin{cases} pm + ml; & pl - cl >= ml/2 \\ pm - ml; & cl - pl > ml/2 \\ pm; & \text{otherwise} \end{cases}$$

If FirstPicInLayerDecodedFlag[nuh_layer_id] is equal to 1, poc_reset_idc is greater than 0, and the access unit containing the current picture is the first access unit in decoding order in a POC resetting period, the following applies:

The variables pocMsbDelta, pocLsbDelta and DeltaPocVal are derived as follows:

```
prevPicOrderCntLsb= prevPicOrderCnt[ nuh_layer_id ] &
  ( MaxPicOrderCntLsb − 1 )
prevPicOrderCntMsb = PrevPicOrderCnt[ nuh_layer_id ] −
prevPicOrderCntLsb
if( poc_reset_idc == 3 || ( poc_reset_idc == 2 &&
nuh_layer_id == 0 ) )
    pocLsbVal = poc_lsb_val
else
    pocLsbVal = slice_pic_order_cnt_lsb
pocMsbDelta = getCurrMsb( pocLsbVal, prevPicOrderCntLsb,
prevPicOrderCntMsb,
MaxPicOrderCntLsb )
if( poc_reset_idc == 2 || ( poc_reset_idc == 3 &&
full_poc_reset_flag ) )
    pocLsbDelta = pocLsbVal
else
    pocLsbDelta = 0
DeltaPocVal = pocMsbDelta + pocLsbDelta
```

The PicOrderCntVal of the current picture is derived as follows:

```
if( poc_reset_idc == 1 )
    PicOrderCntVal = slice_pic_order_cnt_lsb
else if( poc_reset_idc == 2 )
    PicOrderCntVal = 0
else { // poc_reset_idc == 3
    PicOrderCntMsb = getCurrMsb( slice_pic_order_cnt_lsb,
    full_poc_reset_flag ? 0 :
poc_lsb_val, 0, MaxPicOrderCntLsb )
    PicOrderCntVal = PicOrderCntMsb + slice_pic_order_cnt_lsb
}
```

The value of PrevPicOrderCnt[nuh_layer_id] is derived as follows:
  If the current picture is not a RASL picture, a RADL picture, or a sub-layer non-reference picture, and the current picture has TemporalId equal to 0, PrevPicOrderCnt[nuh_layer_id] is set equal to PicOrderCntVal.
  Otherwise when poc_reset_idc is equal to 3, PrevPicOrderCnt[nuh_layer_id] is set equal to full_poc_reset_flag ? 0: poc_lsb_val.
  Otherwise, the following applies:
  The value of DeltaPocVal is set equal to 0.
  The PicOrderCntVal of the current picture is derived as follows:

```
if( !FirstPicInLayerDecodedFlag[ nuh_layer_id ] ) {
    if( poc_reset_idc == 1 )
        PicOrderCntVal = slice_pic_order_cnt_lsb
```

```
    else if( poc_reset_idc == 2 )
        PicOrderCntVal = 0
    else if( poc_reset_idc == 3 ) {
        PicOrderCntMsb = getCurrMsb(slice_pic_order_cnt_lsb,
        full_poc_reset_flag ? 0 :
poc_lsb_val, 0, MaxPicOrderCntLsb )
        PicOrderCntVal = PicOrderCntMsb + slice_pic_order_cnt_lsb
    } else // the current picture is an IRAP picture with NoRaslOutputFlag
    equal to 1
        PicOrderCntVal = slice_pic_order_cnt_lsb
} else { // the POC derivation as in HEVC version 1
    if( the current picture is an IRAP picture with NoRaslOutputFlag equal
    to 1 )
        PicOrderCntMsb = 0
    else {
        prevPicOrderCntLsb = PrevPicOrderCnt[ nuh_layer_id ] &
        ( MaxPicOrderCntLsb − 1 )
        prevPicOrderCntMsb = PrevPicOrderCnt[ nuh_layer_id ] −
        prevPicOrderCntLsb
        PicOrderCntMsb = getCurrMsb( slice_pic_order_cnt_lsb,
        prevPicOrderCntLsb,
prevPicOrderCntMsb, MaxPicOrderCntLsb )
    }
    PicOrderCntVal = PicOrderCntMsb + slice_pic_order_cnt_lsb
}
```

The value of PrevPicOrderCnt[nuh_layer_id] is derived as follows:
  If the current picture is not a RASL picture, a RADL picture, or a sub-layer non-reference picture, and the current picture has TemporalId equal to 0, PrevPicOrderCnt[nuh_layer_id] is set equal to PicOrderCntVal.
  Otherwise when FirstPicInLayerDecodedFlag[nuh_layer_id] is equal to 0 and poc_reset_idc is equal to 3, PrevPicOrderCnt[nuh_layer_id] is set equal to full_poc_reset_flag ? 0:poc_lsb_val.
  If the current picture is the first picture in an access unit (i.e. the picture with the lowest value of nuh_layer_id among all pictures in the access unit) and DeltaPocVal is greater than 0, the PicOrderCntVal values of all decoded pictures of all layers in the DPB are decremented by the value of DeltaPocVal.
  At this moment in the decoding process, the current picture is not yet decoded, thus the above operation does not affect the PicOrderCntVal value of the current picture.

At least the following problems are encountered in the POC reset approach:

1. An MV-HEVC/SHVC base-layer decoder would conclude different POC values than a single-layer (version 1) decoder. This would complicate the use of an existing HEVC v1 implementation (e.g. HW implementation) for decoding the base layer of a scalable bitstream.

2. The POC values are no longer static. This would complicate the use of POC values to label pictures in post-processing operations, which is required for example to conclude the persistence of some SEI messages.

Background: the persistence of the following SEI messages is specified similarly to the following: [the message pertains until] "the PicOrderCntVal of the next slice to be decoded is greater than currPicOrderCntVal+ pic_order_cnt_delta, where currPicOrderCntVal is the value of PicOrderCntVal of the picture in the access unit containing the SEI message"
    i. Recovery point SEI message
    ii. Progressive refinement start SEI message
    iii. Region refresh information SEI message
  The structure of pictures information SEI message also has similar persistence than the SEI messages named above and additionally uses POC within the persistence scope to identify pictures.

Additionally, pan-scan rectangle, tone mapping information, frame packing arrangement, and display orientation SEI messages cease to persist when a picture with a greater POC value than that of the current picture are output.

3. POC values may be used to label decoded pictures for usages outside the context of the decoder and/or the encoder. For example, POC values may be used to indicate pictures in feedback-based error control in which a decoder sends information to the far-end encoder on the success and/or failure of decoding of pictures and/or reception and/or loss of pictures. For example, one or more of the following kinds of feedback messages may be generated:

A certain picture was lost (not received) or was not correctly decoded.

A certain picture was correctly decoded.

Encoding of subsequent pictures is desired or commanded to use only certain picture(s) which have been correctly received.

If POC are dynamically updated based on POC reset information, the decoder and the far-end encoder have to have the same state of the POC derivation state machine to interpret the POC values of the feedback messages correctly. In other words, a POC value alone is not sufficient for the far-end encoder to determine which picture the decoder points at.

The layer-wise POC approach, for which the latest proposal is in document JCTVC-O0275v3 (also published as JCT3V-F0092v3), creates a static label for each picture. For the base-layer pictures, the POC as specified in H.265/HEVC version 1 is used as the static label. For enhancement-layer pictures, a layer-wise POC is used as the static label. The problems listed above are therefore avoided.

The layer-wise POC proposal includes the following ingredients:

1. Slice headers of enhancement-layer slices conditionally contain signalling for a layer-wise POC value (layer_delta_pic_order_cnt_minus1 in versions 1 and 2 of JCTVC-O0275/JCT3V-F0092, layer_pic_order_cnt_lsb in version 3 of JCTVC-O0275/JCT3V-F0092), which is intended to be used in the first picture of each layer after a base-layer IDR picture. The presence of the layer-wise POC signalling in the slice header is gated by a slice header flag and a PPS flag.

The layer-wise POC LSB value is intended to be included in the first picture of an enhancement layer after the base-layer included an IDR picture. The layer-wise POC LSB value is used to derive the layer-wise POC difference of the previous reference picture on the same layer with TemporalID equal to 0 and the current picture as if the POC values were not reset in between them.

2. A layer-wise POC value, LayerPicOrderCntVal is derived for each enhancement-layer picture based on slice header signalling, if present, and based on PicOrderCntVal differences, otherwise.

3. The function DiffPicOrderCnt( ) is specified to use LayerPicOrderCntVal values.

It is remarked that PicOrderCntVal is used in the decoding process only as input to the DiffPicOrderCnt( ) function. This opens the possibility to re-specify the DiffPicOrderCnt( ) function to use other inputs than PicOrderCntVal.

4. Reference picture sets for enhancement layers use layer-wise POC values.

Figure 6:
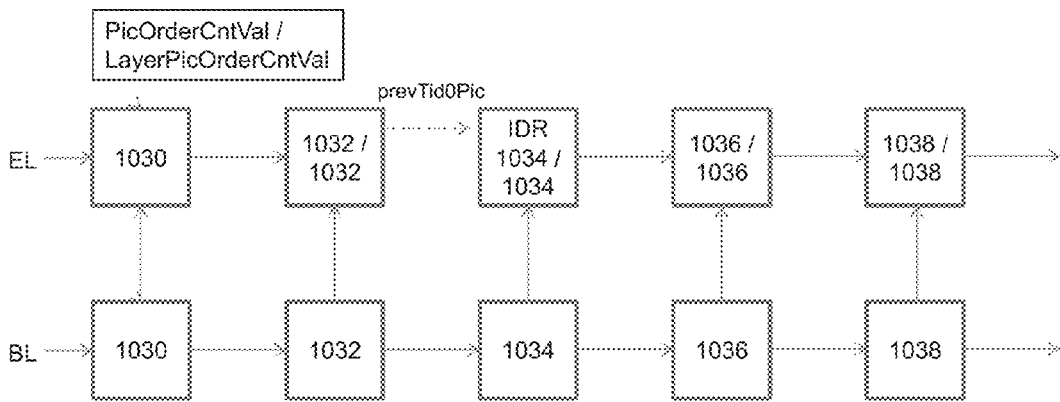
FIG. 6 shows an example of layer-wise POC approach.

An example of the layer-wise POC approach is given in FIG. 6. In this example an EL IDR picture is presented. Its layer-wise POC is derived on the basis of the previous picture (prevTid0Pic) that is not a RASL picture, a RADL picture, or a sub-layer non-reference picture, has TemporalId equal to 0, and has the same nuh_layer_id value as the current picture. In this case, no additional signalling is required as slice_pic_order_cnt_lsb of the EL IDR picture can be used to derive both POC and layer-wise POC.

Figure 7A:
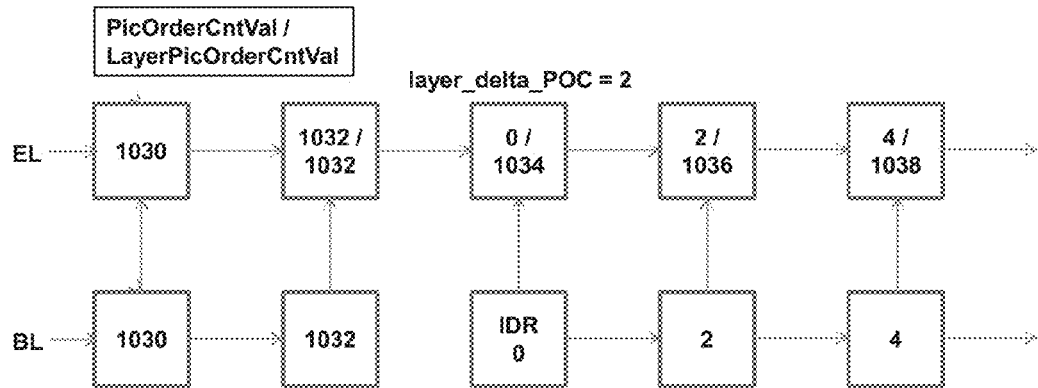
FIG. 7a shows an example of layer-wise POC approach, where a layer-wise delta POC value is indicated.
Figure 7B:
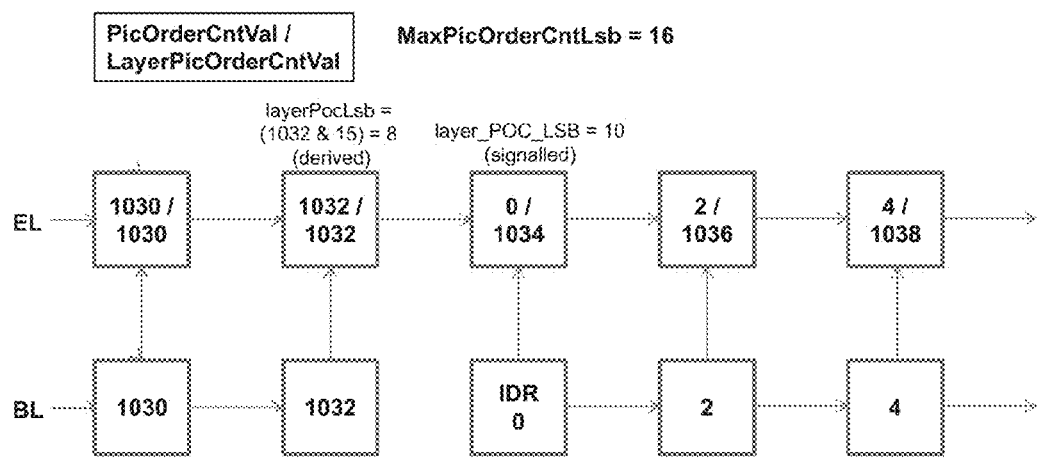
FIG. 7b an example of layer-wise POC approach, where a layer-wise POC LSB value is indicated.

Another example of the layer-wise POC approach is presented in FIGS. 7a and 7b. In this example, there is a base-layer IDR picture, which resets the POC values across the same access unit to be equal to 0. However, it is desirable to have the layer-wise POC values derived by continuing the same numbering principle as if the POC values were not reset in order to have proper motion vector scaling in the TMVP process, for example. Hence, a layer-wise POC value is indicated for the EL picture that resides in the same access unit as the base-layer IDR picture. The signalling may be a difference of layer-wise POC values between this picture and prevTid0Pic (in FIG. 7a) or an POC LSB value that indicates the layer-wise POC MSB and LSB relation to those of prevTid0Pic (in FIG. 7b).

Both the POC reset approach and layer-wise POC approach use a previous picture (prevTid0Pic) that is not a RASL picture, a RADL picture, or a sub-layer non-reference picture, has TemporalId equal to 0, and has the same nuh_layer_id value as the current picture. In both approaches, the POC of the prevTid0Pic is used to derive the POC of the current picture in the same layer. Additionally, the POC reset approach uses prevTid0Pic to determine the delta POC value to decrement from the earlier pictures in decoding order in the DPB, and the layer-wise POC approach uses prevTid0Pic to determine the layer-wise POC value. These design choices have the consequences presented in the following paragraphs.

Figure 8:
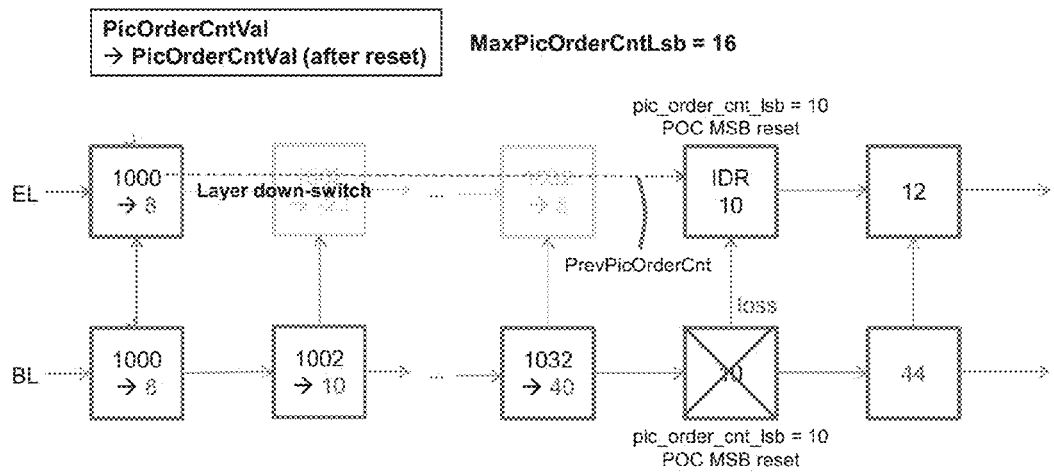
FIG. 8 shows an example where the POC reset approach becomes vulnerable to picture loss.

In order to have the POC reset approach work correctly, the prevTid0Pic in the layer that triggers the decrementing of the POC values across layers shall be less than (MaxPicOrderCntLsb/2) apart from the POC value of the current picture. Otherwise, the delta POC value is derived wrongly. While in conventional scalable picture coding structures prevTid0Pic typically satisfies this constraint, the following problems have been found:

1. Especially when layer down-switching has occurred before the POC reset point, the POC reset approach becomes vulnerable to picture losses. This is illustrated in FIG. 8, in which the same bitstream as in FIG. 5 is used and considered from the viewpoint of a receiver. A layer down-switching took place after the access unit with POC equal to 1000 (which could have been initiated by the sender, by a middle-box, or by the receiver). The base-layer picture at access unit was lost in transmission. Hence, in the receiver, the EL picture of access unit 10 initiates the decrementing of the POC values of the pictures in the DPB. The PrevPicOrderCnt of the EL is 1000, which is more than (MaxPicOrderCntLsb/2) apart from the real POC of the AU with POC 10. The decoder has no means to conclude how many times the POC LSBs have wrapped over between prevTid0Pic (with POC equal to PrevPicOrderCnt). Hence, the POCs of the pictures in the DPB are updated wrongly.

In general, layer up-switch points (IRAP pictures) need not co-exist in an access unit that has other pictures.

For example, a bitstream may contain coded texture video captured by a conventional color image sensor and coded depth video captured by a ranging sensor. The sensors need not be tightly synchronized, i.e. their picture capture times may differ. Consequently, the texture and depth pictures may be placed in different access units. If one of the layers (usually the depth picture layer) is not transmitted for a period of time, e.g. to adapt the transmitted bitrate, it may happen that when the next IRAP picture in the depth layer is sent, prevTid0Pic of depth is more than (MaxPicOrderCntLsb/2) apart. The POC decrementing would therefore be performed wrongly.

In another example, similar to the one above, interlaced video is coded in a manner that e.g. the top field pictures form the base layer and the opposite field pictures form the enhancement layer. Hence, in any access unit, there is only one picture present. If one of the layers (usually the enhancement layer) is not transmitted for a period of time, e.g. to adapt the transmitted bitrate, it may happen that when the next IRAP picture in the enhancement layer is sent, prevTid0Pic of depth is more than (MaxPicOrderCntLsb/2) apart. The POC decrementing would therefore be performed wrongly.

Figure 9:
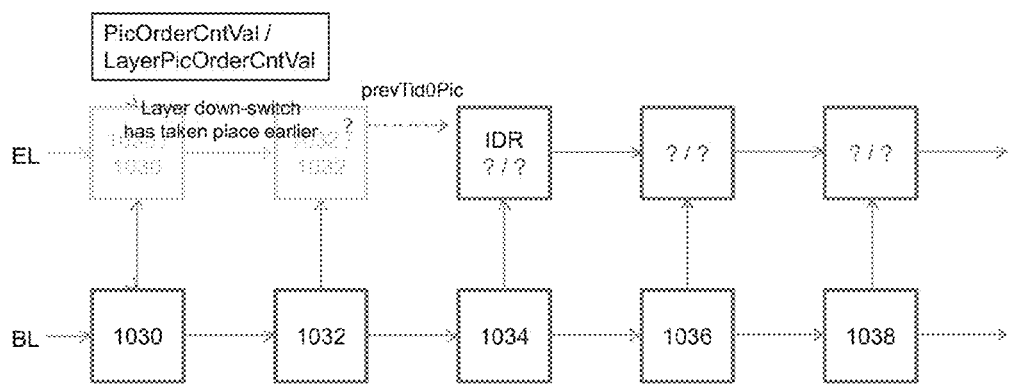
FIG. 9 shows an example where the layer-wise POC fails due to layer down-switching.

In the layer-wise POC approach, layer down-switching causes the encoder and decoder to have different a prevTid0Pic at an enhancement layer IRAP picture used to switch up. This is illustrated in FIG. 9. Both POC and layer-wise POC derivation therefore become unpredictably wrong in subsequent enhancement layer pictures in decoding order.

Now in order to at least alleviate the above problems, an improved method for determining a POC reference picture is provided herein.

Figure 10:
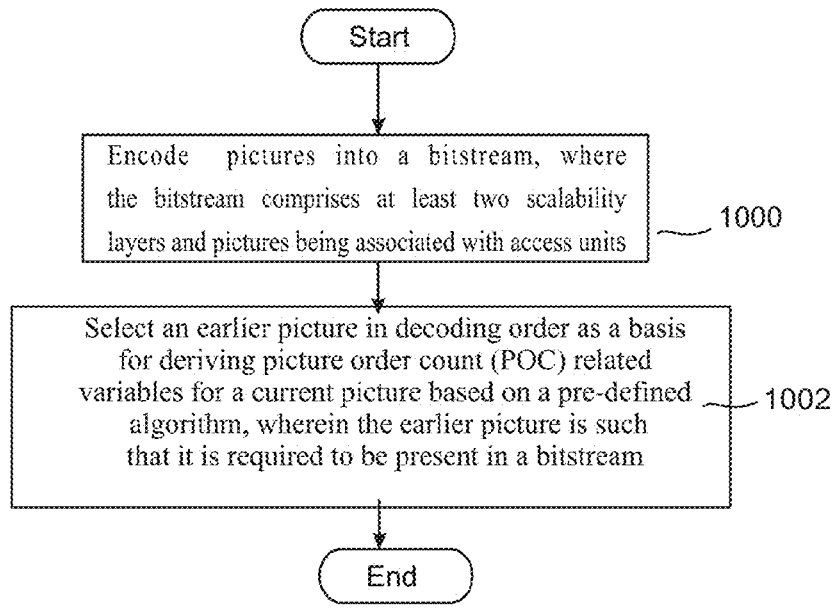
FIG. 10 shows a flow chart of an encoding method according to an embodiment.

According to a first aspect, which is illustrated in FIG. 10, pictures are encoded (1000) into a bitstream, the bitstream comprising at least two scalability layers and pictures being associated with access units. An earlier picture in decoding order is selected (1000) as a basis for deriving picture order count (POC) related variables for a current picture based on a pre-defined algorithm, wherein the earlier picture is such that it is required to be present in a bitstream.

In the next paragraphs various embodiments of selecting the earlier picture are presented. Each embodiment may be applied independently, or two or more of the embodiments may be jointly used to specify conditions all of which the earlier picture is required to fulfill, or two or more embodiments may be jointly used to specified conditions at least one (or some other pre-defined number) of which the earlier picture is required to fulfill, or conditions of two or more of the embodiments may be combined using one or more logical operations (such as AND, OR, XOR, and NOT) in certain order between the conditions and possibly the results of the previously computed logical operations.

According to an embodiment, the earlier picture is such that it is required for decoding of the current picture or the earlier picture is required to be present in the bitstream by bitstream conformance constraints.

According to an embodiment, the earlier picture is such that it is required for decoding of any picture in the target output layers of the output layer set in use or the earlier picture is required to be present in the bitstream by bitstream conformance constraints. For example, the earlier picture may be such that it is selected among those pictures that are not discardable pictures and/or NOLS pictures of layers that are not among the target output layers.

According to an embodiment, the earlier picture is selected from any direct or indirect reference layer of the layer of the current picture. Thus, the earlier picture need not necessarily be from the same layer as the current picture.

According to an embodiment, the earlier picture is selected to be the previous picture, in decoding order, from any direct or indirect reference layer of the layer of the current picture.

According to an embodiment, the earlier picture is selected to be the previous picture, in decoding order, required to be present in the bitstream, such as a base-layer TRAP picture, even if it is not in a direct or indirect reference layer of the layer of the current picture.

According to an embodiment, the earlier picture is selected to be the previous picture that cannot be extracted in a sub-bitstream extraction process creating a temporal subset of the bitstream. For example, the earlier picture may be selected to be a picture having TemporalId equal to 0 and may be required to be other than a RASL, RADL, or sub-layer non-reference picture.

According to an embodiment, the earlier picture is selected to be the previous picture that can be decoded regardless of which picture the decoding process is started from (as long as the decoding process is started before the earlier picture). For example, the earlier picture may be selected to be a picture that is not a CL-RAS picture.

According to an embodiment, the earlier picture is selected to be the previous picture that can be decoded regardless of any layer down-switching that may have taken place before the current picture. For example, if the current picture enables layer up-switching, it may be required that the earlier picture is not from the same layer as the current picture.

A first example of combining embodiments of selecting the earlier picture is as follows. The earlier picture is selected to be the previous picture in decoding order for which all of the following conditions are true:
  The earlier picture has TemporalId equal to 0.
  The earlier picture is not a RASL picture, a RADL picture, or a sub-layer non-reference picture.
  The earlier picture is not a discardable picture or a NOLS picture in a layer that is not among the target output layers.
  The earlier picture is not a CL-RAS picture.
  At least one of the following conditions is true:
    The current picture is not an IRAP picture and the earlier has nuh_layer_id equal to nuh_layer_id of the current picture.
    The current picture is an IRAP picture in an independent layer.
    The earlier picture has nuh_layer_id among the direct or indirect reference layers of the layer of the current picture.

A second example of combining embodiments of selecting the earlier picture is as follows. The earlier picture is selected to be the previous picture in decoding order which either is an IRAP picture in the base layer or an independent layer that is a direct or indirect reference layer of the current picture, or a picture that fulfills the conditions of the earlier picture in the first example above.

According to an embodiment, the POC coding related to the POC reference picture is carried out such that at least one POC related syntax element is encoded into the bitstream on the basis of the POC related variables of said earlier picture defined as a POC reference picture.

According to an embodiment, the POC reference picture is used in DeltaPocVal derivation of the POC reset approach for decrementing the POC values of the picture in a decoded picture buffer.

According to an embodiment, a layer tree is defined as an independent layer and at least one dependent layer, wherein a mapping of layers to the layer tree is obtained from the dependency information between layers encoded into the bitstream. Layer-tree POC values of the same layer tree are related to each other but the layer-tree POC values of different layer trees need not be related to each other. POC and/or layer-tree POC related variables are derived on the basis of the POC reference picture.

According to an embodiment, the POC reference pictures may be selected such that characteristics, including layer identifier(s), temporal sub-layer identifier(s), and/or picture types, of pictures on which the current picture may depend on in prediction are determined, and the previous picture, in decoding order, fulfilling the characteristics is selected as the POC reference picture.

Figure 11:
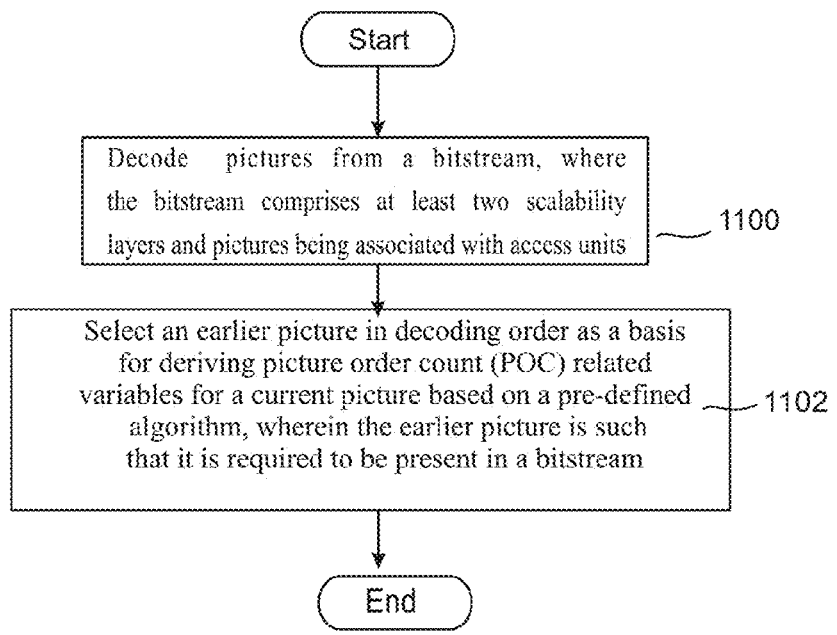
FIG. 11 shows a flow chart of a decoding method according to an embodiment.

The decoding operations are opposite to the encoding operations described above. Thus, according to another aspect, which is illustrated in FIG. 11, there is provided a decoding method, where pictures are decoded (1100) from a bitstream, the bitstream comprising at least two scalability layers and pictures being associated with access units. An earlier picture in decoding order is selected as a basis for deriving picture order count (POC) related variables for a current picture based on a pre-defined algorithm, wherein the earlier picture is such that it is required to be present in a bitstream.

An example of implementing the invention with the POC reset approach is presented below.

If FirstPicInLayerDecodedFlag[nuh_layer_id] is equal to 1, poc_reset_idc is greater than 0, and the access unit containing the current picture is the first access unit in decoding order in a POC resetting period, the following applies:

The variables pocMsbDelta, pocLsbDelta and DeltaPocVal are derived as follows:

```
prevPicOrderCntLsb = PrevPicOrderCnt[ nuh_layer_id ] &
( MaxPicOrderCntLsb - 1 )
prevPicOrderCntMsb = PrevPicOrderCnt[ nuh_layer_id ] -
prevPicOrderCntLsb
if( poc_reset_idc == 3 || ( poc_reset_idc == 2 &&
nuh_layer_id == 0 ) )
    pocLsbVal = poc_lsb_val
else
    pocLsbVal = slice_pic_order_cnt_lsb
pocMsbDelta = getCurrMsb( pocLsbVal, prevPicOrderCntLsb,
prevPicOrderCntMsb,
MaxPicOrderCntLsb )
if( poc_reset_idc == 2 || ( poc_reset_idc == 3 &&
full_poc_reset_flag ) )
    pocLsbDelta = pocLsbVal
else
    pocLsbDelta = 0
DeltaPocVal = pocMsbDelta + pocLsbDelta
```

The PicOrderCntVal of the current picture is derived as follows:

```
if( poc_reset_idc == 1 )
    PicOrderCntVal = slice_pic_order_cnt_lsb
else if( poc_reset_idc == 2 )
    PicOrderCntVal = 0
else { // poc_reset_idc == 3
    PicOrderCntMsb = getCurrMsb( slice_pic_order_cnt_lsb,
    full_poc_reset_flag ? 0
: poc_lsb_val, 0, MaxPicOrderCntLsb )
    PicOrderCntVal = PicOrderCntMsb + slice_pic_order_cnt_lsb
}
```

Now in contrast to the prior known approach, the value of PrevPicOrderCnt[lId] for lId equal to nuh_layer_id of the current picture for each layer with nuh_layer_id value lId for which the current layer is a direct or indirect reference layer is derived as follows:

If the current picture is not a RASL picture, a RADL picture, or a sub-layer non-reference picture, and the current picture has TemporalId equal to 0, PrevPicOrderCnt[lId] is set equal to PicOrderCntVal.

Otherwise when poc_reset_idc is equal to 3, PrevPicOrderCnt[lId] is set equal to full_poc_reset_flag ? 0:poc_lsb_val.

Otherwise, the following applies:

The value of DeltaPocVal is set equal to 0.

The PicOrderCntVal of the current picture is derived as follows:

```
if( !FirstPicInLayerDecodedFlag[ nuh_layer_id ] ) {
    if( poc_reset_idc == 1 )
        PicOrderCntVal = slice_pic_order_cnt_lsb
    else if( poc_reset_idc == 2 )
        PicOrderCntVal = 0
    else if( poc_reset_idc == 3 ) {
        PicOrderCntMsb = getCurrMsb(slice_pic_order_cnt_lsb,
full_poc_reset_flag ? 0 : poc_lsb_val, 0, MaxPicOrderCntLsb )
        PicOrderCntVal = PicOrderCntMsb + slice_pic_order_cnt_lsb
    } else // the current picture is an IRAP picture with
        NoRaslOutputFlag equal to 1
        PicOrderCntVal = slice_pic_order_cnt_lsb
} else { // the POC derivation as in HEVC version 1
    if( the current picture is an IRAP picture with NoRaslOutputFlag
equal to 1 )
        PicOrderCntMsb = 0
    else {
        prevPicOrderCntLsb = PrevPicOrderCnt[ nuh_layer_id ] & (
MaxPicOrderCntLsb - 1 )
        prevPicOrderCntMsb = PrevPicOrderCnt[ nuh_layer_id ] -
prevPicOrderCntLsb
        PicOrderCntMsb = getCurrMsb( slice_pic_order_cnt_lsb,
prevPicOrderCntLsb, prevPicOrderCntMsb, MaxPicOrderCntLsb )
    }
    PicOrderCntVal = PicOrderCntMsb + slice_pic_order_cnt_lsb
}
```

The value of PrevPicOrderCnt[lId] for lId equal to nuh_layer_id of the current picture for each layer with nuh_layer_id value lId for which the current layer is a direct or indirect reference layer is now derived as follows:

If the current picture is not a RASL picture, a RADL picture, or a sub-layer non-reference picture, and the current picture has TemporalId equal to 0, PrevPicOrderCnt[lId] is set equal to PicOrderCntVal.

Otherwise when FirstPicInLayerDecodedFlag [nuh_layer_id] is equal to 0 and poc_reset_idc is equal to 3, PrevPicOrderCnt[lId] is set equal to full_poc_reset_flag ? 0:poc_lsb_val.

If the current picture is the first picture in an access unit (i.e. the picture with the lowest value of nuh_layer_id among all pictures in the access unit) and DeltaPocVal is greater than 0, the PicOrderCntVal values of all decoded pictures of all layers in the DPB are decremented by the value of DeltaPocVal and PrevPicOrderCnt[lId] is decremented by the value of DeltaPocVal for each value of lId in the range of 0 to MaxLayersMinus1, inclusive.

The layer-tree POC approach may be implemented as follows:

1. A layer tree is defined to consist of one independent layer (without any reference layers) and all layers that directly or indirectly use the independent layer as reference.

2. Slice header extensions optionally contain signalling for a layer-tree POC value, which is intended to be used in the IRAP pictures of the independent layers and may be used, for additional error resilience, in other pictures too.

3. A layer-tree POC value, LayerTreePicOrderCntVal is derived for each picture based on the mentioned slice header signalling, if present, and based on PicOrderCntVal differences, otherwise.

4. Both the POC value and the layer-tree POC value are derived relative to the POC value and the layer-tree POC, respectively, of the POC reference picture. The layer-tree POC values of all pictures in the same layer tree in the same access unit are equal.

5. In some embodiments (with POC reset signaling), enhancement-layer slice headers optionally contain POC resetting information. This signalling may be required to be used for a picture that is in a different layer tree than the layer tree containing the base layer and which is the first picture, in decoding order, in a layer tree after a base-layer IDR or BLA picture. The signalling may also be used in other pictures for additional error resilience.

6. The function DiffPicOrderCnt( ) is specified to use LayerTreePicOrderCntVal values.

Some examples of syntax, semantics, and decoding operation for the layer-tree POC approach are provided in the following. The examples share some common definitions, which are presented first below, followed by specific examples of syntax, semantics and related decoding operation.

The following definitions are used in the layer-tree POC examples:

A direct reference layer may refer to a layer that may be used for inter-layer prediction of the current layer (i.e. the layer of the current picture or another layer to which the "direct" reference relation is indicated).

An indirect reference layer may refer to a layer that is not a direct reference layer of a first layer but is a direct reference layer of a layer that is a direct reference layer or indirect reference layer of a direct reference layer of the first layer.

An independent layer may refer to a layer that does not have direct reference layers.

A layer tree may refer to a set of layers consisting of an independent layer and all layers for which the independent layer is a direct reference layer or an indirect reference layer.

A layer-tree picture order count may refer to a variable that is associated with each picture, uniquely identifies the access unit containing the picture within the layer tree containing the picture within a sequence of access units in decoding order from a picture with NoClrasOutputFlag equal to 1 in the independent layer of the layer tree, inclusive, to the next picture with NoClrasOutputFlag equal to 1 in the independent layer of the layer tree, exclusive, or the end of the bitstream, whichever is earlier in decoding order.

In the layer-tree POC examples, the function more_data_in_slice_segment_header_extension( ) may be specified as follows: If (the current position in the slice_segment_header( ) syntax structure)−(the position immediately following slice_segment_header_extension_length) is less than (slice_segment_header_extension_length*8), the return value of more_data_in_slice_segment_header_extension( ) is equal to TRUE. Otherwise, the return value of more_data_in_slice_segment_header_extension( ) is equal to FALSE. Here, the position refers to the bit position from which the data is read and parsed from the bitstream.

An example of the layer-tree POC approach with POC reset signaling is provided in the following. The slice segment header syntax table may be appended for example as follows (while other possibilities of conditioning the presence of poc_reset_flag, poc_msb_cycle or layer_tree_poc_lsb also exist). In this example, layer_tree_poc_info_present_flag is conveyed in the picture parameter set syntax structure.

| slice_segment_header( ) { | Descriptor |
|---|---|
| ... | |
| if( nuh_layer_id > 0 ) { | |
|   poc_reset_flag | u(1) |
|   if( poc_reset_flag) | |
|     poc_msb_cycle | se(v) |
| } | |
| ... | |
| if( slice_segment_header_extension_present_flag ) { | |
|   slice_segment_header_extension_length | ue(v) |
|   if( layer_tree_poc_info_present_flag ) | |
|     layer_tree_poc_lsb | u(v) |
|   while( more_data_in_slice_segment_header_extension( ) ) | |
|     slice_segment_header_extension_data_bit | u(1) |
| } | |
| byte_alignment( ) | |
| } | |

Continuing the example, the derivation of POC and layer-tree POC values in this approach (with POC reset signaling using poc_msb_cycle) may be specified as follows:

Let prevTid0Pic be the previous picture in decoding order for which all of the following conditions are true:
prevTid0Pic has TemporalId equal to 0.
prevTid0Pic is not a RASL picture, a RADL picture, or a sub-layer non-reference picture.
At least one of the following conditions is true:
  The current picture is not an IRAP picture and prevTid0Pic has nuh_layer_id equal to nuh_layer_id of the current picture.
  The current picture is an IRAP picture in an independent layer.
  prevTid0Pic has nuh_layer_id equal to RecursiveRefLayerId[nuh_layer_id][i] for any value of i in the range of 0 to NumRefLayers[nuh_layer_id]−1, inclusive. (Here RecursiveRefLayerId[nuhLayerId] is a list of nuh_layer_id values of direct and indirect reference layers of the layer with nuh_layer_id equal to nuhLayerId, and NumRefLayers[nuhLayerId] is the number of direct and indirect reference layers of the layer with nuh_layer_id equal to nuhLayerId.)
The variable PicOrderCntMsb is derived as follows:
If the current picture is an IRAP picture with NoRaslOutputFlag equal to 1 and with nuh_layer_id equal to 0, PicOrderCntMsb is set equal to 0.
Otherwise, if poc_reset_flag is equal to 1 (or a base-layer POC reset is detected by other means), PicOrderCntMsb is set equal to poc_msb_cycle*MaxPicOrderCntLsb.
Otherwise, the following applies
  Let prevPicOrderCnt be equal to PicOrderCntVal of prevTid0Pic.
  The variable prevPicOrderCntLsb is set equal to slice_pic_order_cnt_lsb of prevTid0Pic.
  The variable prevPicOrderCntMsb is set equal to PicOrderCntMsb of prevTid0Pic.
  PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >=
    ( MaxPicOrderCntLsb /
2 ) ) )
    PicOrderCntMsb = prevPicOrderCntMsb + MaxPicOrderCntLsb
else if( (slice_pic_order_cnt_lsb > prevPicOrderCntLsb ) &&
    ( (slice_pic_order_cnt_lsb − prevPicOrderCntLsb ) > (
```

MaxPicOrderCntLsb / 2 ) ) )
    PicOrderCntMsb = prevPicOrderCntMsb − MaxPicOrderCntLsb
else
    PicOrderCntMsb = prevPicOrderCntMsb PicOrderCntVal is derived as follows:

PicOrderCntVal=PicOrderCntMsb+slice_pic_order_cnt_lsb

The variable LayerTreePicOrderCntVal is derived as follows:

If the current picture is an IRAP picture with NoClrasOutputFlag equal to 1 in an independent layer, LayerTreePicOrderCntVal is set equal to layer_tree_poc_lsb.

Otherwise, the following applies:
  Let prevLayerTreePicOrderCnt be equal to LayerTreePicOrderCntVal of prevTid0Pic.
  If layer_tree_poc_info_present_flag is equal to 1, the following applies:
    The variable prevLayerTreePicOrderCntLsb is set equal to prevLayerTreePicOrderCnt & (MaxPicOrderCntLsb−1).
    The variable prevLayerTreePicOrderCntMsb is set equal to prevLayerTreePicOrderCnt−prevLayerTreePicOrderCntLsb.
    The variable layerTreePicOrderCntMsb is derived as follows:

```
if( ( layer_tree_poc_lsb < prevLayerTreePicOrderCntLsb ) &&
    ( ( prevLayerTreePicOrderCntLsb − layer_tree_poc_lsb ) >= (
MaxPicOrderCntLsb / 2 ) ) )
    layerTreePicOrderCntMsb = prevLayerTreePicOrderCntMsb +
MaxPicOrderCntLsb)
else if( ( layer_tree_poc_lsb > prevLayerTreePicOrderCntLsb ) &&
    ( ( layer_tree_poc_lsb − prevLayerTreePicOrderCntLsb ) > (
MaxPicOrderCntLsb / 2 ) ) )
    layerTreePicOrderCntMsb = prevLayerTreePicOrderCntMsb −
MaxPicOrderCntLsb
else
    layerTreePicOrderCntMsb = prevLayerTreePicOrderCntMsb
```

LayerTreePicOrderCntVal is set equal to layerTreePicOrderCntMsb+layer_tree_poc_lsb.
  Otherwise, LayerTreePicOrderCntVal is set equal to prevLayrTreePicOrderCnt+PicOrderCntVal−prevPicOrderCnt.
  The function layerTreePicOrderCnt(picX) is specified as follows:

layerTreePicOrderCnt(picX)=LayerTreePicOrderCntVal of the picture picX

The function DiffPicOrderCnt(picA, picB) is specified as follows:

DiffPicOrderCnt(picA,picB)=layerTreePicOrderCnt(picA)−layerTreePicOrderCnt(picB)

Another example of the layer-tree POC approach with POC reset signaling is provided in the following. The slice segment header syntax table may be appended for example as follows (while other possibilities of conditioning the presence of poc_reset_flag, ref poc_lsb or layer_tree_poc_lsb also exist). In this example, layer_tree_poc_info_present_flag is conveyed in the picture parameter set syntax structure.

| slice_segment_header( ) { | Descriptor |
|---|---|
| ... | |
| if( nuh_layer_id > 0 ) { | |
| poc_reset_flag | u(1) |
| if( poc_reset_flag ) | |
| ref_poc_lsb | se(v) |
| } | |
| ... | |
| if( slice_segment_header_extension_present_flag ) { | |
| slice_segment_header_extension_length | ue(v) |
| if( layer_tree_poc_info_present_flag ) | |
| layer_tree_poc_lsb | u(v) |
| while( more_data_in_slice_segment_header_extension( ) ) | |
| slice_segment_header_extension_data_bit | u(1) |
| } | |
| byte_alignment( ) | |
| } | |

In this example, prevTid0Pic may be derived for example identically to the previous example.

The variable PicOrderCntMsb is derived as follows:

If the current picture is an IRAP picture with NoRaslOutputFlag equal to 1 and with nuh_layer_id equal to 0, PicOrderCntMsb is set equal to 0.

Otherwise, the following applies:
  If poc_reset_flag is equal to 1, the following applies:
    The variable prevPicOrderCntLsb is set equal to ref poc_lsb.
    The variable prevPicOrderCntMsb is set equal to 0.
  Otherwise (poc_reset_flag is equal to 0), the following applies:
    Let prevPicOrderCnt be equal to PicOrderCntVal of prevTid0Pic.
    The variable prevPicOrderCntLsb is set equal to slice_pic_order_cnt_lsb of prevTid0Pic.
    The variable prevPicOrderCntMsb is set equal to PicOrderCntMsb of prevTid0Pic.
  PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >=
    ( MaxPicOrderCntLsb / 2 ) ) )
    PicOrderCntMsb = prevPicOrderCntMsb + MaxPicOrderCntLsb
else if( (slice_pic_order_cnt_lsb > prevPicOrderCntLsb ) &&
    ( (slice_pic_order_cnt_lsb − prevPicOrderCntLsb ) >
    ( MaxPicOrderCntLsb / 2 ) ) )
    PicOrderCntMsb = prevPicOrderCntMsb − MaxPicOrderCntLsb
else
    PicOrderCntMsb = prevPicOrderCntMsb
```

PicOrderCntVal is derived as follows:

PicOrderCntVal=PicOrderCntMsb+slice_pic_order_cnt_lsb

The variable LayerTreePicOrderCntVal as well as the function DiffPicOrderCnt may be derived identically to the layer-tree POC approach with POC reset signalling (with poc_msb_cycle).

An example of the layer-tree POC approach without POC reset signaling is provided in the following. The slice segment header syntax table may be appended for example as follows (while other possibilities of conditioning the presence of layer_tree_poc_lsb also exist). In this example, layer_tree_poc_info_present_flag is conveyed in the picture parameter set syntax structure.

| | Descriptor |
|---|---|
| slice_segment_header( ) { | |
| ... | |
|   if( slice_segment_header_extension_present_flag ) { | |
|     slice_segment_header_extension_length | ue(v) |
|     if( layer_tree_poc_info_present_flag ) | |
|       layer_tree_poc_lsb | u(v) |
|     while( more_data_in_slice_segment_header_extension( ) ) | |
|       slice_segment_header_extension_data_bit | u(1) |
|   } | |
|   byte_alignment( ) | |
| } | |

In the layer-tree POC approach without POC reset signaling, the encoder and/or the decoder may keep track of when a base-layer picture resets the POC value. For example, base-layer IDR and BLA pictures reset the POC value (to 0 or to the signaled slice_pic_order_cnt_lsb, respectively). More generally, a base-layer picture with NoRaslOutputFlag equal to 1 can be considered to reset the POC value. As response to a base-layer picture resetting the POC value, the encoder and/or the decoder may be keep track if the POC reset has been taken into account for the first picture in each enhancement layer following the base-layer picture resetting the POC value. This may be done for example by maintaining a variable BLPOCResetFlag[nuh_layer_id] for different nuh_layer_id values. The variable may be set as follows as response to a base-layer picture resetting the POC value: When the current picture is an IRAP picture with nuh_layer_id equal to 0 and NoRaslOutputFlag equal to 1, the variable BLPOCResetFlag[i] is set equal to 1 for all values of i in the range of 1 to MaxLayersMinus1, inclusive.

In some embodiments which may be applied together with or independently of other embodiments, a base-layer POC reset may be additionally or alternatively identified with one or more of the following means, which may be used particularly for resilience against full base-layer picture losses:

- Pictures may be assigned poc_reset_period_id (similarly to the POC reset approach), which may be signaled for selected pictures as determined by the encoder. As in the layer-tree POC approach POC is reset only by base-layer picture, a change in the poc_reset_period_id can be used to conclude a base-layer POC reset.
- Pictures may be assigned bl_cvs_id which may be signaled for selected pictures as determined by the encoder. The bl_cvs_id shall differ in subsequent (in decoding order) IDR and BLA pictures of the base layer. A change in the bl_cvs_id can be used to conclude a base-layer POC reset.
- Pictures may be assigned layer_tree_cvs_id, which may be signaled for selected pictures as determined by the encoder. layer_tree_cvs_id shall differ in in subsequent (in decoding order) IDR and BLA pictures of the same independent layer. A change in the layer_tree_cvs_id for the base layer can be used to conclude a base-layer POC reset.
- Temporal sub-layer zero index SEI message of H.265/HEVC or a similar SEI message or other syntax structure may be used to associate pictures to IRAP access units. If a temporal sub-layer zero index SEI message indicates an IRAP access unit for which the base-layer picture has not been received or decoded (at all or correctly), a loss of a base-layer IRAP picture can be concluded.

Continuing the example of the layer-tree POC approach without POC reset signaling, the decoding process may operate as follows. The prevTid0Pic may be derived identically to the other examples of the layer-tree POC approach. The variable PicOrderCntMsb is derived as follows:

If the current picture is an IRAP picture with NoRaslOutputFlag equal to 1 and with nuh_layer_id equal to 0, PicOrderCntMsb is set equal to 0.

Otherwise, the following applies:

If BLPOCResetFlag[nuh_layer_id] is equal to 0 or prevTid0Pic (if any) is subsequent, in decoding order, to the previous, in decoding order, IRAP picture with nuh_layer equal to 0 and NoRaslOutputFlag equal to 1, the variable prevPicOrderCnt is set equal to PicOrderCntVal of prevTid0Pic Otherwise (BLPOCResetFlag[nuh_layer_id] is equal to 1), the variable prevPicOrderCnt is set equal to to PicOrderCntVal of the previous, in decoding order, IRAP picture with nuh_layer equal to 0 and NoRaslOutputFlag equal to 1.

The variable prevPicOrderCntLsb is set equal to prevPicOrderCnt & (MaxPicOrderCntLsb−1).

The variable prevPicOrderCntMsb is set equal to prevPicOrderCnt−prevPicOrderCntLsb.

PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >=
    ( MaxPicOrderCntLsb / 2 ) ) )
  PicOrderCntMsb = prevPicOrderCntMsb + MaxPicOrderCntLsb
else if( (slice_pic_order_cnt_lsb > prevPicOrderCntLsb ) &&
    ( (slice_pic_order_cnt_lsb − prevPicOrderCntLsb ) >
    ( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows:

PicOrderCntVal=PicOrderCntMsb+slice_pic_order_cnt_lsb

Subsequently, BLPOCResetFlag[nuh_layer_id] is set equal to 0.

The variable LayerTreePicOrderCntVal as well as the function DiffPicOrderCnt may be derived identically to the layer-tree POC approach with POC reset signalling (with poc_msb_cycle).

In the layer-tree POC approach, different functionalities related to POC may be implemented as follows:

- The decoding processes (e.g. motion vector scaling in TMVP) may be use the POC value or the layer-tree POC value in the base-layer decoding. For decoding of enhancement layers, the difference of layer-tree POCs may be used. For decoding of the enhancement layers, the function DiffPicOrderCnt(picA, picB) is specified to use layer-tree POCs.
- An access unit (AU) boundary may be detected using the pic_order_cnt_lsb or the derived POC value. Consecutive pictures having the same POC or the same pic_order_cnt_lsb are contained in the same access unit. An AU boundary can be concluded when i) there is a picture with first_slice_segment_in_pic_flag equal to 1 and nuh_layer_id equal to 0, or ii) slice_pic_order_cnt_lsb differs in adjacent pictures.
- Reference picture sets in the base layer may be signaled using POC values or the layer-tree POC values. Similarly, reference picture sets in the enhancement layers may be signaled using POC values or layer-tree POC values, although the signaling may be more efficient when layer-tree POC values are used (as no unintentional discontinues of the used values then exist).

Picture output order determination in the bumping process of the HRD basically follows the base-layer output order determination. Access units of a CVS are contiguous in output order. The output order determination is first based on the CVS order, i.e. all access units of an earlier CVS are output before any access unit of a later CVS. Within a CVS, the access unit output order is determined by PicOrderCntVal. All the pictures of an access unit (with PicOutputFlag equal to 1) are output contiguously.

SEI messages applying to base-layer pictures or entire access units may use PicOrderCntVal in their semantics. SEI messages with nuh_layer_id greater than 0 or included in a scalable nesting SEI message may use LayerTreePicOrderCntVal in their semantics when the SEI message applies to enhancement-layer pictures.

For feedback based error control or recovery, PicOrderCntVal may be used for identifying base-layer pictures and LayerTreePicOrderCntVal may be used for identifying enhancement-layer pictures in the feedback messages.

The Reference Picture Selection Indication (RPSI) payload of RTP/AVPF (IETF RFC 4585) may be specified for MV-HEVC/SHVC streams as follows: The field "Native RPSI bit string defined per codec" is a base16 [IETF RFC 4648] representation of the 8 bits consisting of 2 most significant bits equal to 0 and 6 bits of nuh_layer_id, as defined in H.265/HEVC, followed by the 32 bits representing the value of the PicOrderCntVal (in network byte order) when nuh_layer_id is equal to 0 or the 32 bits representing the LayerTreePicOrderCntVal (in network byte order), for the picture that is requested to be used for reference when encoding the next picture.

In the above, the functionalities related to POC may alternatively refer to an independent layer when term base layer is used and to a dependent layer (a layer which is not an independent layer) when term enhancement layer is used.

In the following, several examples of the layer-tree POC approach are presented.

Figure 12:
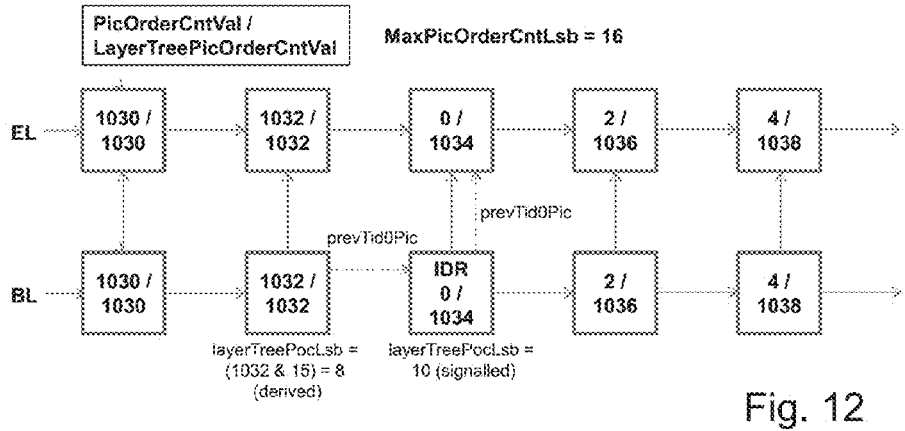
FIG. 12 shows an example of layer-tree POC signaling and derivation according to an embodiment.

In the example of FIG. 12, there is access unit with an IDR picture in the base layer, which resets the POC value to 0. The layer-tree POC values are anyhow continued by including the layer-tree POC related syntax elements (e.g. layer_tree_poc_lsb) with the base-layer IDR picture. In this example layer_tree_poc_lsb is equal to 10, and since the derived layer-tree POC for the POC reference picture is 1032 and consequently the layer-tree POC LSB is equal to 8 (when MaxPicOrderCntLsb is equal to 16), the layer-tree POC value is incremented by 2 for the base-layer IDR picture.

Figure 13:
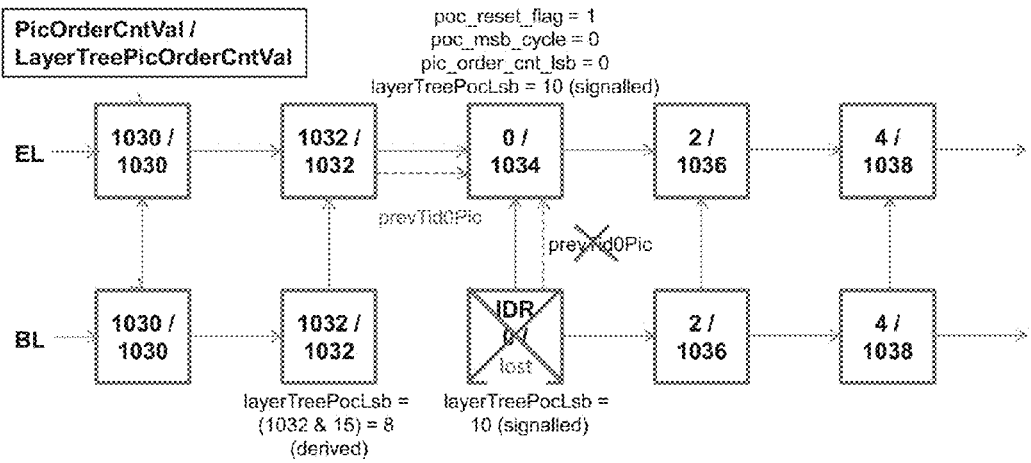
FIG. 13 shows an example of loss resilience in layer-tree POC approach according to an embodiment.

In the example of FIG. 13, additional resilience against the loss of a base-layer IDR picture is provided so that the loss of a base-layer IDR picture does not cause derivation of wrong POC values or layer-tree POC values. POC reset related information is included with the enhancement-layer picture in the access unit containing base-layer IDR picture. For example, poc_reset_flag is set to 1 and poc_msb_cycle is set to 0, while if the alternative of signaling ref_poc_lsb was used, the value of ref_poc_lsb would be set to 0 in the presented enhancement layer picture with poc_reset_flag equal to 1. This information facilitates correct POC value derivation even if the base-layer IDR picture was lost. Moreover, layer-tree POC information (e.g. layer_tree_poc_lsb) is included with the same enhancement-layer picture. This information facilitates correct layer-tree POC value derivation even if the base-layer IDR picture was lost.

Figure 14:
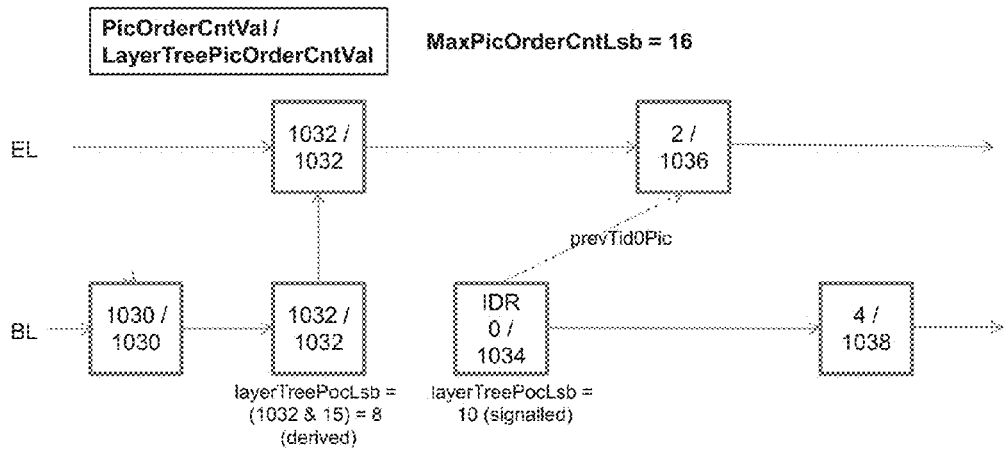
FIG. 14 shows an example of POC reference picture residing in a different access unit for an enhancement layer picture according to an embodiment.

In the example of FIG. 14, the derivation of a POC value and a layer-tree POC value for an enhancement-layer picture that is present in an access unit that does not include a base-layer picture and follows (in decoding order) an access unit that resets the POC value. As in the previous example figures, the base-layer IDR picture includes layer_tree_poc_lsb (or alike) that enables the derivation of the layer-tree POC value for the base-layer IDR picture. The value of In this example, the POC reference picture for the first enhancement layer picture following a POC reset point is set to be the preceding (in decoding order) base-layer picture. The base-layer picture has both POC value and layer-tree POC value and serves as reference for both POC value and layer-tree POC value derivation for the enhancement-layer picture.

Figure 15:
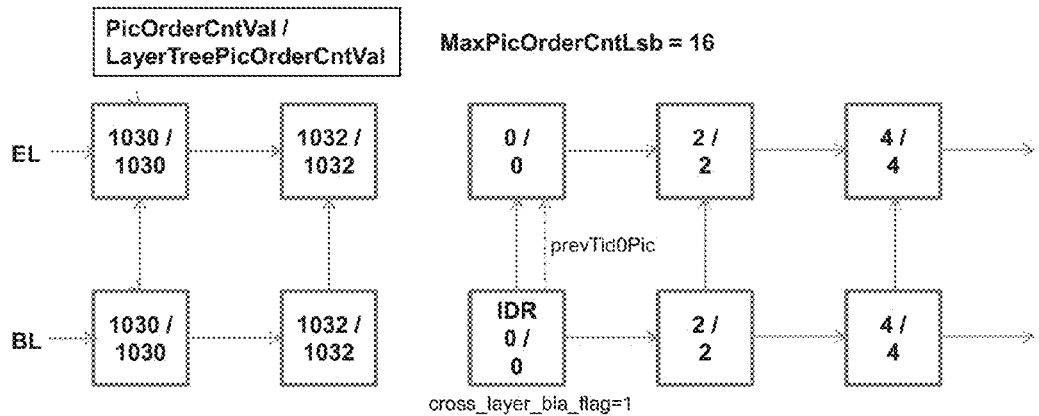
FIG. 15 shows an example where base-layer IDR picture with cross_layer_bla_flag equal to 1 resets POC values according to an embodiment.

The example of FIG. 15 illustrates a reset of layer-tree POC values. In this example, the layer-tree POC values are reset by including a cross_layer_bla_flag equal to 1 in a base-layer IDR picture. The base-layer IDR picture (regardless of the value of cross_layer_bla_flag) also resets the POC value.

Figure 16:
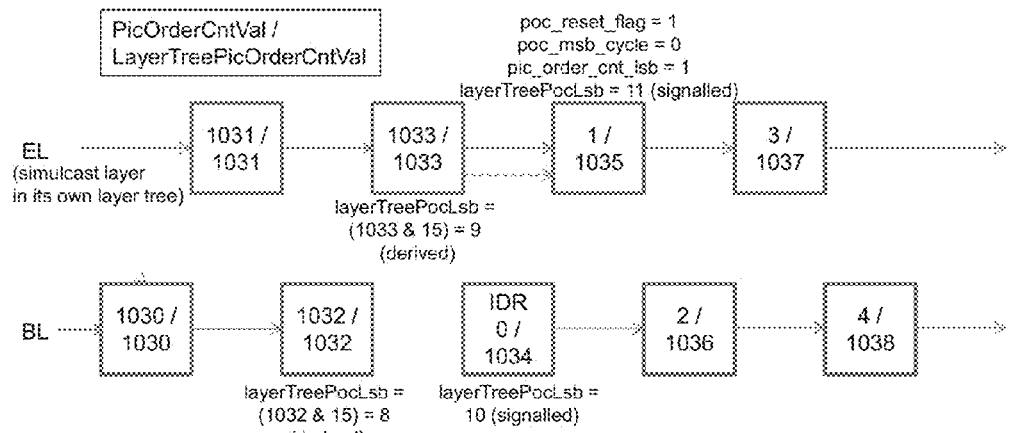
FIG. 16 shows an example where POC and layer-tree POC derivation of independent layers reside in different access units according to an embodiment.

In the example of FIG. 16, there are two independent layers. Hence, the layer-tree POC value derivation of each layer is independent of the other layer (while in the example the layer-tree POC values of both layers happen to indicate their joint output order). The enhancement layer picture that follows, in decoding order, the base-layer IDR picture has poc_reset_flag equal to 1. The POC reference picture (prevTid0Pic) for the enhancement-layer picture with layer-tree POC equal to 1035 is the enhancement-layer picture with layer-tree POC equal to 1033.

Figure 17:
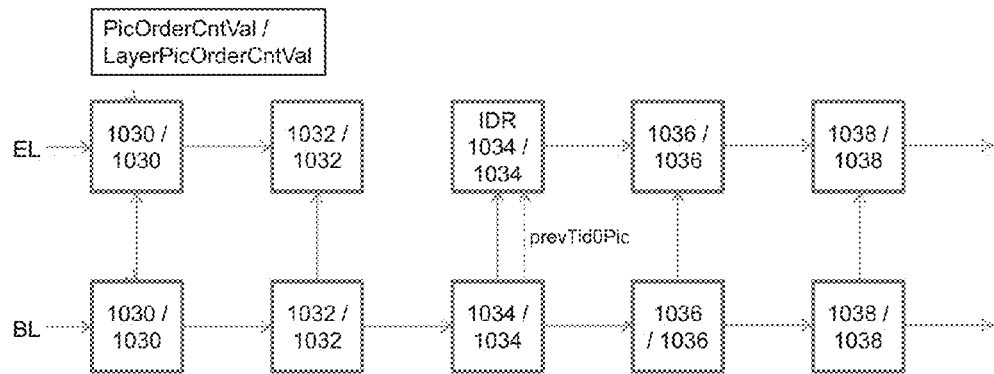
FIG. 17 shows an example of layer-tree POC derivation according to an embodiment.
Figure 18:
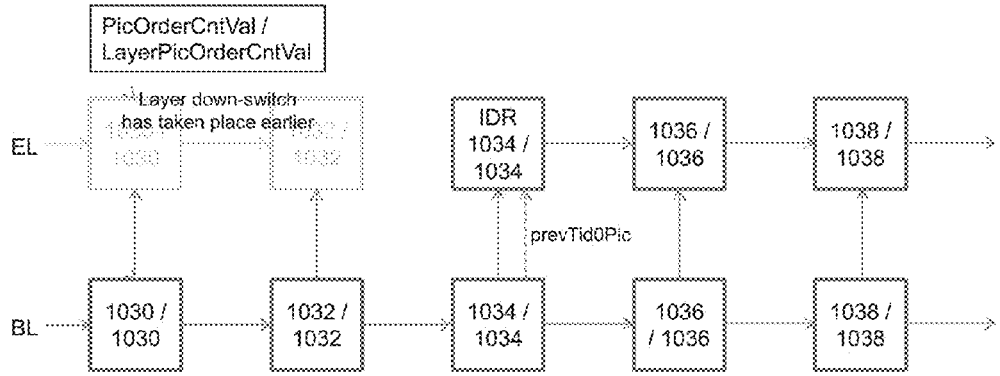
FIG. 18 shows an example of layer down-switching with the layer-tree POC approach according to an embodiment.
Figure 19:
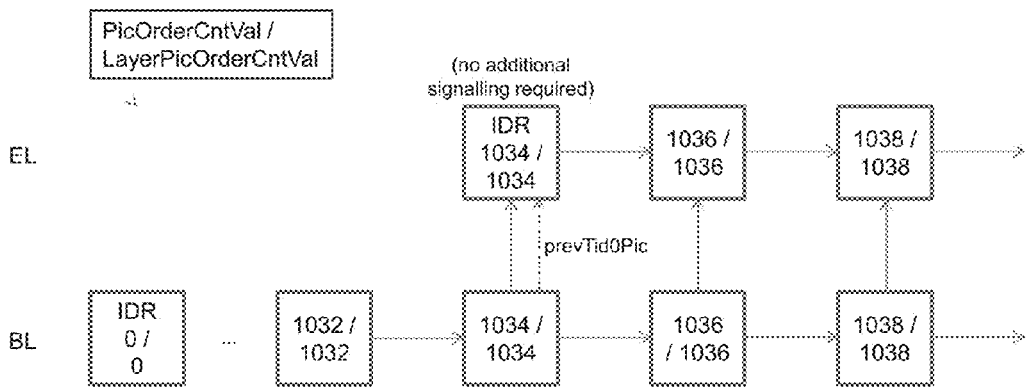
FIG. 19 shows an example of layer-wise start-up process with the layer-tree POC approach according to an embodiment.

The example of FIG. 17 presents an IDR picture in the enhancement layer, which may be used for layer up-switching. The POC reference picture for this enhancement-layer IDR picture is the base-layer picture in the same access unit. FIG. 18 illustrates the same bitstream as in FIG. 17, but where a layer down-switch has happened prior to the enhancement-layer IDR picture and a layer up-switch is taking place at the enhancement-layer IDR picture. As the POC reference picture is the base-layer picture, both the POC value and the layer-tree POC value of the enhancement-layer IDR picture can be correctly decoded without the need of receiving or decoding earlier pictures (in decoding order) of the enhancement layer. FIG. 19 illustrates a similar bitstream as in FIG. 17, where the enhancement layer was not present or has been removed preceding (in decoding order) the enhancement-layer IDR picture. Similarly, as the POC reference picture is the base layer picture in the access unit that also contains the enhancement-layer IDR picture, both the POC value and the layer-tree POC value of the enhancement-layer IDR picture can be correctly decoded.

Figure 20:
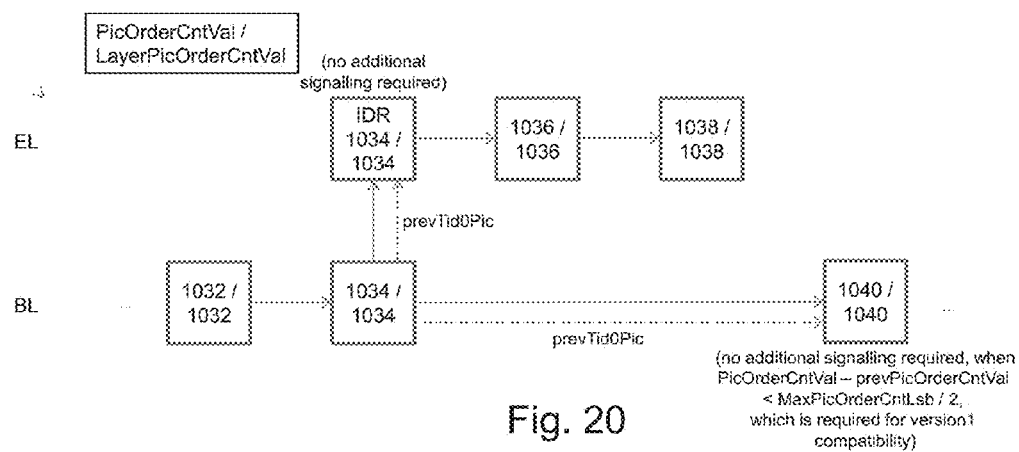
FIG. 20 shows an example of an adaptive resolution change bitstream according to an embodiment.

FIG. 20 illustrates an ARC bitstream that includes a switch to the enhancement-layer resolution and then back to the base-layer resolution. Similarly to the example of FIG. 19, the POC reference picture of the enhancement-layer IDR picture is the base layer picture in the access unit that also contains the enhancement-layer IDR picture, both the POC value and the layer-tree POC value of the enhancement-layer IDR picture can be correctly decoded. In this example, the base-layer picture where the switching back to the base-layer resolution happens is sufficiently close to the preceding base-layer picture (in decoding order) in terms of the POC values, such that the difference of PicOrderCntVal values is less than MaxPicOrderCntLsb/2, and consequently the update of PicOrderCntMsb is concluded correctly.

Figure 21:
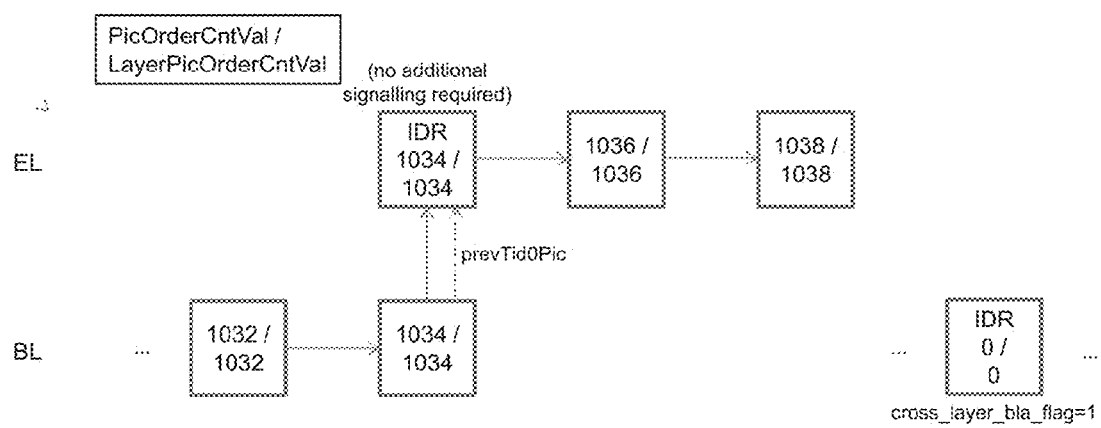
FIG. 21 shows another example of an adaptive resolution change bitstream according to an embodiment.

FIG. 21 illustrates an ARC bitstream that includes a switch to the enhancement-layer resolution and then back to the base-layer resolution. In this case example, the base-layer picture where the switching back to the base-layer resolution is coded as an IDR picture with cross_layer_bla_flag equal to 1 so that no POC reference picture is used in the POC or layer-tree POC derivation. A BLA picture could be similarly used instead of an IDR picture with cross_layer_bla_flag equal to 1.

In the presented example figures above, where poc_reset_flag equal to 1 is referred, other options for signaling or determining a base-layer POC reset may be used alternatively or additionally. For example, BLPOCResetFlag [nuh_layer_id] equal to 1 could be used instead of or in addition to poc_reset_flag equal to 1.

In an embodiment which may be applied independently of or together with other embodiments a decoder or a decoder side entity creates feedback messages for POC values derived using the POC reset approach. Pictures are identified in the feedback messages with a combination of i) a poc_reset_period_id, bl_cvs_id, irap_pic_id (for the base layer), layer_tree_cvs_id (for the base layer) or similar and ii) the POC value. The poc_reset_period_id or similar enables the recipient of the feedback messages to synchronize to the state of the decoder (or decoder side entity) when the message was created. For example, the encoder may maintain a set of POC values for pictures (that it is buffering, e.g. in its DPB), one POC value for each poc_reset_period_id that has taken place at or after the picture in decoding order. The encoder can then compare the combination of poc_reset_period_id and POC value with the stored combinations of poc_reset_period_id and POC value for each picture and conclude which picture the decoder (or the decoder side entity) refers to.

For example, the Reference Picture Selection Indication (RPSI) payload of RTP/AVPF (IETF RFC 4585) may be specified for MV-HEVC/SHVC streams as follows: The field "Native RPSI bit string defined per codec" is a base16 [IETF RFC 4648] representation of poc_reset_period_id (8 bits where the value appears in the LSBs) followed by the value of the PicOrderCntVal (in network byte order), for the picture that is requested to be used for reference when encoding the next picture.

The encoder or another entity, such as an HRD verifier, may indicate buffering parameters for one or both of the following types of bitstreams: bitstreams where CL-RAS pictures of IRAP pictures for which NoClrasOutputFlag is equal to 1 are present and bitstreams where CL-RAS picture of IRAP pictures for which NoClrasOutputFlag is equal to 1 are not present. For example, CPB buffer size(s) and bitrate(s) may be indicated separately e.g. in VUI for either or both mentioned types of bitstreams. Additionally or alternatively, the encoder or another entity may indicate initial CPB and/or DPB buffering delay and/or other buffering and/or timing parameters for either or both mentioned types of bitstreams. The encoder or another entity may, for example, include a buffering period SEI message into a scalable nesting SEI message, which may indicate the sub-bitstream, the layer set or the output layer set to which the contained buffering period SEI message applies. The buffering period SEI message of HEVC supports indicating two sets of parameters, one for the case where the leading pictures associated with the IRAP picture (for which the buffering period SEI message is also associated with) are present and another for the case where the leading pictures are not present. In the case when a buffering period SEI message is contained within a scalable nesting SEI message, the latter (alternative) set of parameters may be considered to concern a bitstream where CL-RAS pictures associated with the IRAP picture (for which the buffering period SEI message is also associated with) are not present. Generally, the latter set of buffering parameters may concern a bitstream where CL-RAS pictures associated with an IRAP picture for which NoClrasOutputFlag is equal to 1 are not present. It is to be understood that while specific terms and variable names are used in the description of this paragraph, it can be similarly realized with other terminology and need not use the same or similar variables as long as the decoder operation is similar.

The encoder or another entity, such as an HRD verifier, may indicate buffering parameters for output layer sets within which NOLS pictures are removed on layers that are not output. In other words, buffering parameters may be indicated for a sub-bitstream containing the layers included in an output layer set where NOLS pictures of the layers not among the target output layers of the output layer set are removed. For example, CPB buffer size(s) and bitrate(s) may be indicated e.g. in VUI for such sub-bitstreams. Additionally or alternatively, the encoder or another entity may indicate initial CPB and/or DPB buffering delay and/or other buffering and/or timing parameters for such sub-bitstreams. The encoder or another entity may, for example, include a buffering period SEI message into a nesting SEI message, which may indicate the output layer set to which the contained buffering period SEI message applies. The buffering period SEI message of HEVC supports indicating two sets of parameters, one for the case where the leading pictures associated with the IRAP picture (for which the buffering period SEI message is also associated with) are present and another for the case where the leading pictures are not present. In the case when a buffering period SEI message is contained within a nesting SEI message applying to an output layer set, the latter (alternative) set of parameters may be considered to concern a bitstream where NOLS pictures of non-output layers and/or CL-RAS pictures associated with the IRAP picture (for which the buffering period SEI message is also associated with) are not present. Generally, the latter set of buffering parameters may concern a bitstream where CL-RAS pictures associated with an IRAP picture for which NoClrasOutputFlag is equal to 1 are not present. It is to be understood that while specific terms and variable names are used in the description of this embodiment, it can be similarly realized with other terminology and need not use the same or similar variables as long as the decoder operation is similar.

A sub-bitstream extraction process where inputs are a bitstream, an output layer set (or a list of output layers), and possibly a maximum TemporalId value (highestTid) may be used. An output layer set may be used to infer a target layer set that is required to be decoded, or the target layer set may be provided as input. An output of the process is a sub-bitstream. The sub-bitstream extraction process includes in the sub-bitstream all VCL NAL units within the output layer set having TemporalId smaller than or equal to highestTid and the non-VCL NAL units associated with the included VCL NAL units. Furthermore, the sub-bitstream extraction process included those VCL NAL units from the non-output layers (but included in the target layer set) that are not NOLS pictures and not discardable pictures. Furthermore, the sub-bitstream extraction process may modify the syntax structure containing information on output layer sets, such as VPS, to exclude those output layer sets where the layers from which NOLS pictures and discardable pictures are on output layers. Furthermore, the sub-bitstream extraction process may modify the signaling of HRD parameters such that the HRD parameters that apply for output layer sets without the presence of NOLS pictures (and discardable pictures) of the non-output layers are in force. Furthermore, the sub-bitstream extraction process may exclude those HRD parameters from the bitstream that assume the presence of NOLS pictures (and discardable pictures) of the non-output layers.

A sub-bitstream extraction process may exclude CL-RAS pictures associated with TRAP pictures for which NoClrasOutputFlag is equal to 1. Furthermore, the sub-bitstream extraction process may exclude those HRD parameters from the bitstream that assume the presence of CL-RAS pictures that have been removed from the output bitstream.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

Where example embodiments have been described with reference to a splicer, it needs to be understood that a splicer could likewise be an encoder, a middle-box, or any other entity that creates or modifies a coded video bitstream.

In the above, some embodiments have been described with reference to an enhancement layer and a reference layer, where the reference layer may be for example a base layer. In the above, some enhancements have been described with reference to an enhancement layer and a base layer, where the base layer may be considered to be any reference layer of the enhancement layer.

It needs to be understood that embodiments may be applicable to any types of layered coding, for example for multiview coding, quality scalability, spatial scalability, and for multiview video plus depth coding.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 1 and 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:
1. A method comprising:
encoding pictures into a bitstream, the bitstream comprising at least two scalability layers, pictures being associated with access units and pictures being associated individually with one of the at least two scalability layers;
indicating in the bitstream inter-layer prediction dependencies, indicative of direct reference layers, if any, of a first scalability layer and indirect reference layers, if any, of the first scalability layer, a direct reference layer being such that a picture associated with the direct reference layer is useable as a reference picture for prediction of a picture associated with the first scalability layer, and an indirect reference layer being such that a picture associated with an indirect reference layer is unusable as a reference picture for prediction of a picture associated with the first scalability layer but useable as a reference picture for prediction of a picture associated with a direct or indirect reference layer of the first scalability layer;
selecting an earlier picture in decoding order as a basis for deriving picture order count (POC) related variables for a current picture based on a pre-defined algorithm, the current picture being associated with a current scalability layer,
wherein the earlier picture is the closest preceding picture, in decoding order, to the current picture among a set of pictures that are associated with the current scalability layer or any direct or indirect reference layer of the current scalability layer, and
wherein the method further comprises as a part of or in connection with encoding the current picture into the bitstream:
determining that POC values are to be reset;
encoding into the bitstream an indication of resetting POC values; and
using the earlier picture in deriving a value decremented from POC values of all of a plurality of pictures in a decoded picture buffer.

2. The method according to claim 1, wherein the earlier picture is associated with a POC value variable that can be represented as a sum of a most significant part and a least significant part, wherein the least significant part is represented by a fixed number of bits in a binary representation and the fixed number of least significant bits of the most significant part are equal to 0.

3. The method according to claim 1, the method further comprising:
encoding at least one POC related syntax element into the bitstream on the basis of the POC related variables of said earlier picture defined as a POC reference picture.

4. The method according to claim 3, wherein the POC related syntax element represents a fixed number of least significant bits of a POC value of the current picture; and the pre-defined algorithm comprises investigating a difference of the value of the POC related syntax element and the least significant part of the POC value of the earlier picture.

5. The method according to claim 1, wherein pictures are characterized in one or more of the following characterizations:
being associated individually with one of one or more temporal sub-layers, characterized in that prediction of a picture associated with a particular temporal sub-layer is disabled from any picture associated with a temporal sub-layer higher than the particular temporal sub-layer,
being classified individually as one of a sub-layer reference picture and sub-layer non-reference picture, characterized in that prediction of a picture associated with a first temporal sub-layer is enabled from a sub-layer reference picture associated with the first temporal sub-layer, and prediction of a picture associated with a second temporal sub-layer is disabled from a sub-layer non-reference picture associated with the second temporal sub-layer,
being classified individually as one of a leading picture, an intra random access point (IRAP) picture, and a trailing picture, an IRAP picture enabling starting of decoding of a scalability layer which the IRAP picture is associated with, a leading picture following an associated IRAP picture in decoding order and preceding the associated IRAP picture in output order, a trailing picture following an associated IRAP picture in output order,
being classified individually as one of a discardable picture and a non-discardable picture, a discardable picture characterized in that no other picture uses it as a reference picture for prediction, wherein the method further comprises:
determining POC reference picture characteristics according to said one or more of characterizations to match characteristics of pictures on which the current picture may depend on in prediction; and selecting the set of pictures to comprise pictures fulfilling the POC reference picture characteristics.

6. The method according to claim 5, further comprising: determining POC reference picture characteristics to match pictures that are associated with the lowest temporal sub-layer, are sub-layer reference pictures, are either intra random access point pictures or trailing pictures, and are non-discardable pictures.

7. An apparatus comprising at least one processor and at least one memory, said at least one memory stored with code thereon, which when executed by said at least one processor, causes an apparatus to perform at least the following:

encode pictures into a bitstream, the bitstream comprising at least two scalability layers, pictures being associated with access units and pictures being associated individually with one of the at least two scalability layers;

indicate in the bitstream inter-layer prediction dependencies, indicative of direct reference layers, if any, of a first scalability layer and indirect reference layers, if any, of the first scalability layer, a direct reference layer being such that a picture associated with the direct reference layer is useable as a reference picture for prediction of a picture associated with the first scalability layer, and an indirect reference layer being such that a picture associated with an indirect reference layer is unusable as a reference picture for prediction of a picture associated with the first scalability layer but useable as a reference picture for prediction of a picture associated with a direct or indirect reference layer of the first scalability layer;

select an earlier picture in decoding order as a basis for deriving picture order count (POC) related variables for a current picture based on a pre-defined algorithm, the current picture being associated with a current scalability layer, wherein the earlier picture is the closest preceding picture, in decoding order, to the current picture among a set of pictures that are associated with the current scalability layer or any direct or indirect reference layer of the current scalability layer, and wherein the apparatus is further caused, as a part of or in connection with encoding the current picture into the bitstream, to perform:

determine that POC values are to be reset;

encode into the bitstream an indication of resetting POC values; and use the earlier picture in deriving a value decremented from POC values of all of a plurality of pictures in a decoded picture buffer.

8. A computer program product embodied on a non-transitory computer readable medium, comprising computer program code configured to, when executed on at least one processor, cause an apparatus or a system to:

encode pictures into a bitstream, the bitstream comprising at least two scalability layers, pictures being associated with access units and pictures being associated individually with one of the at least two scalability layers;

indicate in the bitstream inter-layer prediction dependencies, indicative of direct reference layers, if any, of a first scalability layer and indirect reference layers, if any, of the first scalability layer, a direct reference layer being such that a picture associated with the direct reference layer is useable as a reference picture for prediction of a picture associated with the first scalability layer, and an indirect reference layer being such that a picture associated with an indirect reference layer is unusable as a reference picture for prediction of a picture associated with the first scalability layer but useable as a reference picture for prediction of a picture associated with a direct or indirect reference layer of the first scalability layer;

select an earlier picture in decoding order as a basis for deriving picture order count (POC) related variables for a current picture based on a pre-defined algorithm, the current picture being associated with a current scalability layer, wherein the earlier picture is the closest preceding picture, in decoding order, to the current picture among a set of pictures that are associated with the current scalability layer or any direct or indirect reference layer of the current scalability layer, and wherein the apparatus or the system is further caused, as a part of or in connection with encoding the current picture into the bitstream, to:

determine that POC values are to be reset;

encode into the bitstream an indication of resetting POC values; and use the earlier picture in deriving a value decremented from POC values of all of a plurality of pictures in a decoded picture buffer.

9. A video encoder configured for:

encoding pictures into a bitstream, the bitstream comprising at least two scalability layers, pictures being associated with access units and pictures being associated individually with one of the at least two scalability layers;

indicating in the bitstream inter-layer prediction dependencies, indicative of direct reference layers, if any, of a first scalability layer and indirect reference layers, if any, of the first scalability layer, a direct reference layer being such that a picture associated with the direct reference layer is useable as a reference picture for prediction of a picture associated with the first scalability layer, and an indirect reference layer being such that a picture associated with an indirect reference layer is unusable as a reference picture for prediction of a picture associated with the first scalability layer but useable as a reference picture for prediction of a picture associated with a direct or indirect reference layer of the first scalability layer;

selecting an earlier picture in decoding order as a basis for deriving picture order count (POC) related variables for a current picture based on a pre-defined algorithm, the current picture being associated with a current scalability layer, wherein the earlier picture is the closest preceding picture, in decoding order, to the current picture among a set of pictures that are associated with the current scalability layer or any direct or indirect reference layer of the current scalability layer, and wherein the video encoder is further configured, as a part of or in connection with encoding the current picture into the bitstream, for:

determining that POC values are to be reset;

encoding into the bitstream an indication of resetting POC values; and using the earlier picture in deriving a value decremented from POC values of all of a plurality of pictures in a decoded picture buffer.

10. A method comprising:

decoding pictures from a bitstream, the bitstream comprising at least two scalability layers, pictures being associated with access units and pictures being associated individually with one of the at least two scalability layers;

obtaining an indication from the bitstream relating to inter-layer prediction dependencies, indicative of direct reference layers, if any, of a first scalability layer and indirect reference layers, if any, of the first scalability layer, a direct reference layer being such that a picture associated with the direct reference layer is useable as a reference picture for prediction of a picture associated with the first scalability layer, and an indirect reference layer being such that a picture associated with an indirect reference layer is unusable as a reference picture for prediction of a picture associated with the first scalability layer but useable as a reference picture for prediction of a picture associated with a direct or indirect reference layer of the first scalability layer;

selecting an earlier picture in decoding order as a basis for deriving picture order count (POC) related variables for a current picture based on a pre-defined algorithm, the current picture being associated with a current scalability layer, wherein the earlier picture is the closest preceding picture, in decoding order, to the current picture among a set of pictures that are associated with the current scalability layer or any direct or indirect reference layer of the current scalability layer, and wherein the method further comprises as a part of or in connection with decoding the current picture from the bitstream:

determining that POC values are to be reset;

decoding into the bitstream an indication of resetting POC values; and using the earlier picture in deriving a value decremented from POC values of all of the plurality of pictures in a decoded picture buffer.

11. The method according to claim 10, wherein the earlier picture is associated with a POC value variable that can be represented as a sum of a most significant part and a least significant part, wherein the least significant part is represented by a fixed number of bits in a binary representation and the fixed number of least significant bits of the most significant part are equal to 0.

12. The method according to claim 10, the method further comprising:

decoding at least one POC related syntax element from the bitstream; and decoding POC related variables of the current picture on the basis of the decoded at least one POC related syntax element and the POC related variables of said earlier picture defined as a POC reference picture.

13. The method according to claim 12, wherein the POC related syntax element represents a fixed number of least significant bits of a POC value of the current picture; and the pre-defined algorithm comprises investigating a difference of the value of the POC related syntax element and the least significant part of the POC value of the earlier picture.

14. The method according to claim 10, wherein pictures are characterized in one or more of the following characterizations:

being associated individually with one of one or more temporal sub-layers, characterized in that prediction of a picture associated with a particular temporal sub-layer is disabled from any picture associated with a temporal sub-layer higher than the particular temporal sub-layer, being classified individually as one of a sub-layer reference picture and sub-layer non-reference picture, characterized in that prediction of a picture associated with a first temporal sub-layer is enabled from a sub-layer reference picture associated with the first temporal sub-layer, and prediction of a picture associated with a second temporal sub-layer is disabled from a sub-layer non-reference picture associated with the second temporal sub-layer, being classified individually as one of a leading picture, an intra random access point (IRAP) picture, and a trailing picture, an IRAP picture enabling starting of decoding of a scalability layer which the IRAP picture is associated with, a leading picture following an associated IRAP picture in decoding order and preceding the associated IRAP picture in output order, a trailing picture following an associated IRAP picture in output order, being classified individually as one of a discardable picture and a non-discardable picture, a discardable picture characterized in that no other picture uses it as a reference picture for prediction, wherein the method further comprises:

determining POC reference picture characteristics according to said one or more of characterizations to match characteristics of pictures on which the current picture may depend on in prediction; and selecting the set of pictures to comprise pictures fulfilling the POC reference picture characteristics.

15. The method according to claim 14, further comprising:

determining POC reference picture characteristics to match pictures that are associated with the lowest temporal sub-layer, are sub-layer reference pictures, are either intra random access point pictures or trailing pictures, and are non-discardable pictures.

16. An apparatus comprising at least one processor and at least one memory, said at least one memory stored with code thereon, which when executed by said at least one processor, causes an apparatus to perform at least the following:

decoding pictures from a bitstream, the bitstream comprising at least two scalability layers, pictures being associated with access units and pictures being associated individually with one of the at least two scalability layers;

obtaining an indication from the bitstream relating to inter-layer prediction dependencies, indicative of direct reference layers, if any, of a first scalability layer and indirect reference layers, if any, of the first scalability layer, a direct reference layer being such that a picture associated with the direct reference layer is useable as a reference picture for prediction of a picture associated with the first scalability layer, and an indirect reference layer being such that a picture associated with an indirect reference layer is unusable as a reference picture for prediction of a picture associated with the first scalability layer but useable as a reference picture for prediction of a picture associated with a direct or indirect reference layer of the first scalability layer;

selecting an earlier picture in decoding order as a basis for deriving picture order count (POC) related variables for a current picture based on a pre-defined algorithm, the current picture being associated with a current scalability layer, wherein the earlier picture is the closest preceding picture, in decoding order, to the current picture among a set of pictures that are associated with the current scalability layer or any direct or indirect reference layer of the current scalability layer, and wherein the apparatus is further caused to, as a part of or in connection with decoding the current picture from the bitstream, perform:

determining that POC values are to be reset;

decoding into the bitstream an indication of resetting POC values; and using the earlier picture in deriving a value decremented from POC values of all of the plurality of pictures in a decoded picture buffer.

17. A computer program product embodied on a non-transitory computer readable medium, comprising computer program code configured to, when executed on at least one processor, cause an apparatus or a system to:

decode pictures from a bitstream, the bitstream comprising at least two scalability layers, pictures being associated with access units and pictures being associated individually with one of the at least two scalability layers;

obtain an indication from the bitstream relating to inter-layer prediction dependencies, indicative of direct reference layers, if any, of a first scalability layer and indirect reference layers, if any, of the first scalability layer, a direct reference layer being such that a picture associated with the direct reference layer is useable as a reference picture for prediction of a picture associated with the first scalability layer, and an indirect reference layer being such that a picture associated with an indirect reference layer is unusable as a reference picture for prediction of a picture associated with the first scalability layer but useable as a reference picture for prediction of a picture associated with a direct or indirect reference layer of the first scalability layer;

select an earlier picture in decoding order as a basis for deriving picture order count (POC) related variables for a current picture based on a pre-defined algorithm, the current picture being associated with a current scalability layer, wherein the earlier picture is the closest preceding picture, in decoding order, to the current picture among a set of pictures that are associated with the current scalability layer or any direct or indirect reference layer of the current scalability layer, and wherein the apparatus or the system is further caused, as a part of or in connection with decoding the current picture from the bitstream, to:

determine that POC values are to be reset;

decode into the bitstream an indication of resetting POC values; and use the earlier picture in deriving a value decremented from POC values of all of the plurality of pictures in a decoded picture buffer.

18. A video decoder configured for:

decoding pictures from a bitstream, the bitstream comprising at least two scalability layers, pictures being associated with access units and pictures being associated individually with one of the at least two scalability layers;

obtaining an indication from the bitstream relating to inter-layer prediction dependencies, indicative of direct reference layers, if any, of a first scalability layer and indirect reference layers, if any, of the first scalability layer, a direct reference layer being such that a picture associated with the direct reference layer is useable as a reference picture for prediction of a picture associated with the first scalability layer, and an indirect reference layer being such that a picture associated with an indirect reference layer is unusable as a reference picture for prediction of a picture associated with the first scalability layer but useable as a reference picture for prediction of a picture associated with a direct or indirect reference layer of the first scalability layer;

selecting an earlier picture in decoding order as a basis for deriving picture order count (POC) related variables for a current picture based on a pre-defined algorithm, the current picture being associated with a current scalability layer, wherein the earlier picture is the closest preceding picture, in decoding order, to the current picture among a set of pictures that are associated with the current scalability layer or any direct or indirect reference layer of the current scalability layer, and wherein the video decoder is further configured as a part of or in connection with decoding the current picture from the bitstream, for:

determining that POC values are to be reset;

decoding into the bitstream an indication of resetting POC values; and using the earlier picture in deriving a value decremented from POC values of all of the plurality of pictures in a decoded picture buffer.

* * * * *